United States Patent
Lee et al.

(10) Patent No.: US 11,395,132 B2
(45) Date of Patent: Jul. 19, 2022

(54) METHOD FOR TRANSFERRING SUBSCRIPTION AND ELECTRONIC DEVICE FOR SUPPORTING THE SAME

(71) Applicant: SAMSUNG ELECTRONICS CO., LTD., Suwon-si (KR)

(72) Inventors: Sanghwi Lee, Suwon-si (KR); Jieun Jung, Suwon-si (KR); Jimin Park, Suwon-si (KR); Hyongjin Ban, Suwon-si (KR); Jaehyeon Seo, Suwon-si (KR); Yejin Yoon, Suwon-si (KR); Sunmin Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/918,382

(22) Filed: Jul. 1, 2020

(65) Prior Publication Data

US 2021/0006964 A1   Jan. 7, 2021

(30) Foreign Application Priority Data

Jul. 3, 2019 (KR) .................. 10-2019-0079960
Mar. 11, 2020 (KR) .................. 10-2020-0030316

(51) Int. Cl.
*H04W 8/20* (2009.01)
*H04W 4/80* (2018.01)
(Continued)

(52) U.S. Cl.
CPC ............... *H04W 8/20* (2013.01); *H04W 4/80* (2018.02); *H04W 12/068* (2021.01);
(Continued)

(58) Field of Classification Search
CPC ......... H04W 8/20; H04W 76/14; H04W 4/80; H04W 12/068; H04W 12/40;
(Continued)

(56) References Cited

U.S. PATENT DOCUMENTS 9,408,066 B2   8/2016 Bradley
9,609,458 B2 * 3/2017 Ramanna ............ H04B 1/3816
(Continued)

FOREIGN PATENT DOCUMENTS

EP   3001711   3/2016
EP   3024261   5/2016
KR   10-1730742   4/2017

OTHER PUBLICATIONS

International Search Report and Written Opinion dated Oct. 6, 2020 in corresponding International Application No. PCT/KR2020/008649.
(Continued)

*Primary Examiner* — Inder P Mehra
(74) *Attorney, Agent, or Firm* — Nixon & Vanderhye P.C.

(57) ABSTRACT

An electronic device according to an embodiment may include: a first wireless communication circuit configured to support a first communication protocol, a second wireless communication circuit configured to support a second communication protocol, at least one processor operatively coupled with the first wireless communication circuit and the second wireless communication circuit, and a memory operatively coupled with the at least one processor, wherein the memory stores instructions which, when executed, cause the at least one processor to control the electronic device to: establish a short-range communication connection between the electronic device and an external electronic device through the first wireless communication circuit, acquire subscription information of a first profile stored in a first Subscriber Identification Module (SIM) of the external electronic device from the external electronic device through the first wireless communication circuit, transmit at least part of the subscription. information to a first server through the second wireless communication circuit, acquire authentication information provided by the first server from the
(Continued)

external electronic device through the first wireless communication circuit, transmit the authentication information to the first server through the second wireless communication circuit, acquire a second profile from a second server associated with the first server through the second wireless communication circuit based on transmitting the authentication information to the first server, and store the second profile to a second SIM of the electronic device.

20 Claims, 30 Drawing Sheets

(51) Int. Cl.
| | |
|---|---|
| *H04W 12/40* | (2021.01) |
| *H04W 12/72* | (2021.01) |
| *H04W 12/63* | (2021.01) |
| *H04W 4/60* | (2018.01) |
| *H04W 8/18* | (2009.01) |
| *H04L 29/06* | (2006.01) |
| *H04W 76/14* | (2018.01) |
| *H04W 12/06* | (2021.01) |

(52) U.S. Cl.
CPC ........... *H04W 12/40* (2021.01); *H04W 12/63* (2021.01); *H04W 76/14* (2018.02)

(58) Field of Classification Search
CPC ....... H04W 12/72; H04W 12/63; H04W 4/60; H04W 4/50; H04W 8/205; H04W 8/18; H04W 12/06; H04L 63/0492; H04L 63/0853; H04L 63/0838; H04L 61/1588
USPC ......................................................... 455/419
See application file for complete search history.

(56) References Cited

U.S. PATENT DOCUMENTS

| | | | |
|---|---|---|---|
| 2004/0093418 | A1* | 5/2004 | Tuomi ................. H04L 67/306 709/228 |
| 2016/0014601 | A1 | 1/2016 | Mellqvist et al. |
| 2016/0301529 | A1 | 10/2016 | Park et al. |
| 2017/0289792 | A1* | 10/2017 | Park ......................... H04W 4/70 |
| 2019/0028883 | A1* | 1/2019 | Namiranian .......... H04W 8/183 |
| 2019/0075453 | A1 | 3/2019 | Yoon et al. |
| 2019/0222999 | A1 | 7/2019 | Cho et al. |
| 2020/0059778 | A1* | 2/2020 | Li .......................... H04W 12/40 |

OTHER PUBLICATIONS

Extended European Search Report and Written Opinion dated Nov. 27, 2020 in corresponding European Application No. 20183531.1.

\* cited by examiner

METHOD FOR TRANSFERRING SUBSCRIPTION AND ELECTRONIC DEVICE FOR SUPPORTING THE SAME

CROSS-REFERENCE TO RELATED APPLICATIONS

This application is based on and claims priority under 35 U.S.C. § 119 to Korean patent application number 10-2019-0079960, filed on Jul. 3, 2019, in the Korean Intellectual Property Office, and Korean patent application number 10-2020-0030316, filed on Mar. 11, 2020, in the Korean Intellectual Property Office, the disclosures of which are incorporated by reference herein in their entireties.

BACKGROUND

1. Field

The disclosure relates to a method for transferring a subscription, and an electronic device supporting the method.

2. Description of Related Art

An electronic device may use a network provided by a communication operator to perform wireless communication. The electronic device may use a profile stored in the electronic device to perform authentication with a server provided by the communication operator, thereby using the network provided by the communication operator.

A Universal Integrated Circuit Card (UICC) is a smart card used by being inserted to a mobile communication terminal. The UICC may store personal information of a mobile communication subscriber and perform subscriber authentication and traffic security key generation when accessing a mobile communication network, thereby enabling a secure use of mobile communication.

The UICC is manufactured as a dedicated card for a corresponding operator at the request of a specific mobile communication operator when the card is manufactured, and authentication information for a network access of the corresponding operator, e.g., a Universal Subscriber Identity Module (USIM) application and an International Mobile Subscriber Identity (IMSI), may be pre-loaded when it is shipped.

An embedded UICC (eUICC) has recently been developed, which can be embedded in an electronic device (e.g., a mother board of the electronic device) and can be installed by remotely downloading a profile. The eUICC is small in size (or can be miniaturized) in comparison with a detachable physical UICC that can be inserted to and detached from the electronic device, and may store a plurality of profiles.

Conventionally, a user transfers and inserts a physical UICC, which is inserted to the existing electronic device, to a new electronic device, thereby transferring a subscription to the new electronic device while maintaining authentication information, mobile communication phone number, and personal phone book stored in the UICC.

However, when it is intended to transfer the subscription to the new electronic device including an eUICC from the conventionally used UICC, if the new electronic device does not include a structure for inserting the physical UICC (e.g., a slot for inserting the UICC), it may be difficult to transfer the subscription in such a manner that the physical UICC inserted to the existing electronic device is transferred and inserted to the new electronic device.

In addition, a method for transferring a subscription from the existing electronic device including an eUICC to a new electronic device including an eUICC may be required.

SUMMARY

Embodiments of the disclosure provide a method for transferring a subscription and an electronic device supporting the method capable of transferring the subscription without having to transfer a physical UICC from the existing terminal to a new electronic device.

An electronic device according to an example embodiment may include: a first wireless communication circuit configured to support a first communication protocol, a second wireless communication circuit configured to support a second communication protocol, at least one processor operatively coupled with the first wireless communication circuit and the second wireless communication circuit, and a memory operatively coupled with the at least one processor. The memory may store instructions which, when executed, cause the at least one processor to control the electronic device to: establish a short-range communication connection between the electronic device and an external electronic device through the first wireless communication circuit, acquire subscription information of a first profile stored in a first Subscriber Identification Module (SIM) of the external electronic device from the external electronic device through the first wireless communication circuit, transmit at least part of the subscription information to a first server through the second wireless communication circuit, acquire authentication information provided by the first server from the external electronic device through the first wireless communication circuit, transmit the authentication information to the first server through the second wireless communication circuit, acquire a second profile corresponding to the first profile from a second server associated with the first server through the second wireless communication circuit based on transmitting the authentication information to the first server, and store the second profile to a second SIM of the electronic device.

A method according to an example embodiment may include: establishing a short-range communication connection between an electronic device and an external electronic device through a first wireless communication circuit configured to support a first communication protocol, acquiring subscription information of a first profile stored in a first SIM of the external electronic device from the external electronic device through the first wireless communication circuit, transmitting at least part of the subscription information through a second wireless communication circuit configured to support a second communication protocol, acquiring authentication information provided by a first server from the external electronic device through the first wireless communication circuit, transmitting the authentication information to the first server through the second wireless communication circuit, acquiring a second profile corresponding to the first profile from a second server associated with the first server through the second wireless communication circuit based on transmitting the authentication information to the first server, and storing the second profile to a second SIM of the electronic device.

An electronic device according to an example embodiment may include a communication circuit, at least one processor operatively coupled with the communication circuit, and a memory operatively coupled with the at least one processor. The memory may store instructions which, when executed, cause the at least one processor to control the electronic device to: confirm that a physical first SIM is inserted to the electronic device, authenticate a first server and a user of the electronic device through the communication server using a first profile of the first SIM, based on performing the authenticating of the user, acquire a second profile corresponding to the first profile from a second server associated with the communication circuit through the communication circuit, and store the second profile in a second SIM of the electronic device.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
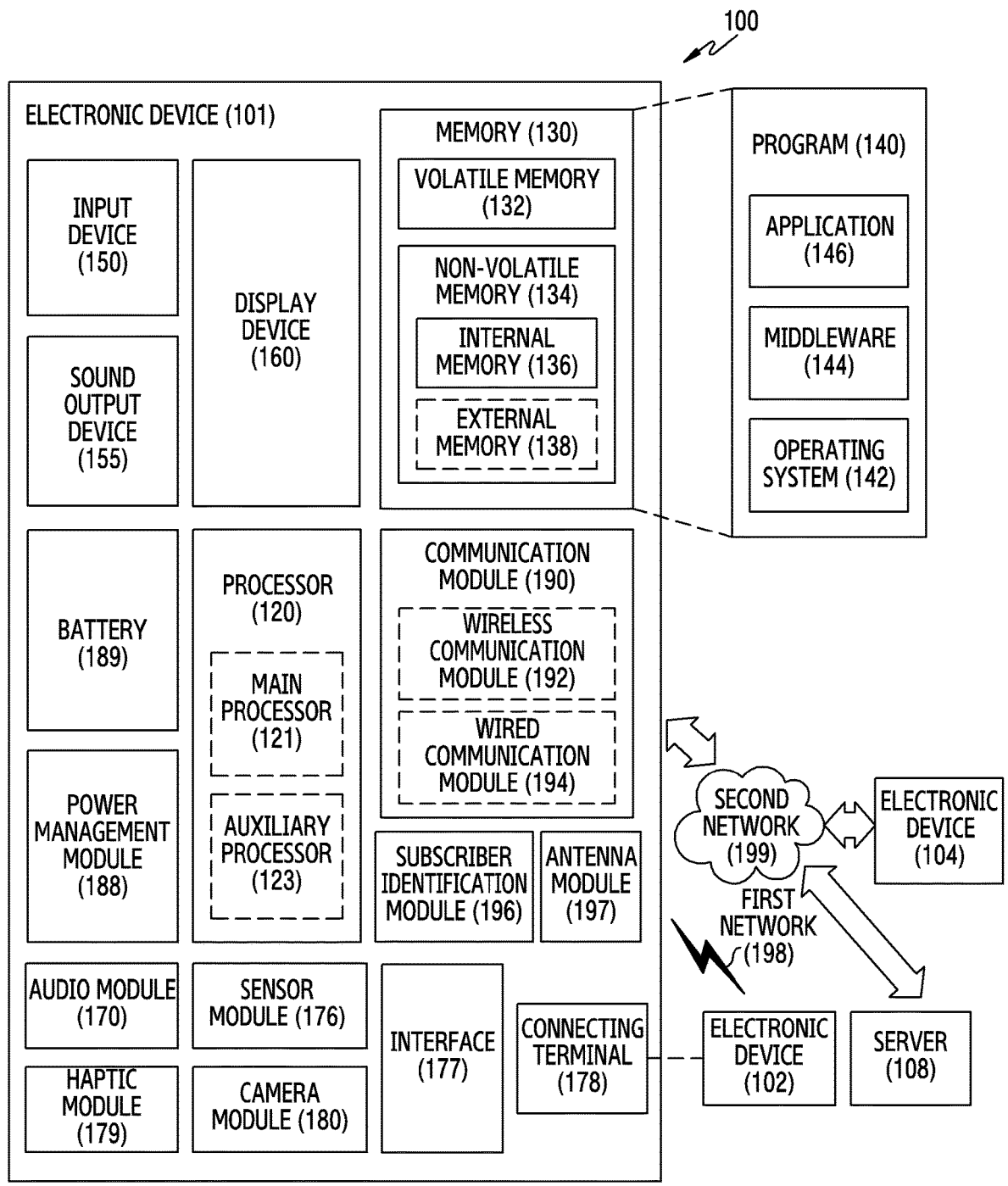
FIG. 1 is a block diagram illustrating an example electronic device in a network environment according to an embodiment.

FIG. 1 is a block diagram illustrating an example electronic device 101 in a network environment 100 according to an embodiment. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to an embodiment may be one of various types of electronic devices. The electronic devices may include, for example, and without limitation, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that an embodiment of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

An embodiment as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. According to an embodiment, one or more of the above-described components may be omitted, or one or more other components may be added. Alternatively or additionally, a plurality of components (e.g., modules or programs) may be integrated into a single component. In such a case, according to an embodiment, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

Figure 2:
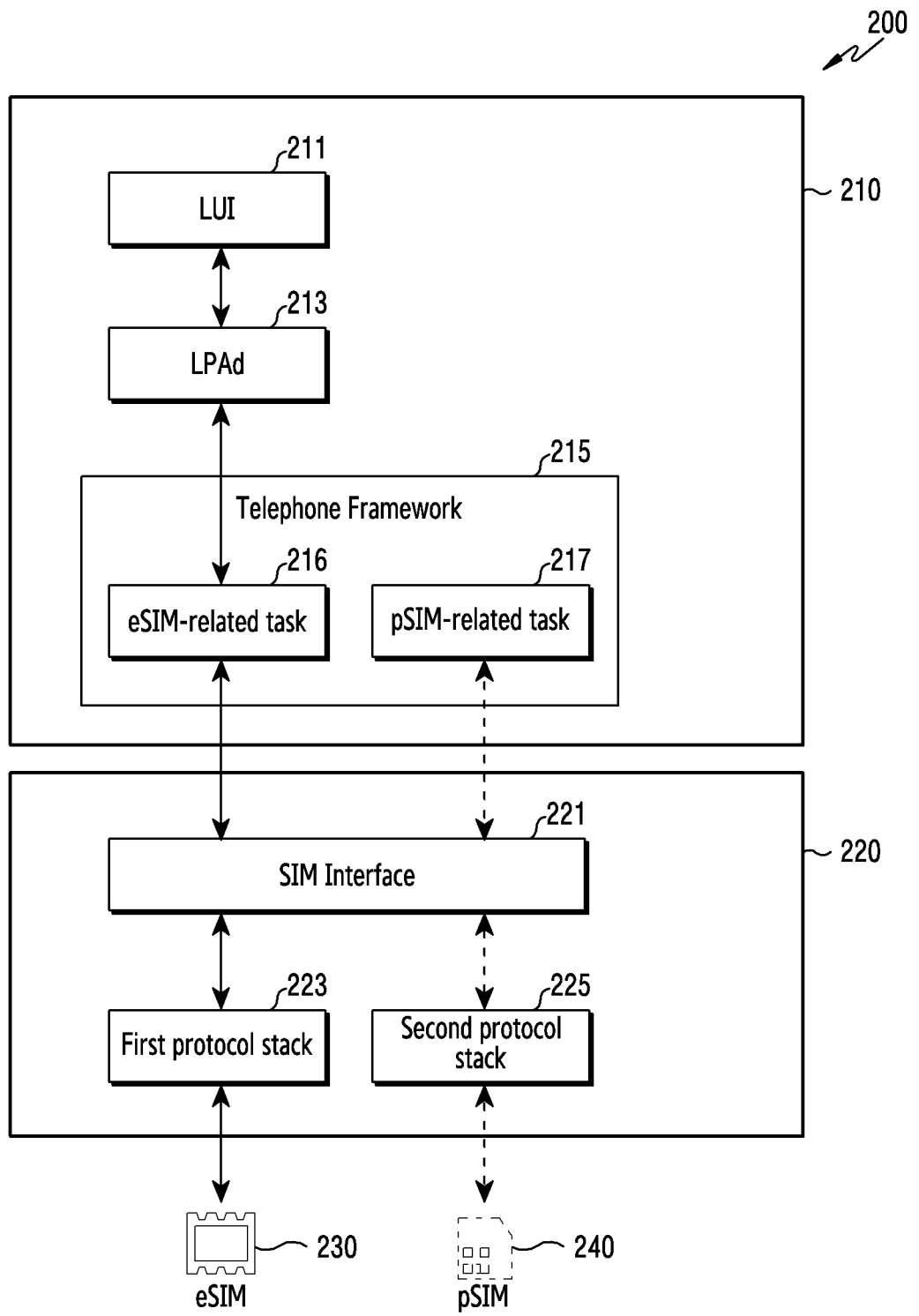
FIG. 2 is a block diagram illustrating an example processor, communication processor, embedded Subscriber Identity Module (eSIM), and physical SIM (pSIM) included in an electronic device according to an embodiment.

FIG. 2 is a block diagram 200 illustrating an example processor, communication processor, embedded Subscriber Identity Module (eSIM), and physical SIM (pSIM) included in an electronic device according to an embodiment.

Referring to FIG. 2, an electronic device (e.g., the electronic device 101 of FIG. 1) according to an embodiment may include a processor (e.g., including processing circuitry) 210 (e.g., the processor 120 of FIG. 1), a communication processor (e.g., including processing circuitry) 220 (e.g., the communication module 190 of FIG. 1), and an eSIM 230 (e.g., the SIM 196 of FIG. 1). A pSIM 240 (the SIM 196 of FIG. 1) may be inserted to the electronic device 101. Although it is illustrated by way of example in FIG. 2 that the eSIM 230 is included in the electronic device 101, the present disclosure is not limited thereto. For example, the eSIM 230 may be implemented such that it can be inserted to and detached from the electronic device 101 (e.g., a structure (or medium) to which the eSIM 230 is embedded can be inserted to or detached from the electronic device 101).

In an embodiment, the eSIM 230 may be embedded to the electronic device 101, and may store a first profile related to a first communication service.

In an embodiment, as an insertable or detachable SIM or a SIM card, the pSIM 240 may store a second profile related to a second communication service. In an embodiment, the structure related to the pSIM 240 may be omitted. For example, the electronic device 101 may not include a slot for accommodating the pSIM 240, and the electronic device 101 may include only the eSIM 230. In an embodiment, if the electronic device 101 does not include the slot for accommodating the pSIM 240, the electronic device 101 may not include a second protocol stack 225 and/or a pSIM-related task 217.

In an embodiment, the communication processor 220 may include various processing circuitry and control the pSIM 240 and the eSIM 230. The communication processor 230 may use the second profile included in the pSIM 240 to perform authentication with a server managed by an operator providing a second communication service. Based on an authentication result on the second communication service, the communication processor 220 may use the second communication service to perform data transmission or reception. The communication processor 220 may use the first profile stored in the eSIM 230 to perform authentication with a server managed by an operator providing the first communication service. Based on an authentication result on the first communication service, the communication processor 220 may use the first communication service to perform data transmission or reception.

In an embodiment, the communication processor 220 may include a SIM interface 221 for transmitting and/or receiving data with respect to the pSIM 240 or the eSIM 230. The communication processor 220 may support data communication between the processor 210 and the pSIM 240 or between the processor 210 and the eSIM 230 through the SIM interface 221.

In an embodiment, a first protocol stack 223 and the second protocol stack 225 may be implemented on the communication processor 220. The first protocol stack 223 and the second protocol stack 225 may include a set of protocols related to an operation of the eSIM 230 or pSIM 240. The first protocol stack 223 may include a task for confirming whether the eSIM 230 exists or a task for transmitting a polling signal to the eSIM 230 with a pre-set period. The second protocol stack 225 may include a task for confirming whether the pSIM 240 exists or a task for transmitting a polling signal to the pSIM 240 with a pre-set period. The communication processor 220 may support a plurality of protocol stacks including the first protocol stack 223 and the second protocol stack 225. One protocol stack may support at least one wireless communication technique among various communication schemes (e.g., GSM, UMTS, LTE, CDMA, and 5G).

In an embodiment, the interface 221, the first protocol stack 223, or the second protocol stack 225 may be implemented in software on the communication processor 220.

In an embodiment, a Local User Interface (LUI) 211, a Local Profile Assistant in the device (LPAd) 213, and a framework 215 may be implemented in software on the processor 210.

In an embodiment, the LUI 211 may provide a user interface related to a configuration of the first communication service that can be supported by the eSIM 230 or a management of the first profile.

According to an embodiment, the LPAd 213 may include an application for performing a management of at least one profile that can be stored in the eSIM 230. The LPAd 213 may perform a management of the first profile (e.g., various managements including installing, activating, deactivating, and modifying of the first profile, deleting of the first profile, updating of the first profile).

In an embodiment, the framework (e.g., telephone framework) 215 (e.g., the middleware 144 of FIG. 1) may provide various functions to an application so that a function provided from one or more resources of the electronic device 101 can be used by the application. The framework 215 according to an embodiment of the present disclosure may include a telephony framework capable of supporting the first communication service or the second communication service.

In an embodiment, the framework 215 may include an eSIM-related task 216 to support a function of the first communication service corresponding to the eSIM 230 and the pSIM-related task 217 running on the framework 215 to support a function of the second communication service corresponding to the pSIM 240.

The electronic device according to an example embodiment may include: a first wireless communication circuit configured to support a first communication protocol, a second wireless communication circuit configured to support a second communication protocol, at least one processor operatively coupled with the first wireless communication circuit and the second wireless communication circuit, and a memory operatively coupled with the at least one processor. The memory may store instructions which, when executed, cause the at least one processor to control the electronic device to: establish a short-range communication connection between the electronic device and an external electronic device through the first wireless communication circuit, acquire subscription information of a first profile stored in a first Subscriber Identification Module (SIM) of the external electronic device from the external electronic device through the first wireless communication circuit, transmit at least part of the subscription information to the first server through the second wireless communication circuit, acquire authentication information provided by the first server from the external electronic device through the first wireless communication circuit, transmit the authentication information to the first server through the second wireless communication circuit, acquire a second profile corresponding to the first profile from the second server associated with the first server through the second wireless communication circuit based on transmitting the authentication information to the first server, and store the second profile to a second SIM of the electronic device.

In an example embodiment, the instructions, when executed, may cause the at least one processor to control the electronic device to: request the external electronic device to provide the subscription information in response to establishing a short-range communication connection between the electronic device and the external electronic device, and acquire the subscription information from the external electronic device through the first wireless communication circuit in response to requesting the external electronic device to provide the subscription information.

In an example embodiment, the subscription information may include at least one of an International Mobile Subscriber Identity (IMSI) and a Mobile Station International Subscriber Directory Number (MISDN) of the first SIM.

In an example embodiment, the authentication information may include a One Time Password (OTP) generated in the first server.

In an example embodiment, the instructions, when executed, may cause the processor to control the electronic device to: transmit, to the first server through the second wireless communication circuit, a port number of a port of the external electronic device for receiving an IDentifier (ID) of the electronic device and the authentication information, together with at least part of the subscription information.

In an example embodiment, the second SIM may include an embedded SIM (eSIM). The eSIM may be embedded to the electronic device or may be implemented in a detachable manner.

In an example embodiment, the MSISDN included in the second profile may be identical to the MSISDN of the first SIM.

In an example embodiment, the electronic device 101 may further include a processor coupled to the second SIM. Based on the second profile being activated, the communication processor may be configured to perform communication using the activated second profile.

In an example embodiment, the instructions, when executed, may cause the processor to control the electronic device to transmit, to the first server through the second wireless communication circuit, a list of profiles stored in the second SIM including the second profile, based on storing the second profile in the second SIM of the electronic device.

The electronic device according to an example embodiment may include: a communication circuit, at least one processor operatively coupled with the communication circuit, and the memory operatively coupled with the at least one processor. The memory may store instructions which, when executed, cause the at least one processor to control the electronic device to: confirm that a physical first SIM is inserted to the electronic device, authenticate the first server and a user of the electronic device through the communication server using a first profile of the first SIM, based on performing the authenticating of the user, acquire a second profile corresponding to the first profile from the second server associated with the first server through the communication circuit, and store the second profile in a second SIM of the electronic device.

In an example embodiment, the second SIM may include an eSIM. The eSIM may be embedded to the electronic device or may be implemented in a detachable manner.

Figure 3:
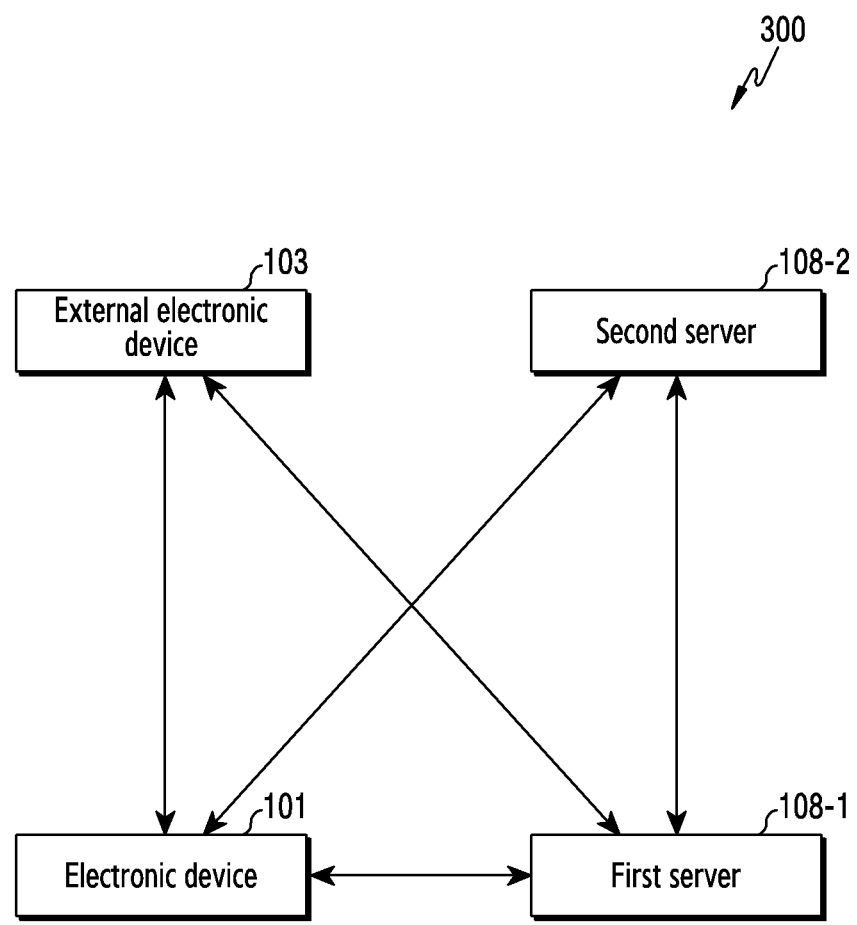
FIG. 3 is a diagram illustrating an example system for transferring a subscription according to an embodiment.

FIG. 3 is a diagram 300 illustrating an example system for transferring a subscription according to an embodiment.

Referring to FIG. 3, in an embodiment, the system for transferring the subscription may include an electronic device 101, an external electronic device 103, a first server 108-1, and a second server 108-2.

In an embodiment, a 'Universal Integrated Circuit Card (UICC)', which may refer, for example, to a smart card used by being inserted to the electronic device 101 (or the external electronic device 103), may include a chip for storing personal information such as network access authentication information, phone book, or SMS of a mobile communication subscriber, thereby enabling a use of secure mobile communication by performing subscriber authentication and traffic security key generation when accessing a mobile communication network such as GSM, WCDMA, LTE, or the like. The UICC may be equipped with a communication application of a Subscriber Identification Module (SIM), Universal SIM (USIM), or IP Multimedia SIM (ISIM) according to a type of a mobile communication network to which the subscriber has access, and may provide a high-level security function for loading various application applications such as an electronic wallet, ticketing, an electronic password, or the like.

In an embodiment, the UICC may include a detachable physical UICC (e.g., the pSIM 240 of FIG. 2) and/or eUICC (e.g., the eSIM 230 of FIG. 2) which can be inserted to or detached from the electronic device 101.

In an embodiment, the embedded UICC (eUICC) may include, for example, a security module included in the electronic device 101 in a built-in chip type, rather than in a detachable type that can be inserted to or detached from the electronic device 101. The eUICC may be installed by downloading a profile through, for example, an Over The Air (OTA) technique. The eUICC may be applied as a UICC that can be installed by downloading the profile.

In an embodiment, a method for installing the eUICC by downloading the profile through the OTA technique may also be applied to a detachable UICC that can be inserted to and detached from a terminal. For example, the eUICC may be applied not only to an eUICC fixed (or mounted) to the electronic device 101 but also an eUICC which can be installed by downloading a profile through the OTA technique and which is not fixed to the electronic device 101 (or which is movable).

In an embodiment, the UICC may include a soft SIM that can be installed by downloading a profile in a memory of the electronic device 101 through the OTA technique.

Hereinafter, the UICC may be used together with a Subscriber Identification Module (SIM), and the eUICC may be used together with an embedded SIM (eSIM).

In an embodiment, a profile may include, for example, access information used by the electronic device 101 or the external electronic device 103 to access a server (e.g., the first server 108-1) of a communication operator. In an embodiment, the profile may include, for example, and without limitation, at least one of an International Mobile Subscriber Identity (IMSI), a Mobile Station International Subscriber Directory Number (MSISDN), a value (e.g., a specific authentication key value) required in authentication for using a network provided by the server of the communication operator, an authentication token (or access token), etc. However, information included in the profile is not limited to the aforementioned example.

In an embodiment, a subscription transfer may include a transfer of a subscription of a user (or a subscriber), who owns the existing electronic device (or an electronic device currently used by a user of the electronic device 101) (e.g., the external electronic device 103) and a new electronic device (or an electronic device to be used by the user of the electronic device 101) (e.g., the electronic device 101) and who has signed up to the same (or one) communication operator (or a communication service of a communication user), from the existing electronic device to the new electronic device. For example, when the subscription is transferred from the existing electronic device to the new electronic device, part (e.g., a communication operator identity information (Mobile Country Code (MCC) and Mobile Network code (MNC)) and an MSISDN (or phone number)) of a profile of the new electronic device (or a profile to be installed in the new electronic device) may be identical to part of a profile of the existing electronic device (or a profile installed in the existing electronic device). However, the present disclosure is not limited thereto.

In an embodiment, as the aforementioned existing electronic device (or the electronic device currently used by the user of the electronic device 101), the external electronic device 103 (e.g., the electronic devices 102 and 104 of FIG. 1) may assist (or mediate) an operation of user authentication performed by the electronic device 101.

In an embodiment, the external electronic device 103 may include a SIM which stores a profile corresponding to a user of the external electronic device 103. For example, the external electronic device 103 may include a SIM which stores a profile capable of identifying the user of the external electronic device 103 with respect to a communication operator (or a server provided by the communication operator). In an embodiment, the user of the external electronic device 103 and a user of the electronic device 101 may be the same (or one) user. For example, the user of the external electronic device 103 and the user of the electronic device 101 may be the same user (or subscriber) who has signed up to a communication service (or has authorization to use the communication service) provided by the same (or one) communication operator. In an embodiment, the SIM included in the external electronic device 103 may be a physical SIM or an eSIM. Hereinafter, the SIM included in the external electronic device 103 may be referred to as a 'first SIM', and a profile stored in the first SIM may be referred to as a 'first profile'.

In an embodiment, the external electronic device 103 may be connected in communication with the electronic device 101 through, for example, a short-range wireless communication scheme. For example, the external electronic device 103 may be connected in communication with the electronic device 101 through, for example, and without limitation, a Bluetooth, Near Field Communication (NFC), or Wi-Fi direct. However, the short-range wireless communication scheme used when the external electronic device 103 is connected in communication with the electronic device 101 is not limited to the aforementioned example. In addition, a scheme in which the external electronic device 103 is connected in communication with the electronic device 101 is not limited to the short-range wireless communication scheme.

Embodiments of an operation in which the external electronic device 103 assists the operation of user authentication performed by the electronic device 101 will be described below in greater detail with reference to FIG. 4, 5, 6A and FIG. 6B.

In an embodiment, as the aforementioned new electronic device, the electronic device 101 may perform a user authentication operation with respect to a server provided by a communication operator, and thereafter may download a profile from the server provided by the communication operator. In an embodiment, the electronic device 101 may include a SIM for storing the profile to be downloaded from the communication operator (or the server provided by the communication operator). For example, the electronic device 101 may include a SIM for downloading (or storing) a profile capable of identifying a user of the electronic device 101 with respect to the communication operator. The SIM included in the electronic device 101 may be an eSIM (e.g., the eSIM 230). However, without being limited thereto, the electronic device 101 may accommodate a physical SIM (e.g., the eSIM 240) through a slot other than the eSIM. Hereinafter, the SIM included in the electronic device 101 may be referred to as a 'second SIM', and a profile to be download to the second SIM may be referred to as a 'second profile'.

Embodiments of the operation in which the electronic device 101 performs a user authentication operation with respect to the server provided by the communication operator and thereafter downloads a profile from the server provided by the communication operator will be described below in greater detail with reference to FIG. 4, 5, 6A, 6B, 7, 8, 9A, 9B, 10, 11, 12A, 12B, 13, 14A and FIG. 14B (which may be referred to hereinafter as FIGS. 4 to 14B or FIG. 4 to FIG. 14B).

In an embodiment, the first server 108-1 may include a management server and an authentication server.

In an embodiment, the management server may be a server which manages a state of a subscription, communication service, and profile. For example, the management server may include an entitlement server which controls an operation for transferring a subscription from the external electronic device 103 to the electronic device 101.

In an embodiment, the authentication server may be a server for authenticating a user of the electronic device 101. For example, the authentication server may include an Authentication Authorization Accounting (AAA) server or a Home Subscriber Server (HSS).

In an embodiment, the first server 108-1 may further include a web server. For example, the management server may control the web server so that the electronic device 101 displays a web page related to a subscription transfer.

In an embodiment, although it is illustrated by way of example in the aforementioned example that the first server 108-1 includes the management server, the authentication server, and the web server, without being limited thereto, the management server, the authentication server, and the web server may be separate servers configured independently or may be a combination of one or more servers.

In an embodiment, the second server 108-2 may be a server which manages (or generates) a profile and provides the profile to the electronic device 101. In an embodiment, the second server 108-2 may be represented as a Subscription Manager Data Preparation (SM-DP), a Subscription Management Data Preparation Plus (SM-DP+), an off-card entity of profile domain, a profile encryption server, a profile generation server, a profile provisioner (or a profile provider), or a Profile Provisioning Credentials (PPC) holder.

Hereinafter, example embodiments of a method for transferring a subscription will be described in greater detail with reference to FIG. 4 to FIG. 14B.

Figure 4:
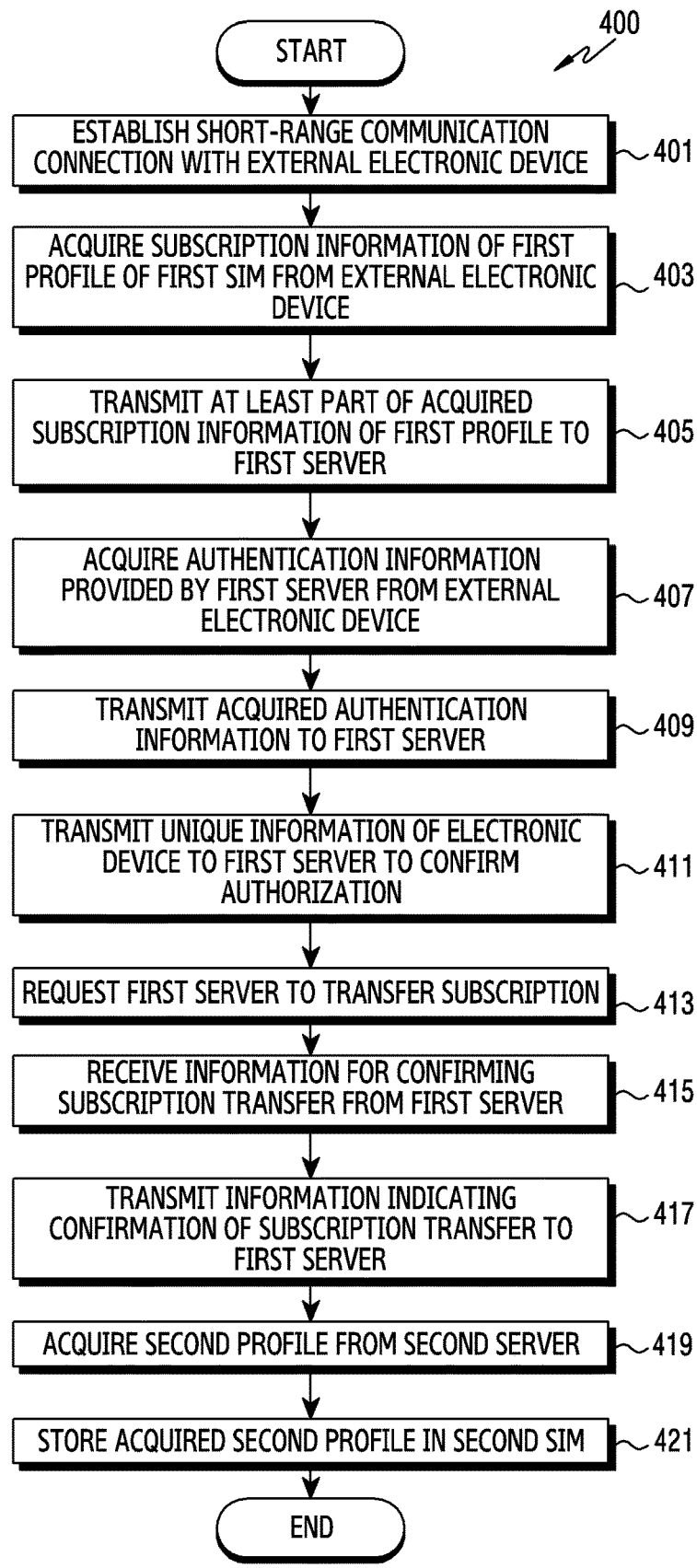
FIG. 4 is a flowchart illustrating an example method for transferring a subscription according to an embodiment.

FIG. 4 is a flowchart 400 illustrating an example method for transferring a subscription according to an embodiment.

Operations 401, 403, 405, 407, 409, 411, 413, 415, 417, 419 and 421 (which may be referred to hereinafter as operations 401 to 421) according to an embodiment may be performed in the electronic device 101 (e.g., the processor 120) of FIG. 3.

Referring to FIG. 4, in operation 401, in an embodiment, the processor 210 may establish a short-range communication connection with an external electronic device (e.g., the external electronic device 103 of FIG. 3).

In an embodiment, the processor 210 may establish the short-range communication connection with the external electronic device 103 through a first wireless communication circuit (e.g., a short-range wireless communication circuit). For example, the processor 210 may control the first wireless communication circuit (e.g., the communication module 190) so that the electronic device 101 and the external electronic device 103 are connected in communication through a Device to Device (D2D) communication connection (e.g., Bluetooth, Near Field Communication (NFC), or Wi-Fi direct). However, a short-range wireless communication scheme is not limited to the aforementioned example. For example, the processor 210 may allow the electronic device 101 and the external electronic device 103 to be connected in communication in a wired communication manner.

In an embodiment, the processor 210 may establish a short-range communication connection with the external electronic device 103 in response to receiving an input for a subscription transfer from a user. For example, the processor 210 may display, through a display (e.g., the display device 160 of FIG. 1), a configuration screen for transferring the subscription. Upon receiving an input for selecting an object (or an icon) for transferring the subscription from the user, the processor 210 may display, through the display (e.g., the display device 160), a list of the external electronic device 103 capable of establishing the short-range communication connection. The processor 210 may control the first wireless communication circuit so that the electronic device 101 and the external electronic device 103 are connected (or paired) in short-range communication, in response to an input for selecting at least one external electronic device 103 from the list of the external electronic device 103.

Although it is illustrated by way of example in an embodiment of the operation 401 that the processor 210 uses a short-range communication scheme so that the electronic device 101 and the external electronic device 103 are connected in communication, without being limited thereto, various communication schemes may be applied.

In operation 403, in an embodiment, the processor 210 may acquire subscription information of a first profile of a first SIM (or stored (or installed) in the first SIM) of the external electronic device 103 from the external electronic device 103 through the first wireless communication circuit.

In an embodiment, the subscription information of the first profile may include at least one of an IMSI and MSISDN (or phone number) corresponding to a user of the external electronic device 103. However, information included in the subscription information of the first profile is not limited to at least one of the IMSI and the MSISDN. In an embodiment, a phone number (or MSISDN) of the external electronic device 103 may be stored in a memory (or a designated region of the memory) of the external electronic device 103, and may be used alternatively or additionally as part of the subscription information of the first profile.

In an embodiment, the processor 210 may acquire the subscription information of the first profile from the external electronic device 103 through the first wireless communication circuit, in response to a short-range communication connection between the electronic device 101 and the external electronic device 103. For example, the processor 210 may request, through the first wireless communication circuit, the external electronic device 103 to provide the subscription information of the first profile, in response to the short-range communication connection between the electronic device 101 and the external electronic device 103. The processor 210 may acquire the subscription information of the first profile from the external electronic device 103 through the first wireless communication circuit, in response to requesting for the subscription information of the first profile.

In an embodiment, the first SIM may be a physical SIM inserted to the external electronic device 103 or may be an eSIM embedded to the external electronic device 103 or a soft SIM.

In operation 405, in an embodiment, the processor 210 may transmit at least part of the acquired subscription information of the first profile (e.g., at least one of the MSISDN and the IMSI) to a first server (e.g., the first server 108-1 of FIG. 3) through a second wireless communication circuit (e.g., the communication module 190).

In an embodiment, the second wireless communication circuit may be a communication circuit supporting a communication scheme (e.g., Wi-Fi) capable of connecting the electronic device 101 and the first server 108-1. In an embodiment, the second wireless communication circuit may be a communication circuit supporting a communication scheme different from that of the first wireless communication circuit. For example, the first wireless communication circuit may be a communication circuit supporting Bluetooth, and the second wireless communication circuit may be a communication circuit supporting Wi-Fi. However, without being limited thereto, the second wireless communication circuit may be a communication circuit supporting the same communication scheme as that of the first wireless communication circuit. For example, the first wireless communication circuit and the second wireless communication circuit may be communication circuits supporting Wi-Fi. In an embodiment, when the first wireless communication circuit and the second wireless communication circuit are implemented as communication circuits supporting the same communication scheme, the first wireless communication circuit and the second wireless communication circuit may be included in the same (or one) chipset or may be included as one integrated circuit.

In an embodiment, the processor 210 may identify a communication operator (or a communication operator related to the first profile), based on an MCC and MNC of an IMSI included in the subscription information of the first profile. The processor 210 may transmit, through the second wireless communication circuit, at least part of the subscription information of the first profile (e.g., at least one of the MSISDN and the IMSI) to the first server 108-1 provided by the communication operator.

In an embodiment, the processor 210 may transmit unique information of the electronic device 101 (e.g., an ID of the electronic device 101) to the first server 108-1 through the second wireless communication circuit, in addition to the at least part of the subscription information of the first profile. For example, the processor 210 may transmit an International Mobile Equipment Identity (IMEI) of the electronic device 101 to the first server 108-1 through the second wireless communication circuit, in addition to the at least part of the subscription information of the first profile. However, the unique information of the electronic device 101, which is transmitted to the first server 108-1, is not limited to the IMEI. Therefore, in addition to the IMEI, the unique information of the electronic device 101, which is transmitted to the first server 108-1, may further include at least one of a protocol version, a vendor of the electronic device 101, a model name, and a software version.

In an embodiment, in addition to the at least part of the subscription information of the first profile, the processor 210 may further transmit, to the first server 108-1 through the second wireless communication circuit, a port number of a port of the external electronic device 103 for receiving authentication information from the first server 108-1.

In an embodiment, in addition to the at least part of the subscription information of the first profile, the processor 210 may further transmit, to the first server 108-1 through the second wireless communication circuit, the unique information of the electronic device 101 and the port number of the port of the external electronic device 103 for receiving authentication information from the first server 108-1.

In operation 407, in an embodiment, the processor 210 may acquire, from the external electronic device 103 through the first wireless communication circuit, the authentication information provided by the first server 108-1.

In an embodiment, when the first server 108-1 receives the at least part of the subscription information of the first profile from the electronic device 101, the first server 108-1 may generate a One Time Password (OTP) as the authentication information. However, the authentication information that can be generated by the first server 108-1 is not limited to the OTP. The first server 108-1 may transmit the authentication information to the external electronic device 103 using at least part of the subscription information of the first profile (e.g., at least one of the MSISDN and the IMSI). For example, the first server 108-1 may confirm (or identify) a user of the electronic device 101 (or a user of the external electronic device 103) using an MSISDN or IMSI of the external electronic device 103. After confirming (or identifying) the user of the electronic device 101, the first server 108-1 may transmit the authentication information to the external electronic device 103 corresponding to the MSISDN or IMSI of the external electronic device 103. In an embodiment, when the first server 108-1 receives the port number of the port of the external electronic device 103 for receiving the authentication information from the electronic device 101, the first server 108-1 may transmit the authentication information to the port of the external electronic device 103 corresponding to the received port number. In an embodiment, the first server 108-1 may transmit a message including the authentication information to the external electronic device 103. For example, the first server 108-1 may transmit a Short Message Service (SMS) message including the authentication information to the external electronic device 103. However, a scheme in which the first server 108-1 transmits the authentication information to the external electronic device 103 is not limited to a scheme based on SMS message transmission. In an embodiment, after receiving the authentication information from the first server 108-1, the external electronic device 103 may transmit the authentication information to the electronic device 101 using a short-range communication scheme. In an embodiment, upon receiving the authentication information from the first server 108-1 through a port corresponding to a designated port number, the external electronic device 103 may transmit the received authentication information to the electronic device 101. In an embodiment, instead of receiving the authentication information from the first server 108-1 through the port corresponding to the designated port number, upon receiving authentication information having a designated format (or a message including the authentication information) from the first server 108-1, the external electronic device 103 may transmit the received authentication information to the electronic device 101.

In an embodiment, embodiments for operations between the electronic device 101 and the external electronic device 103 in the operations 401, 403, and 407 may be performed according to a designated protocol (or policy or rule).

In operation 409, in an embodiment, the processor 210 may transmit, to the first server 108-1 through the second wireless communication circuit, the authentication information acquired from the external electronic device 103.

In an embodiment, although not shown in FIG. 4, when the processor 210 transmits the authentication information to the first server 108-1, the first server 108-1 may confirm whether the authentication information received from the electronic device 101 is identical to the authentication information transmitted to the external electronic device 103. In an embodiment, if the first server 108-1 confirms that the authentication information received from the electronic device 101 is identical to the authentication information transmitted to the external electronic device 103, the processor 210 may receive, from the first server 108-1 through the second wireless communication circuit, a response indicating that authentication is complete (or successful). For example, the processor 210 may receive, from the first sever 108-1 through the second wireless communication circuit, a response including a token (or an access token) required for the electronic device 101 to access the first server 108-1.

In operation 411, in an embodiment, the processor 210 may transmit unique information of the electronic device 101 to the first server 108-1 through the second wireless communication circuit in order to confirm authorization of the electronic device 101 to access the first server 108-1 (or authorization for using a communication service provided by the first server 108-1 after accessing the first server 108-1). For example, the processor 210 may transmit an IMEI of the electronic device 101 to the first server 108-1 through the second wireless communication circuit. For another example, in addition to the IMEI of the electronic device 101, the processor 210 may further transmit at least one of a protocol version, a vendor of the electronic device 101, a model name, and a software version to the first server 108-1 through the second wireless communication circuit.

In an embodiment, when the first server 108-1 receives unique information of the electronic device 101 from the electronic device 101, the first server 108-1 may confirm whether the electronic device 101 has authorization to access the first server 108-1, based on the received unique information of the electronic device 101 (or unique information and user information of the electronic device 101). In an embodiment, if the first server 108-1 confirms that the electronic device 101 has authorization to access the first server 108-1, the first server 108-1 may transmit, to the electronic device 101, information indicating that the electronic device 101 has authorization to access the first server 108-1. In an embodiment, if the first server 108-1 confirms that the electronic device 101 has no authorization to access the first server 108-1, the first server 108-1 may transmit, to the electronic device 101, information indicating that the electronic device 101 has no authorization to access the first server 108-1, or may transmit a web page URL so that the electronic device 101 displays a web page of the first server 108-1 (e.g., a default web page of the first server 108-1).

In operation 413, in an embodiment, the processor 210 may request, through the second wireless communication circuit, the first server 108-1 to transfer a subscription. For example, the processor 210 may transmit, through the second wireless communication circuit, information requesting the first server 108-1 to transfer the subscription, in response to receiving information indicating that the electronic device 101 has authorization to access the first server 108-1 from the first server 108-1.

In operation 415, in an embodiment, the processor 210 may receive, from the first server 180-1 through the second wireless communication circuit, information for confirming the subscription transfer. For example, the processor 210 may receive, from the first server 108-1 through the second wireless communication circuit, a URL of a web page capable of allowing the electronic device 101 to display at least one of information indicating that the subscription transfer will occur, information of the external electronic device 103 (e.g., an IMEI of the external electronic device 103), information of the electronic device 101 (e.g., an IMEI of the electronic device 101), and an MSISDN of the external electronic device 103.

In an embodiment, the processor 210 may access the received URL of the web page to display, through a display (e.g., the display device 160), at least one of information indicating that the subscription transfer will occur, information of the external electronic device 103, information of the electronic device 101, and subscription information (e.g., an MSISDN) of the first profile. However, the information displayed through the received URL of the web page is not limited to the aforementioned example.

In operation 417, in an embodiment, the processor 210 may transmit, to the first server 108-1 through the second wireless communication circuit, information indicating the confirmation of the subscription transfer. For example, the processor 210 may receive a user input for confirming the subscription transfer (or for agreeing on the subscription transfer), while displaying at least one of information indicating that the subscription transfer will occur, information of the external electronic device 103, information of the electronic device 101, and subscription information (e.g., an MSISDN) of the first profile.

In an embodiment, in response to receiving the user input for agreeing on the subscription transfer, the processor 210 may transmit, to the first server 108-1 through the second wireless communication circuit, information indicating that the user confirms the subscription transfer.

Although not shown in FIG. 4, when the user of the electronic device 101 performs a procedure for agreeing on the subscription transfer at a point of sale of the communication operator (e.g., when information indicating an agreement on the subscription transfer is transmitted to the first server 108-1 using a device installed in the point of sale of the communication operator), embodiments of the operations 415 and 417 may be omitted.

In operation 419, in an embodiment, the processor 210 may acquire (or download) a second profile from the second server 108-2 through the second wireless communication circuit.

In an embodiment, an MSISDN of the second profile may be identical to an MSISDN of the first profile of the first SIM. In an embodiment, an IMSI included in the second profile may be identical to or different from an IMSI of the first profile. For example, the IMSI included in the second profile may be identical to or different from the IMSI of the first profile, according to a policy of the communication operator.

Although not shown in FIG. 4, when the first server 108-1 receives, from the electronic device 101, information indicating the confirmation of the subscription transfer, the first server 108-1 may request the second server 108-2 to generate (or prepare) a second profile. In response to receiving the request for generating the second profile from the first server 108-1, the second server 108-2 may generate the second profile. In an embodiment, the first server 108-1 and the second server 108-2 may perform communication according to a Global system for Mobile communication Association (GSMA) standard. For example, the first server 108-1 and the second server 108-2 may perform communication directly according to the GSMA standard. However, without being limited thereto, the first server 108-1 and the second server 108-2 may perform communication through a server of another communication operator. In addition, the first server 108-1 and the second server 108-2 may perform communication using a communication scheme which does not follow the GSMA standard.

In an embodiment, when the second server 108-2 completes the generation of the second profile, the first server 108-1 may transmit information which allows the electronic device 101 to display information indicating that the second server 108-2 completes the generation of the second profile. For example, when the second server 108-2 completes the generation of the second profile, the first server 108-1 may allow the electronic device 101 to display information indicating that the second server 108-2 completes the generation of the second profile through a web page, or may transmit information indicating that the second server 108-2 completes the generation of the second profile to the electronic device 101 using a push scheme. In an embodiment, when it is identified in the operation 411 that the electronic device 101 has authorization to access the first server 108-1, the first server 108-1 may register in advance (or generate in advance) information indicating that the second server 108-2 completes the generation of the second profile, which is to be transmitted to the electronic device 101 using the push scheme.

In an embodiment, the processor 210 may acquire the second profile from the second server 108-2, based on a Global System for Mobile communication Association (GSMA) SGP.22 standard.

In operation 421, in an embodiment, the processor 210 may store the acquired second profile in the second SIM.

In an embodiment, the processor 210 may store the second profile in the first SIM (e.g., the eSIM 230) through the communication processor 220.

In an embodiment, the processor 210 may install the second profile stored in the second SIM. In an embodiment, the second SIM may be an eSIM (e.g., the eSIM 230) or a soft SIM. In an embodiment, as the second SIM, the eSIM may be an eSIM fixed (or mounted) to the electronic device 101 or an eSIM not fixed to the electronic device 101 (or detachable (or movable) from the electronic device 101).

Although not shown in FIG. 4, in an embodiment, when the second profile is stored (or installed) in the second SIM, the processor 210 may transmit, to the first server 108-1 through the second wireless communication circuit, a profile list stored (or installed) in the second SIM by including the second profile. In an embodiment, the processor 210 may transmit, to the first server 108-1 through the second wireless communication circuit, information indicating that the second profile is stored (or installed) in the second SIM. In an embodiment, the first server 108-1 may deactivate (or disable) the first profile, in response to receiving from the electronic device 101 the profile list including the second profile or the information indicating that the second profile is stored in the second SIM.

In an embodiment, the processor 210 may enable (or activate) the second profile of the second SIM connected to the communication processor 220. In an embodiment, the processor 210 or the communication processor 220 may use a network (e.g., a cellular network) provided by the communication operator related to the first server 108-1, using the activated second profile.

Although not shown in FIG. 4, embodiments of the authentication operation performed through the external electronic device 103 connected in short-range communication with the electronic device 101 may be replaced with embodiments of an authentication operation performed through a cloud server connected in communication with the electronic device 101. For example, the processor 120 may acquire subscription information of the first profile stored in the first SIM from the cloud server connected in communication with the electronic device 101. Upon acquiring the subscription information of the first profile from the cloud server, the processor 210 may transmit at least part of the subscription information to the first server 108-1, and acquire authentication information provided by the first server 108-1 from the cloud server, and transmit the acquired authentication information to the first server 108-1 to perform the authentication operation. Detailed embodiments for the authentication operation through the cloud server connected in communication with the electronic device 101 will be omitted since they are at least in part identical or similar to embodiments of the authentication operation performed through the external electronic device 103 connected in short-range communication with the electronic device 101.

Figure 5:
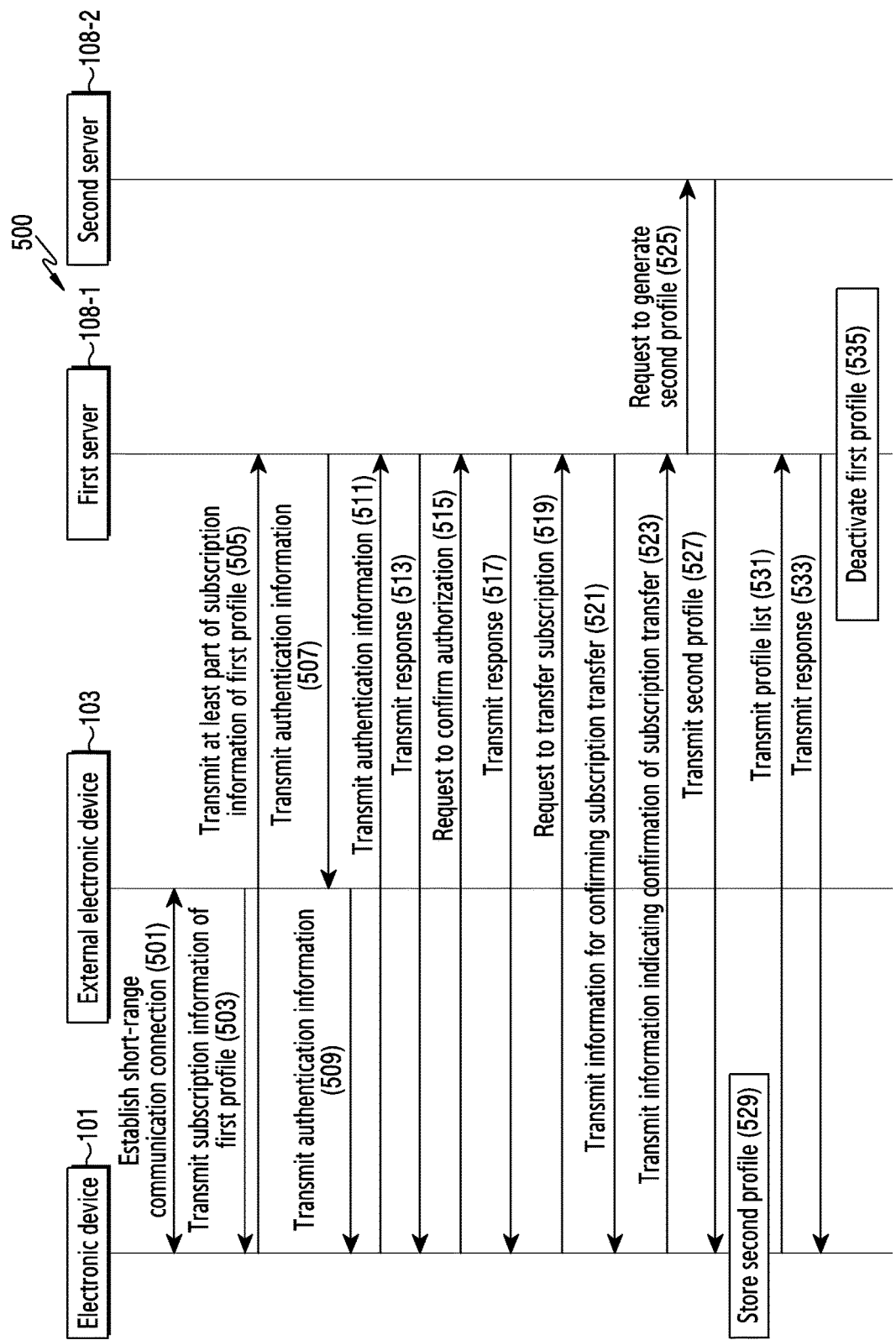
FIG. 5 is a signal flow diagram illustrating an example method for transferring a subscription according to an embodiment.

FIG. 5 is a signal flow diagram 500 illustrating an example system and an example method for transferring a subscription according to an embodiment. For example, FIG. 5 may illustrate example embodiments of operations of FIG. 4 for the electronic device 101 on a system (e.g., the electronic device 101, the external electronic device 103, the first server 108-1, and the second server 108-2).

Referring to FIG. 5, in operation 501, in an embodiment, the electronic device 101 and the external electronic device 103 may establish a short-range communication connection. For example, the electronic device 101 and the external electronic device 103 may be connected through Device to Device (D2D) communication (e.g., Bluetooth, Near Field Communication (NFC), or Wi-Fi direct).

In operation 503, in an embodiment, the electronic device 101 may acquire subscription information of a first profile of a first SIM (or stored (or installed) in the first SIM) of the external electronic device 103 transmitted from the external electronic device 103 through a first wireless communication circuit supporting a short-range wireless communication scheme.

In an embodiment, the subscription information of the first profile may include at least one of an IMSI and MSISDN (or phone number) corresponding of a user of the external electronic device 103. However, information included in the subscription information of the first profile is not limited to at least one of the IMSI and the MSISDN.

In operation 505, in an embodiment, the electronic device 101 may transmit at least part of the subscription information (e.g., MSISDN or IMSI) of the first profile to the first server 108-1 through a second wireless communication circuit.

In an embodiment, the second wireless communication circuit may be a communication circuit supporting a communication scheme (e.g., Wi-Fi) capable of connecting the electronic device 101 and the first sever 108-1.

In an embodiment, the electronic device 101 may transmit unique information of the electronic device 101 (e.g., an ID of the electronic device 101) to the first server 108-1 through the second wireless communication circuit, in addition to the at least part of the subscription information of the first profile. For example, the processor 210 may transmit an International Mobile Equipment Identity (IMEI) of the electronic device 101 to the first server 108-1 through the second wireless communication circuit, in addition to the at least part of the subscription information of the first profile. However, the unique information of the electronic device 101, which is transmitted to the first server 108-1), is not limited to the IMEI. Therefore, in addition to the IMEI, the unique information of the electronic device 101, which is transmitted to the first server 108-1, may further include at least one of a protocol version, a vendor of the electronic device 101, a model name, and a software version.

In an embodiment, in addition to the at least part of the subscription information of the first profile, the electronic device 101 may further transmit, to the first server 108-1 through the second wireless communication circuit, a port number of a port of the external electronic device 103 for receiving authentication information from the first server 108-1.

In an embodiment, in addition to the at least part of the subscription information of the first profile, the electronic device 101 may further transmit, to the first server 108-1 through the second wireless communication circuit, the unique information of the electronic device 101 and the port number of the port of the external electronic device 103 for receiving authentication information from the first server 108-1.

In operation 507, in an embodiment, the first server 108-1 may transmit the authentication information to the external electronic device 103 using the MSISDN or IMSI of the external electronic device 103.

In an embodiment, when the first server 108-1 receives the at least part of the subscription information of the first profile from the electronic device 101, the first server 108-1 may generate a One Time Password (OTP) as the authentication information. However, the authentication information that can be generated by the first server 108-1 is not limited to the OTP.

In an embodiment, when the first server 108-1 receives the port number of the port of the external electronic device 103 for receiving the authentication information from the electronic device 101, the first server 108-1 may transmit the authentication information to the port of the external electronic device 103 corresponding to the received port number. In an embodiment, the first server 108-1 may transmit a message including the authentication information to the external electronic device 103. For example, the first server 108-1 may transmit a Short Message Service (SMS) message including the authentication information to the external electronic device 103. However, a scheme in which the first server 108-1 transmits the authentication information to the external electronic device 103 is not limited to a scheme based on SMS message transmission.

In operation 509, in an embodiment, after receiving the authentication information from the first server 108-1, the external electronic device 103 may transmit the authentication information to the electronic device 101 using a short-range communication scheme.

In operation 511, in an embodiment, the electronic device 101 may transmit, to the first server 108-1 through a second wireless communication circuit, the authentication information acquired from the external electronic device 103.

In operation 513, in an embodiment, the first server 108-1 may transmit a response to the electronic device 101, in response to receiving the authentication information.

In an embodiment, although not shown in FIG. 5, when the electronic device 101 transmits the authentication information to the first server 108-1, the first server 108-1 may confirm whether the authentication information received from the electronic device 101 is identical to the authentication information transmitted to the external electronic device 103. In an embodiment, if the first server 108-1 confirms that the authentication information received from the electronic device 101 is identical to the authentication information transmitted to the external electronic device 103, the first server 108-1 may transmit, to the electronic device 101, a response indicating that authentication is complete (or successful). For example, the first server 108-1 may transmit, to the electronic device 101, a response including a token (or an access token) required for the electronic device 101 to access the first server 108-1.

In operation 515, in an embodiment, the electronic device 101 may transmit unique information of the electronic device 101 to the first server 108-1 through the second wireless communication circuit in order to request to confirm authorization of the electronic device 101 to access the first server 108-1 (or authorization for using a communication service provided by the first server 108-1 after accessing the first server 108-1). For example, the electronic device 101 may transmit an IMEI of the electronic device 101 to the first server 108-1 through the second wireless communication circuit. For another example, in addition to the IMEI of the electronic device 101, the electronic device 101 may further transmit at least one of a protocol version, a vendor of the electronic device 101, a model name, and a software version to the first server 108-1 through the second wireless communication circuit.

In operation 517, in an embodiment, upon receiving the unique information of the electronic device 101 from the electronic device 101, the first server 108-1 may transmit a response to the electronic device 101.

In an embodiment, upon receiving the unique information of the electronic device 101 from the electronic device 101, the first server 108-1 may confirm whether the electronic device 101 has authorization to access the first server 108-1, based on the received unique information of the electronic device 101. In an embodiment, if the first server 108-1 confirms that the electronic device 101 has authorization to access the first server 108-1, the first server 108-1 may transmit, to the electronic device 101, information indicating that the electronic device 101 has authorization to access the first server 108-1. In an embodiment, if the first server 108-1 confirms that the electronic device 101 has no authorization to access the first server 108-1, the first server 108-1 may transmit, to the electronic device 101, information indicating that the electronic device 101 has no authorization to access the first server 108-1, or may transmit a web page URL so that the electronic device 101 displays a web page of the first server 108-1.

In operation 519, in an embodiment, the electronic device 101 may request, through the second wireless communication circuit, the first server 108-1 to transfer a subscription. For example, the electronic device 101 may transmit, through the second wireless communication circuit, information requesting the first server 108-1 to transfer the subscription, in response to receiving information indicating that the electronic device 101 has authorization to access the first server 108-1 from the first server 108-1.

In operation 521, in an embodiment, the first server 108-1 may transmit information for confirming the subscription transfer to the electronic device 101. For example, the first server 108-1 may transmit, to the electronic device 101, a URL of a web page capable of allowing the electronic device 101 to display at least one of information indicating that the subscription transfer will occur, information of the external electronic device 103 (e.g., an IMEI of the external electronic device 103), information of the electronic device 101 (e.g., an IMEI of the electronic device 101), and an MSISDN of the external electronic device 103.

In operation 523, in an embodiment, the electronic device 101 may transmit, to the first server 108-1, information indicating the confirmation of the subscription transfer.

In an embodiment, the electronic device 101 may access the received URL of the web page to display, through a display (e.g., the display device 160 of FIG. 1), at least one of information indicating that the subscription transfer will occur, information of the external electronic device 103, information of the electronic device 101, and an MSISDN of the external electronic device 103. However, information displayed through the received URL of the web page is not limited to the aforementioned example.

In an embodiment, the electronic device 101 may receive a user input for confirming the subscription transfer (or for agreeing on the subscription transfer), while displaying at least one of information indicating that the subscription transfer will occur, information of the external electronic device 103, information of the electronic device 101, and an MSISDN of the external electronic device 103.

In an embodiment, in response to receiving the user input for agreeing on the subscription transfer, the electronic device 101 may transmit, to the first server 108-1 through the second wireless communication circuit, information indicating that the user confirms the subscription transfer.

In operation 525, in an embodiment, when the first server 108-1 receives, from the electronic device 101, information indicating the confirmation of the subscription transfer, the first server 108-1 may request the second server 108-2 to generate (or prepare) a second profile.

In operation 527, in an embodiment, in response to receiving the request for generating the second profile from the first server 108-1, the second server 108-2 may generate the second profile, and may transmit the generated second profile to the electronic device 101.

In an embodiment, when the user of the electronic device 101 performs a procedure related to the operation for generating the second profile by visiting the point of sale of the communication operator before performing embodiments of the operations 525 and 527 (e.g., when the first server 108-1 is requested to generate the second profile using a device installed in the point of sale of the communication operator), embodiments related to the generation in the operations 525 and 527 may be omitted. For example, the first server 108-1 may transmit a second profile transmission request to the second server 108-2. The second server 108-2 may transmit the second profile to the electronic device 101, in response to receiving the second profile transmission request.

In operation 529, in an embodiment, the electronic device 101 may acquire (or download) the second profile from the second server 108-2 through the second wireless communication circuit, and may store the acquired second profile in a second SIM.

In operation 531, in an embodiment, when the second profile is stored (or installed) in the second SIM, the electronic device 101 may transmit, to the first server 108-1 through the second wireless communication circuit, a profile list stored (or installed) in the second SIM by including the second profile. In an embodiment, the electronic device 101 may transmit, to the first server 108-1 through the second wireless communication circuit, information indicating that the second profile is stored (or installed) in the second SIM.

In operation 533, in an embodiment, the first server 108-1 may transmit a response to the electronic device 101, in response to the received profile list or information indicating that the second profile is stored in the second SIM.

In operation 535, in an embodiment, the first server 108-1 may deactivate (or disable) the first profile, in response to receiving from the electronic device 101 the profile list including the second profile or the information indicating that the second profile is stored in the second SIM.

Although not shown in FIG. 5, in an embodiment, the electronic device 101 may activate the second profile of the second SIM connected to the communication processor 220. For example, the electronic device 101 may activate the second profile of the second SIM after receiving a response signal from the first server 108-1 in operation 533. In an embodiment, using the activated second profile, the electronic device 101 may use a network (e.g., a cellular network) provided by a communication operator related to the first server 108-1.

Figure 6A:
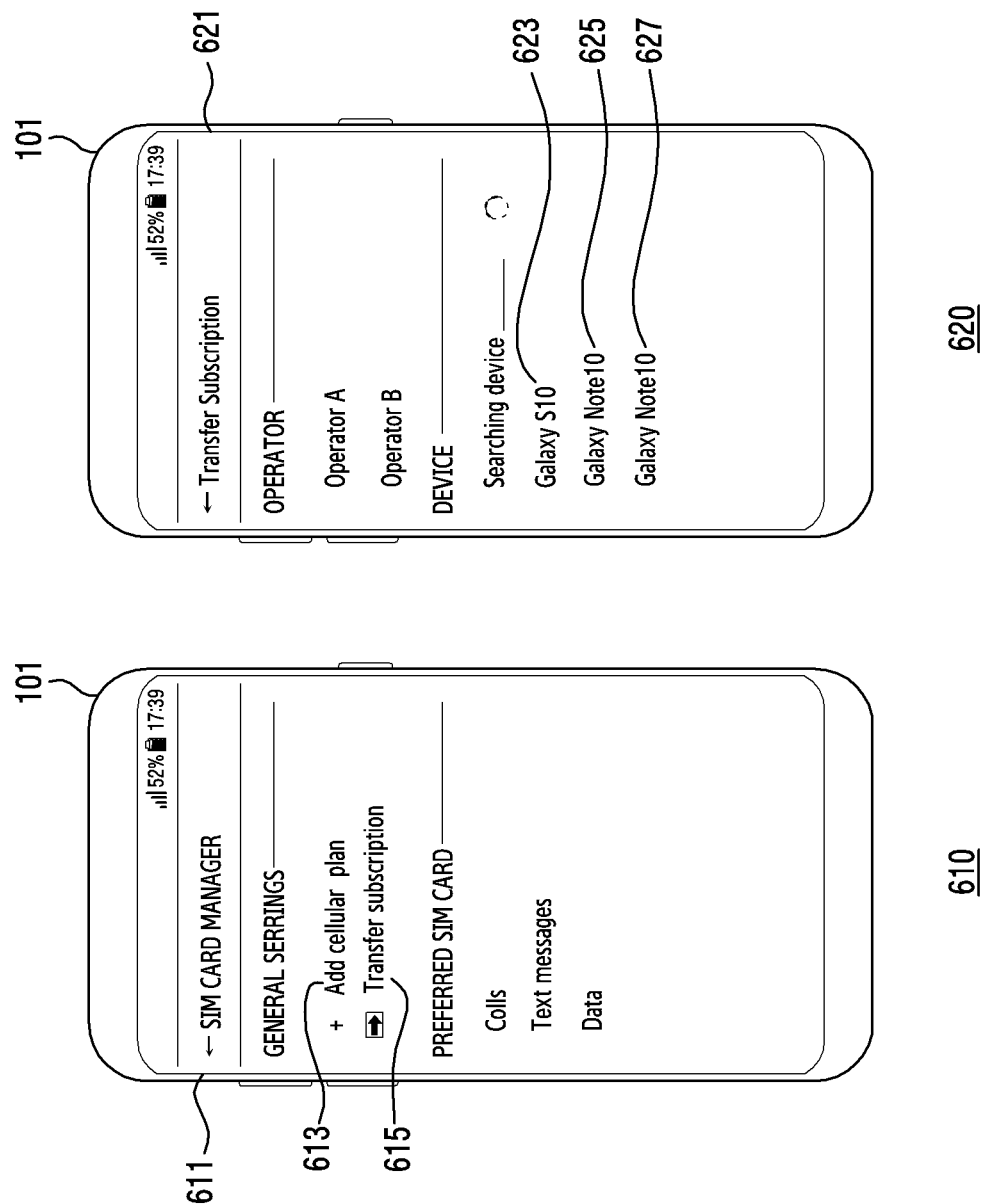
FIG. 6A is a diagram illustrating an example method for transferring a subscription according to an embodiment.
Figure 6B:
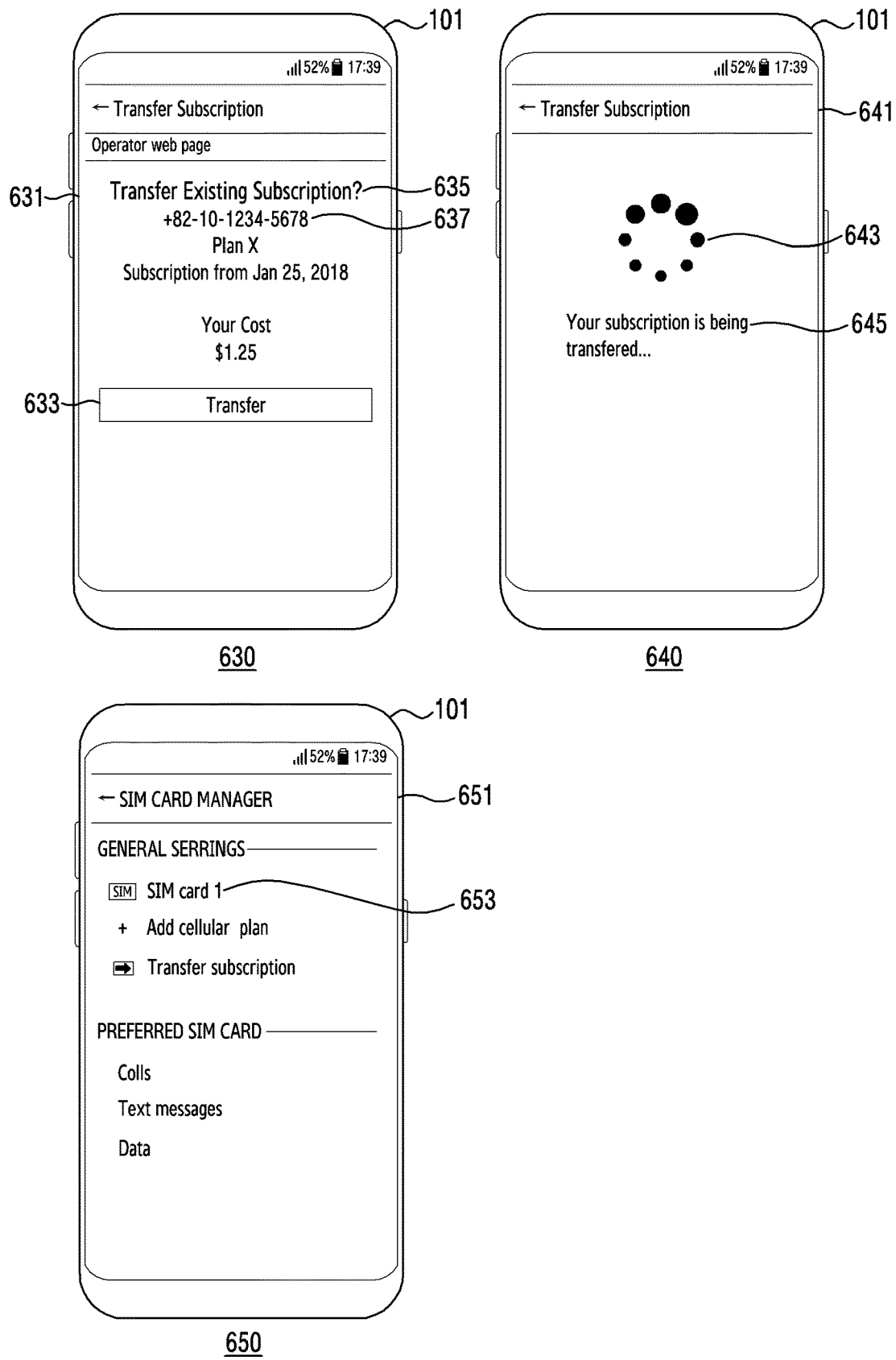
FIG. 6B is a diagram illustrating an example method for transferring a subscription according to an embodiment.

FIG. 6A and FIG. 6B are diagrams illustrating an example method for transferring a subscription according to an embodiment. For example, FIG. 6A and FIG. 6B may be diagrams illustrating an example user interface screen related to embodiments of operations of FIG. 4.

In an embodiment, operations of FIG. 6A and FIG. 6B may be performed in the electronic device 101 (e.g., the processor 120) of FIG. 3.

Referring to FIG. 6A and FIG. 6B, in example 610, in an embodiment, the processor 210 may display, through a display (e.g., the display device 160 of FIG. 1), a configuration screen 611 related to a subscription transfer. In the example 610, in an embodiment, an object 613 may be an object mapped to a function for adding a subscription (or for signing up to a new subscription). An object 615 may be an object mapped to a function for transferring the subscription.

In example 620, in response to receiving an input for the object 613 from a user, the processor 210 may display, through the display (e.g., the display device 160), a screen 621 including objects 623, 625, and 627 indicating the external electronic devices 103 that can be connected in short-range communication with the electronic device 101.

In an embodiment, upon selecting at least one object 623 among the objects 623, 625, and 627 indicating the external electronic devices 103 that can be connected in short-range communication with the electronic device 101, a connection may be established in short-range communication with at least one external electronic device 103 corresponding to the selected at least one object 623.

In an embodiment, in response to the connection in short-range communication between the electronic device 101 and the external electronic device 103 (e.g., the external electronic device 103 corresponding to the object 623), the processor 210 may request, through a first wireless communication circuit, the external electronic device 103 to provide subscription information of a first profile. In response to the request for the subscription information of the first profile, the processor 210 may acquire subscription information of the first profile from the external electronic device 103 through the first wireless communication circuit.

In example 630, in an embodiment, the processor 210 may display, through a display (e.g., the display device 160), a screen 631 including information for confirming a subscription transfer, based on information received from the first server 108-1. For example, the processor 210 may display, through the display (e.g., the display device 160), a text 635 for inquiring whether to transfer a subscription of the electronic device 101, subscription information (e.g., an MSISDN) 637 of the first profile, and an object 633 for receiving an input for confirming the subscription transfer of the electronic device.

In example 640, in an embodiment, in response to receiving an input for the object 633 from the user, the processor 210 may display, through the display (e.g., the display device 160), a screen 641 indicating that the subscription transfer is in preparation (or an operation for generating the second profile for the subscription transfer is running) For example, the processor 210 may display, through the display (e.g., the display device 160), the screen 641 including an object 643 and text 645 indicating that the subscription transfer is in preparation.

In example 650, in an embodiment, upon completion of an operation of acquiring the second profile from the second server 108-2 and storing (or installing) the second profile in the second SIM, the processor 210 may display, through the display (e.g., the display device 160), a screen 651 including an object 653 indicating that the second profile is stored in the second SIM. For example, comparing the examples 610 and 650, the processor 210 may further display an object 653 indicating that the screen 651 stores the second profile in comparison with the screen 611.

Figure 7:
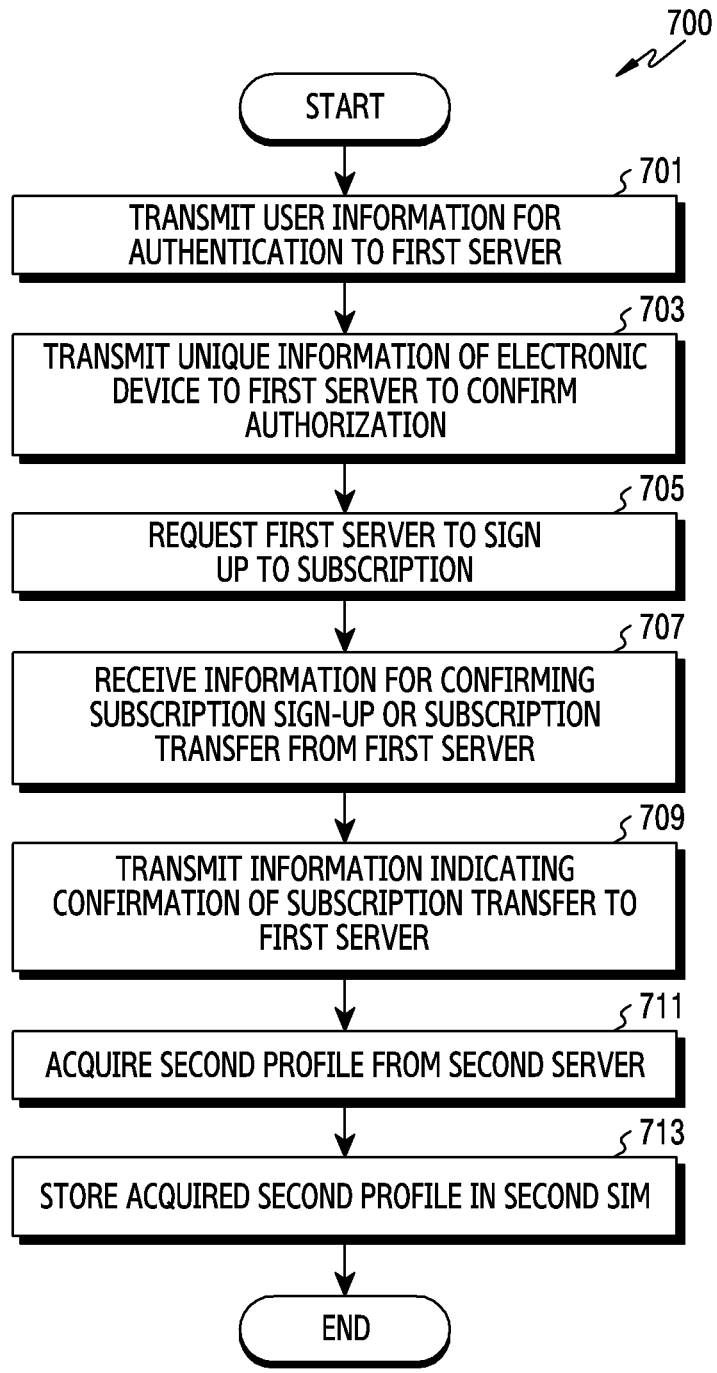
FIG. 7 is a flowchart illustrating an example method for transferring a subscription according to an embodiment.

FIG. 7 is a flowchart 700 illustrating an example method for transferring a subscription according to an embodiment.

In an embodiment, operations 701, 703, 705, 707, 709, 711 and 713 (which may be referred to hereinafter as operations 701 to 713) may be performed in an electronic device (e.g., the processor 120) of FIG. 3.

In FIG. 7, it may be assumed that a user of the electronic device 101 is in a state of being signed up to a communication operator (or a server for using a network provided by the current (or existing) communication operator), and may confirm that a subscription of a first profile corresponding to sign-up information for the communication operator is in a state of being activated in the first server 108-1. For example, in embodiments of FIG. 7, it may be assumed that there is a first SIM (or the external electronic device 103 to which the first SIM is inserted or embedded) and a subscription of the first profile is in an active state in the first server 108-1. However, without being limited thereto, embodiments of FIG. 7 may include a case where the subscription of the first profile is in an active state in the first server 108-1 even if the first SIM storing the first profile is separated from the external electronic device 103 or is not embedded to the external electronic device 103.

Referring to FIG. 7, in operation 701, in an embodiment, the processor 210 may transmit user information for authenticating the user of the electronic device 101 to a first server (e.g., the first server 108-1 of FIG. 3) through a communication circuit (e.g., the communication module 190 of FIG. 1).

In an embodiment, for authentication using an authentication scheme defined in Open Authentication (OAuth), the processor 210 may transmit user information to the first server 108-1 through the communication circuit. For example, the processor 210 may transmit, to the first server 108-1 through the communication circuit, an account (e.g., ID) and password which are registered in the first server 108-1. However, the authentication scheme for authenticating the user of the electronic device 101 is not limited to the OAuth.

In an embodiment, after receiving from a user an input for signing up to a subscription (or signing up to a new subscription) for a communication operator and selecting the communication operator, the processor 210 may transmit user information for authenticating the user of the electronic device 101 to the first server through a communication circuit (e.g., the communication module 190). For example, the processor 210 may display, through a display (e.g., the display device 160 of FIG. 1), a screen including an object for selecting the subscription sign-up for the communication operator. Upon receiving from the user the input for the object for selecting the subscription sign-up for the communication operator, the processor 210 may display, through the display (e.g., the display device 160), a screen including an object for selecting a communication operator. Upon receiving an input for inputting user information (e.g., the account and password registered in the first server 108-1) after receiving the input for the object for selecting the communication operator, the processor 210 may transmit, to the first server 108-1 through the communication circuit, the user information for authenticating the user of the electronic device 101.

Although not shown in FIG. 7, when the processor 210 transmits the user information, the first server 108-1 may confirm whether the user information received from the electronic device 101 is identical to the user information registered in the first server 108-1. In an embodiment, if the first server 108-1 confirms that the user information received from the electronic device 101 is identical to the user information registered in the first server 108-1, the processor 210 may receive, from the first server 108-1 through the communication circuit, a response indicating that authentication is complete (or successful). For example, the processor 210 may receive, from the first server 108-1 through the communication circuit, a response including a token (or an access token) by which the electronic device 101 accesses the first server 108-1.

In operation 703, in an embodiment, the processor 210 may transmit unique information of the electronic device 101 to the first server 108-1 through the wireless communication circuit in order to confirm authorization of the electronic device 101 to access the first server 108-1 (or authorization for using a communication service provided by the first server 108-1 after accessing the first server 108-1). For example, the processor 210 may transmit an IMEI of the electronic device 101 to the first server 108-1 through the second wireless communication circuit. For another example, in addition to an IMEI of the electronic device 101, the processor 210 may further transmit at least one of a protocol version, a vendor of the electronic device 101, a model name, and a software version to the first server 108-1 through the second wireless communication circuit.

In an embodiment, when the first server 108-1 receives the unique information of the electronic device 101 from the electronic device 101, the first server 108-1 may confirm whether the electronic device 101 has authorization to access the first server 108-1, based on the received unique information of the electronic device 101. In an embodiment, if the first server 108-1 confirms that the electronic device 101 has authorization to access the first server 108-1, the first server 108-1 may transmit, to the electronic device 101, information indicating that the electronic device 101 has authorization to access the first server 108-1. In an embodiment, if the first server 108-1 confirms that the electronic device 101 has no authorization to access the first server 108-1, the first server 108-1 may transmit, to the electronic device 101, information indicating that the electronic device 101 has no authorization to access the first server 108-1, or may transmit a web page URL so that the electronic device 101 displays a web page of the first server 108-1.

In operation 705, in an embodiment, the processor 210 may request, through the communication circuit, the first server 108-1 to sign up to a subscription. For example, the processor 210 may transmit, through the communication circuit, information requesting the first server 108-1 to sign up to the subscription in response to receiving information indicating that the electronic device 101 has authorization to access the first server 108-1 from the first server 108-1.

In operation 707, in an embodiment, the processor 210 may receive, from the first server 180-1 through the communication circuit, information for confirming the subscription sign-up or the subscription transfer. For example, the processor 210 may receive, from the first server 108-1 through the communication circuit, information for confirming (or selecting) whether to sign up to a new subscription to a communication operator or to transfer a subscription from the external electronic device 103 to the electronic device 101. Upon receiving the information for confirming whether to sign up to the new subscription for the communication operator or whether to transfer the subscription from the external electronic device 103 to the electronic device 101, the processor 210 may display, through a display (e.g., the display device 160), the received information. In an embodiment, the processor 210 may display, through the display (e.g., the display device 160), a web page including at least one of information indicating that the subscription can be transferred from the external electronic device 103 to the electronic device 101, information of the external electronic device 103 (e.g., an IMEI of the external electronic device 103), information of the electronic device 101 (e.g., an IMEI of the electronic device 101), and an MSISDN of the external electronic device 103, together with an object for signing up to the new subscription for the communication operator and an object for transferring the subscription. However, the information displayed through the web page is not limited to the aforementioned example.

Although not shown in FIG. 7, if the user of the electronic device 101 is authenticated through operation 701 or if it is identified that the electronic device 101 (and/or the user of the electronic device 101) has authorization through operation 703, the first server 108-1 may confirm that the user of the electronic device 101 is in a state of being signed up to a communication operator (or a server for using a network provided by the communication operator), and may confirm that a subscription of a first profile corresponding to sign-up information for the communication operator is in a state of being activated in the first server 108-1. In an embodiment, upon identifying that the subscription of the first profile corresponding to the sign-up information for the communication operator is in the state of being activated in the first server 108-1, the first server 108-1 may transmit, to the electronic device 101, not only the information for confirming the subscription sign-up but also information for confirming (or inducing) the subscription transfer, so that the user of the electronic device 101 can recognize a presence of a first profile corresponding to the sign-up information for the communication operator.

In operation 709, in an embodiment, the processor 210 may transmit, to the first server 108-1 through the communication circuit, information indicating the confirmation of the subscription transfer to the first server 108-1. For example, the processor 210 may receive a user input for agreeing on the subscription transfer (e.g., for selecting an object for the subscription transfer). In response to receiving the user input for agreeing on the subscription transfer, the processor 210 may transmit, to the first server 108-1 through the communication circuit, information indicating that the user confirms the subscription transfer. Although not shown in FIG. 7, the processor 210 may receive a user input for signing up to a new subscription for the communication operator (e.g., for selecting an object for singing up to the new subscription to the communication operator). Upon receiving the user input for signing up to the new subscription for the communication operator, the processor 210 may transmit a subscription sign-up request to the first server 108-1 through the communication circuit.

In operation 711, in an embodiment, the processor 210 may acquire (or download) a second profile from the second server 108-2 through the communication circuit.

In operation 713, in an embodiment, the processor 210 may store the acquired second profile in a second SIM.

Since embodiments of operations 711 and 713 are at least in part identical or similar to embodiments of operations 419 and 412, detailed descriptions thereof may not be repeated here.

Although not shown in FIG. 7, in an embodiment, when the processor 210 transmits a subscription sign-up request to the first server 108-1 through the communication circuit, the processor 210 may acquire a third profile from the second server 108-2 and store (and install) the third profile in the second SIM. In an embodiment, the third profile may be different from the first profile and the second profile. For example, subscription information (e.g., an MSISDN) of the third profile may be different from subscription information of the first profile and second profile.

Figure 8:
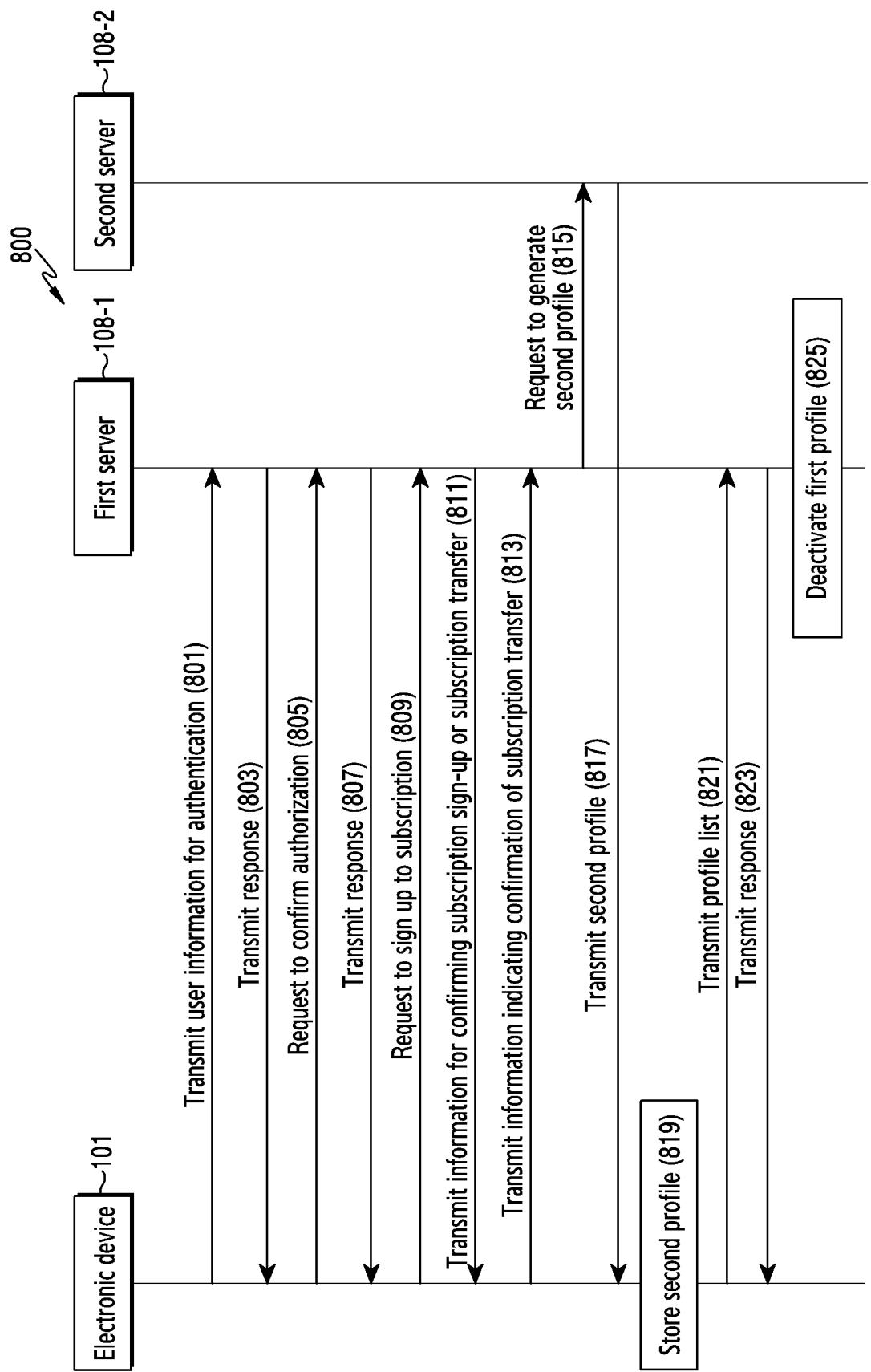
FIG. 8 is a signal flow diagram illustrating an example method for transferring a subscription according to an embodiment.

FIG. 8 is a signal flow diagram 800 illustrating an example system and illustrating an example method for transferring a subscription according to an embodiment. For example, FIG. 8 may be a diagram illustrating example embodiments of operations of FIG. 5 for the electronic device 101 on a system (e.g., the electronic device 101, the first server 108-1, and the second server 108-2).

Referring to FIG. 8, in operation 801, in an embodiment, the processor 210 may transmit user information for authenticating the user of the electronic device 101 to the first server 108-1 through a communication circuit. In an embodiment, for authentication using an authentication scheme defined in Open Authentication (OAuth), the processor 210 may transmit user information to the first server 108-1 through the communication circuit.

In operation 803, in an embodiment, upon receiving the user information from the electronic device 101, the first server 108-1 may transmit a response to the electronic device 101.

In an embodiment, in response to receiving the user information from the electronic device 101, the first server 108-1 may confirm whether the user information received from the electronic device 101 is identical to the user information registered in the first server 108-1. In an embodiment, if the first server 108-1 confirms that the user information received from the electronic device 101 is identical to the user information registered in the first server 108-1, the first server 108-1 may transmit, to the first server 108-1, a response indicating that authentication is complete (or successful).

In operation 805, in an embodiment, the electronic device 101 may transmit unique information of the electronic device 101 to the first server 108-1 through the communication circuit in order to request to confirm authorization of the electronic device 101 to access the first server 108-1 (or authorization for using a communication service provided by the first server 108-1 after accessing the first server 108-1).

In operation 807, in an embodiment, when the first server 108-1 receives the unique information of the electronic device 101 from the electronic device 101, the first server 108-1 may transmit a response to the electronic device 101.

In an embodiment, the first server 108-1 may confirm whether the electronic device 101 has authorization to access the first server 108-1, based on the received unique information of the electronic device 101. In an embodiment, if the first server 108-1 confirms that the electronic device 101 has authorization to access the first server 108-1, the first server 108-1 may transmit, to the electronic device 101, information indicating that the electronic device 101 has authorization to access the first server 108-1. In an embodiment, if the first server 108-1 confirms that the electronic device 101 has no authorization to access the first server 108-1, the first server 108-1 may transmit, to the electronic device 101, information indicating that the electronic device 101 has no authorization to access the first server 108-1, or may transmit a web page URL so that the electronic device 101 displays a web page of the first server 108-1.

In operation 809, in an embodiment, the electronic device 101 may request, through the communication circuit, the first server 108-1 to sign up to a subscription. For example, the electronic device 101 may transmit, through the communication circuit, information requesting the first server 108-1 to sign up to the subscription, in response to receiving information indicating that the electronic device 101 has authorization to access the first server 108-1 from the first server 108-1.

In operation 811, in an embodiment, the first server 108-1 may transmit, to the electronic device 101, information for confirming the subscription sign-up or the subscription transfer. For example, the first server 108-1 may transmit information for confirming (or selecting) whether the electronic device 101 signs up to a new subscription to a communication operator or whether to transfer a subscription from the external electronic device 103 to the electronic device 101.

In an embodiment, if the user of the electronic device 101 is authenticated through operations 801 and 803 or if it is identified that the electronic device 101 (and/or the user of the electronic device 101) has authorization through operations 805 and 807, the first server 108-1 may confirm that the user of the electronic device 101 is in a state of being signed up to a communication operator (or a server for using a network provided by the communication operator), and may confirm that a subscription of a first profile corresponding to sign-up information for the communication operator is in a state of being activated in the first server 108-1. In an embodiment, upon identifying that the subscription of the first profile corresponding to the sign-up information for the communication operator is in the state of being activated in the first server 108-1, the first server 108-1 may transmit, to the electronic device 101, not only the information for confirming the subscription sign-up but also information for confirming (or inducing) the subscription transfer, so that the user of the electronic device 101 can recognize a presence of a first profile corresponding to the sign-up information for the communication operator.

In operation 813, in an embodiment, the electronic device 101 may transmit, to the first server 108-1 through the communication circuit, information indicating the confirmation of the subscription transfer. For example, the electronic device 101 may receive a user input for agreeing on the subscription transfer. In response to receiving the user input for agreeing on the subscription transfer, the processor 210 may transmit, to the first server 108-1 through the communication circuit, information indicating that the user confirms the subscription transfer.

In operation 815, in an embodiment, when the first server 108-1 receives, from the electronic device 101, information indicating the confirmation of the subscription transfer, the first server 108-1 may request the second server 108-2 to generate (or prepare) a second profile.

In operation 817, in an embodiment, in response to receiving the request for generating the second profile from the first server 108-1, the second server 108-2 may generate the second profile, and may transmit the generated second profile to the electronic device 101.

In an embodiment, when the user of the electronic device 101 performs a procedure related to the operation for generating the second profile by visiting the point of sale of the communication operator before performing embodiments of operations 815 and 817, embodiments related to the generation in operations 815 and 817 may be omitted.

In operation 819, in an embodiment, the electronic device 101 may acquire (or download) the second profile from the second server 108-2 through the second wireless communication circuit, and may store the acquired second profile in a second SIM.

In operation 821, in an embodiment, when the second profile is stored (or installed) in the second SIM, the electronic device 101 may transmit, to the first server 108-1 through the second wireless communication circuit, a profile list stored (or installed) in the second SIM by including the second profile. In an embodiment, the electronic device 101 may transmit, to the first server 108-1 through the second wireless communication circuit, information indicating that the second profile is stored (or installed) in the second SIM.

In operation 823, in an embodiment, the first server 108-1 may transmit a response to the electronic device 101, in response to the received profile list or information indicating that the second profile is stored in the second SIM.

In operation 825, in an embodiment, the first server 108-1 may deactivate (or disable) the first profile, in response to receiving from the electronic device 101 the profile list including the second profile or the information indicating that the second profile is stored in the second SIM.

Figure 9A:
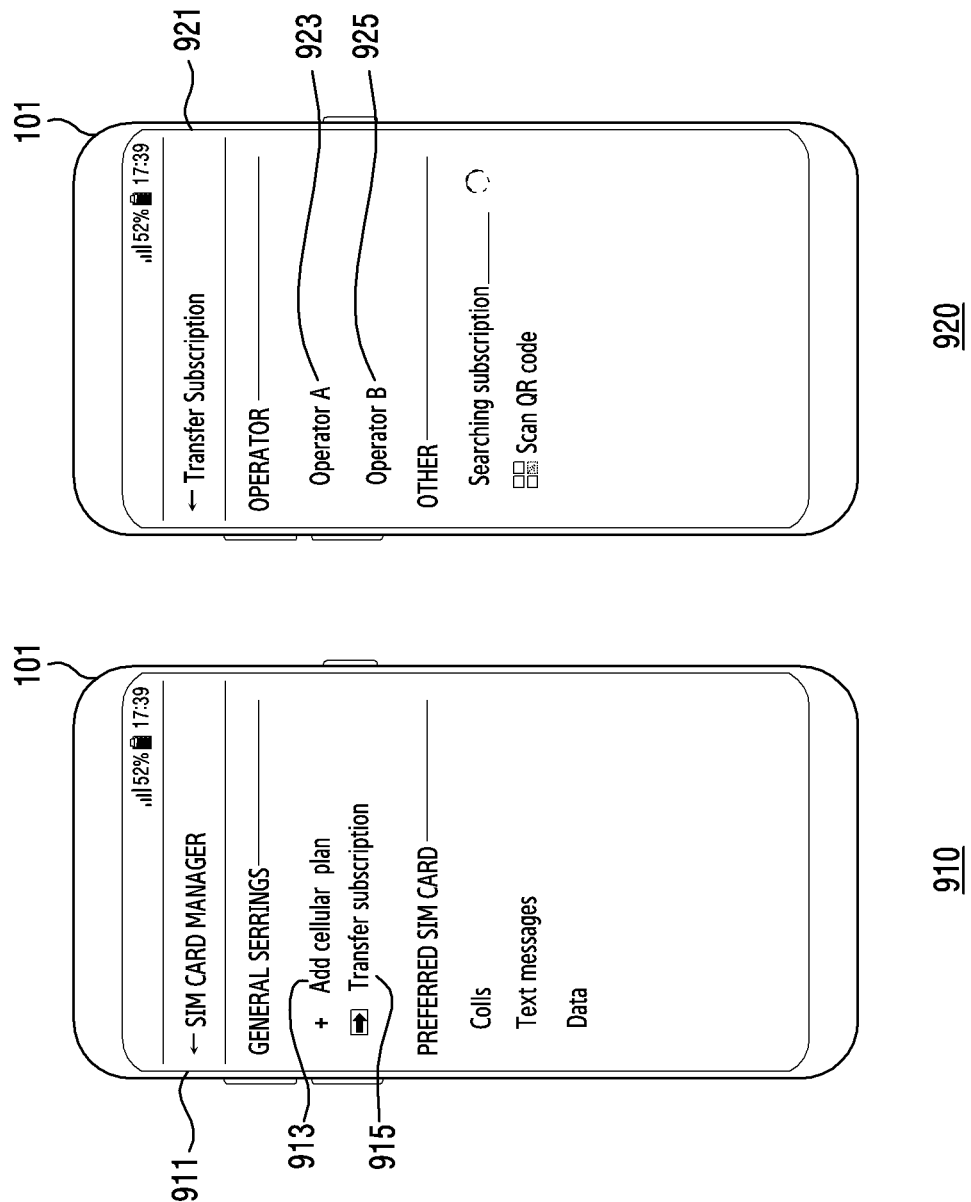
FIG. 9A is a diagram illustrating an example method for transferring a subscription according to an embodiment.
Figure 9B:
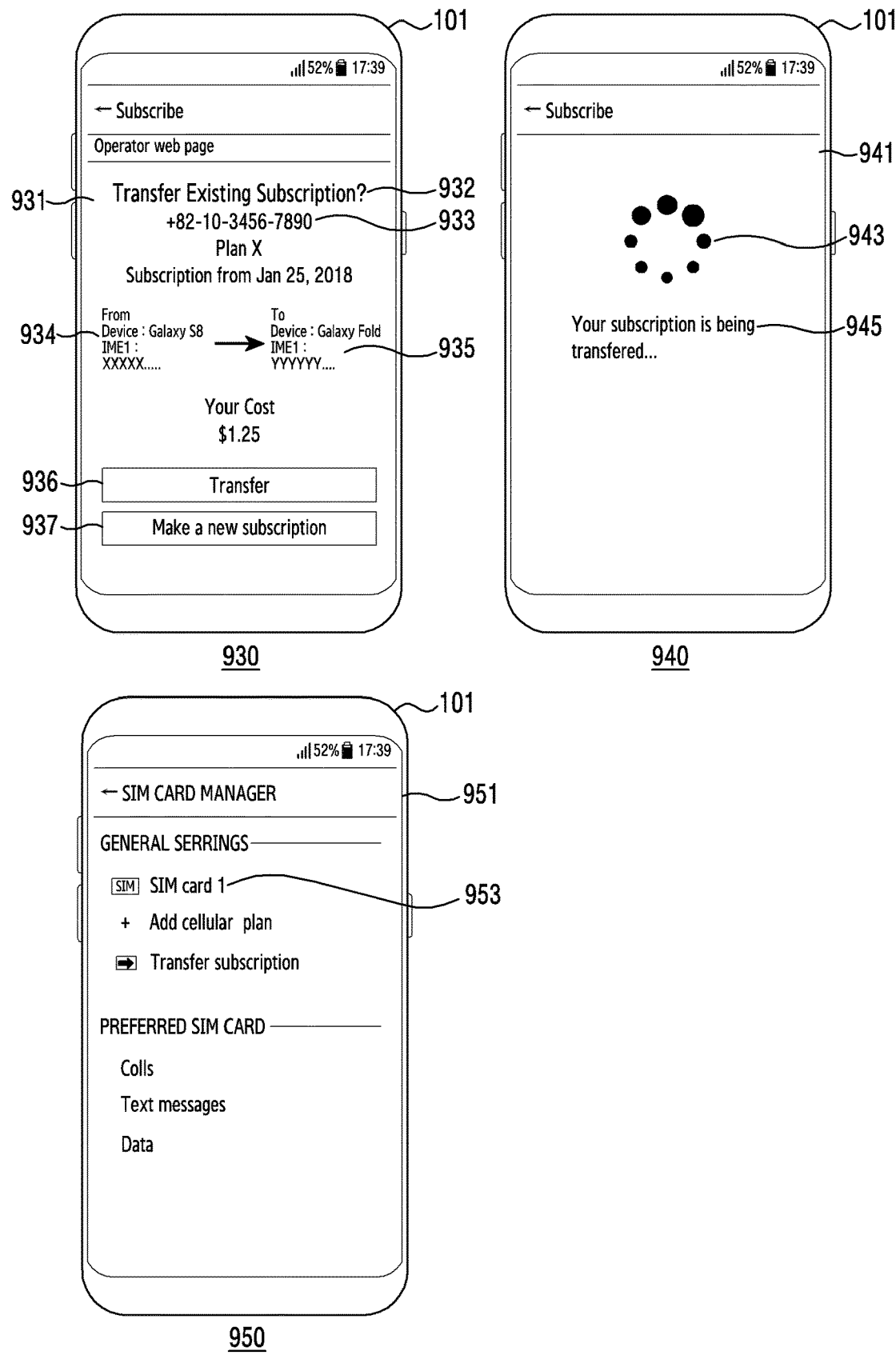
FIG. 9B is a diagram illustrating an example method for transferring a subscription according to an embodiment.

FIG. 9A and FIG. 9B are diagrams illustrating an example method for transferring a subscription according to an embodiment. For example, FIG. 9A and FIG. 9B may be diagrams illustrating example user interface screens related to embodiments of operations of FIG. 7.

In an embodiment, operations of FIG. 9A and FIG. 9B may be performed in the electronic device 101 (e.g., the processor 120) of FIG. 3. Referring to FIG. 9A and FIG. 9B, in example 910, in an embodiment, the processor 210 may display, through a display (e.g., the display device 160 of FIG. 1), a configuration screen 911 related to a subscription transfer. In the example 910, in an embodiment, an object 913 may be an object mapped to a function for adding a subscription (or for signing up to a new subscription). An object 915 may be an object mapped to a function for transferring the subscription.

In example 920, in response to receiving an input for the object 913 from a user, the processor 210 may display, through the display (e.g., the display device 160), a screen 921 including objects 923 and 925 indicating communication operators.

In an embodiment, the processor 210 may receive a user input for selecting the object 923 among the objects 923 and 925 indicating the communication operators. In an embodiment, the communication operator indicated by the object 923 may be a communication operator providing a communication service through the first server 108-1 and the second server 108-2. In an embodiment, a user of the electronic device 101 may be in a state of being signed up to a communication operator indicated by the object 923, and there may be a first SIM (or the external electronic device 103 to which the first SIM is inserted or embedded) storing a first profile corresponding to sign-up information of the user of the electronic device 101 for the communication operator indicated by the object 923.

In an embodiment, when the processor 210 receives a user input for selecting the object 923, the processor 210 may perform an authentication operation and authorization confirmation operation with respect to the first server 108-1. In an embodiment, the first server 108-1 may use the authentication operation or the authorization confirmation operation to confirm that the user of the electronic device 101 is in a state of being signed up to a communication operator (or a server for using a network provided by the communication operator), and may confirm that a subscription of the first profile corresponding to sign-up information for the communication operator is in a state of being activated in the first server 108-1.

In example 930, the processor 210 may display, through the display (e.g., the display device 160), a screen 931 including at least one of information 932 indicating a subscription transfer from the external electronic device 103 to the electronic device 101 is possible, information 934 of the external electronic device 103 (e.g., an IMEI of the external electronic device 103), information 935 of the electronic device 101 (e.g., an IMEI of the electronic device 101), and subscription information 933 (e.g., an MSISDN) of the first profile, together with an object 937 for signing up to a new subscription to a communication operator (or requesting for signing up to the new subscription to the communication operator) and an object 936 for the subscription transfer (or the request for the subscription transfer). However, the information displayed through the screen 931 is not limited to the aforementioned example. In an embodiment, upon receiving a user input for the object 937, the processor 210 may transmit a subscription sign-up request to the first server 108-1 through the communication circuit.

In example 940, in an embodiment, in response to receiving an input for the object 933 from the user, the processor 210 may display, through the display (e.g., the display device 160), a screen 941 indicating that the subscription transfer is in preparation (or an operation for generating the second profile for the subscription transfer is running) For example, the processor 210 may display, through the display (e.g., the display device 160), the screen 941 including an object 943 and text 945 indicating that the subscription transfer is in preparation.

In example 950, in an embodiment, upon completion of an operation of acquiring the second profile from the second server 108-2 and storing (or installing) the second profile in the second SIM, the processor 210 may display, through the display (e.g., the display device 160), a screen 951 including an object 953 indicating that the second profile is stored in the second SIM. For example, comparing the examples 910 and 950, the processor 210 may further display the object 953 indicating that the screen 951 stores the second profile in comparison with the screen 911.

Figure 10:
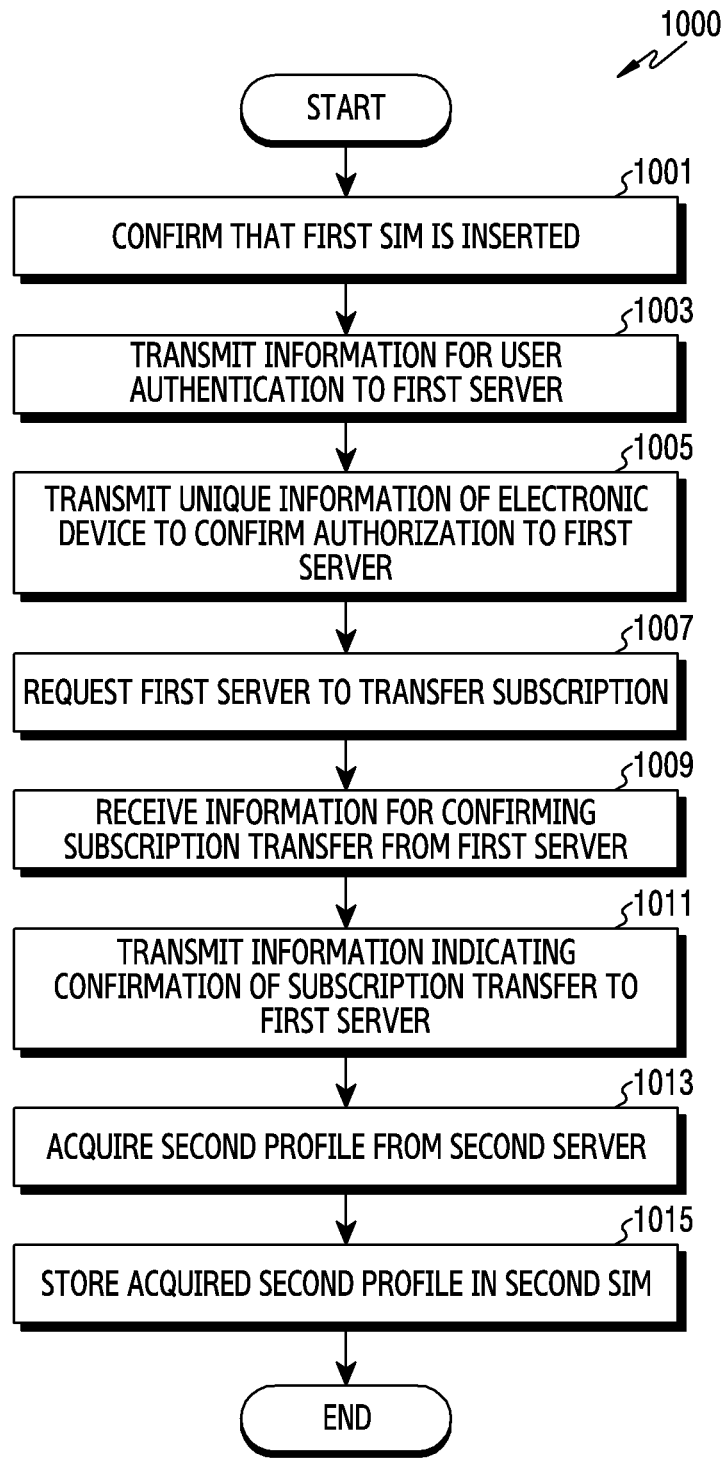
FIG. 10 is a flowchart illustrating an example method for transferring a subscription according to an embodiment.

FIG. 10 is a flowchart 1000 illustrating an example method for transferring a subscription according to an embodiment.

In an embodiment, operations 1001, 1003, 1005, 1007, 1009, 1011, 1013 and 1015 (which may be referred to hereinafter as operations 1001 to 1015) may be performed in the electronic device (e.g., the processor 120) of FIG. 3.

Referring to FIG. 10, in operation 1001, in an embodiment, the processor 210 may confirm that a first SIM (e.g., the pSIM 240 of FIG. 3) is inserted to the electronic device 101 (e.g., a slot capable of accommodating a SIM of the electronic device 101 of FIG. 1).

In an embodiment, the first SIM may be a physical SIM, which is inserted to the electronic device 101 after being detached from the external electronic device 103, including a first profile corresponding to sign-up information for a communication operator of a user of the electronic device 101 from the external electronic device 103.

In operation 1003, in an embodiment, the processor 210 may transmit information for user authentication to a first server (e.g., the first server 108-1 of FIG. 3) through a communication circuit (e.g., the communication module 190 of FIG. 1), based on subscription information of the first profile of the first SIM.

In an embodiment, the processor 210 may perform an operation of authenticating the first server 108-1 and a user, based on subscription information of the first profile of the first SIM. For example, the processor 210 may perform the operation of authenticating the first server 108-1 and the user through an Extensible Authentication Protocol (EAP) Authentication and Key agreement (AKA) scheme, an Internet Protocol (IP) authentication, header enrichment scheme, or an OTP authentication scheme using a message (e.g., an SMS message). However, a scheme in which the processor 210 authenticates the first server 108-1 and the user on the basis of the subscription information of the first profile of the first SIM is not limited to the aforementioned example.

In an embodiment, the processor 210 may perform an operation of authentication the first server 108-1 and the user of the electronic device 101, using the OAuth scheme illustrated in FIG. 7, without having to use subscription information of the first profile of the first SIM.

In operation 1005, in an embodiment, the processor 210 may transmit unique information of the electronic device 101 to the first server 108-1 through the communication circuit in order to confirm authorization of the electronic device to access the first server 108-1 (or authorization for using a communication service provided by the first server 108-1 after accessing the first server 108-1).

In operation 1007, in an embodiment, the processor 210 may request, through the communication circuit, the first server 108-1 to transfer a subscription.

In operation 1009, in an embodiment, the processor 210 may receive, from the first server 180-1 through the communication circuit, information for confirming the subscription transfer.

In operation 1011, in an embodiment, the processor 210 may transmit, to the first server 108-1 through the communication circuit, information indicating the confirmation of the subscription transfer.

In operation 1013, in an embodiment, the processor 210 may acquire (or download) a second profile from the second server 108-2 through the communication circuit.

In operation 1015, in an embodiment, the processor 210 may store the acquired second profile in a second SIM.

Since embodiments of operations 1005 and 1015 are at least in part identical or similar to embodiments of operations 411 and 421 of FIG. 4, detailed descriptions thereof may not be repeated here.

Although it is illustrated by way of example in FIG. 10 that the physical first SIM detached from the external electronic device 103 is inserted to the electronic device 101, at least some of the embodiments of FIG. 10 may also be equally or similarly applied to a case where a SIM embedded to the external electronic device 103 is included in a state of being inserted to the physical first SIM and a second profile is stored in the SIM embedded to the external electronic device 103.

Figure 11:
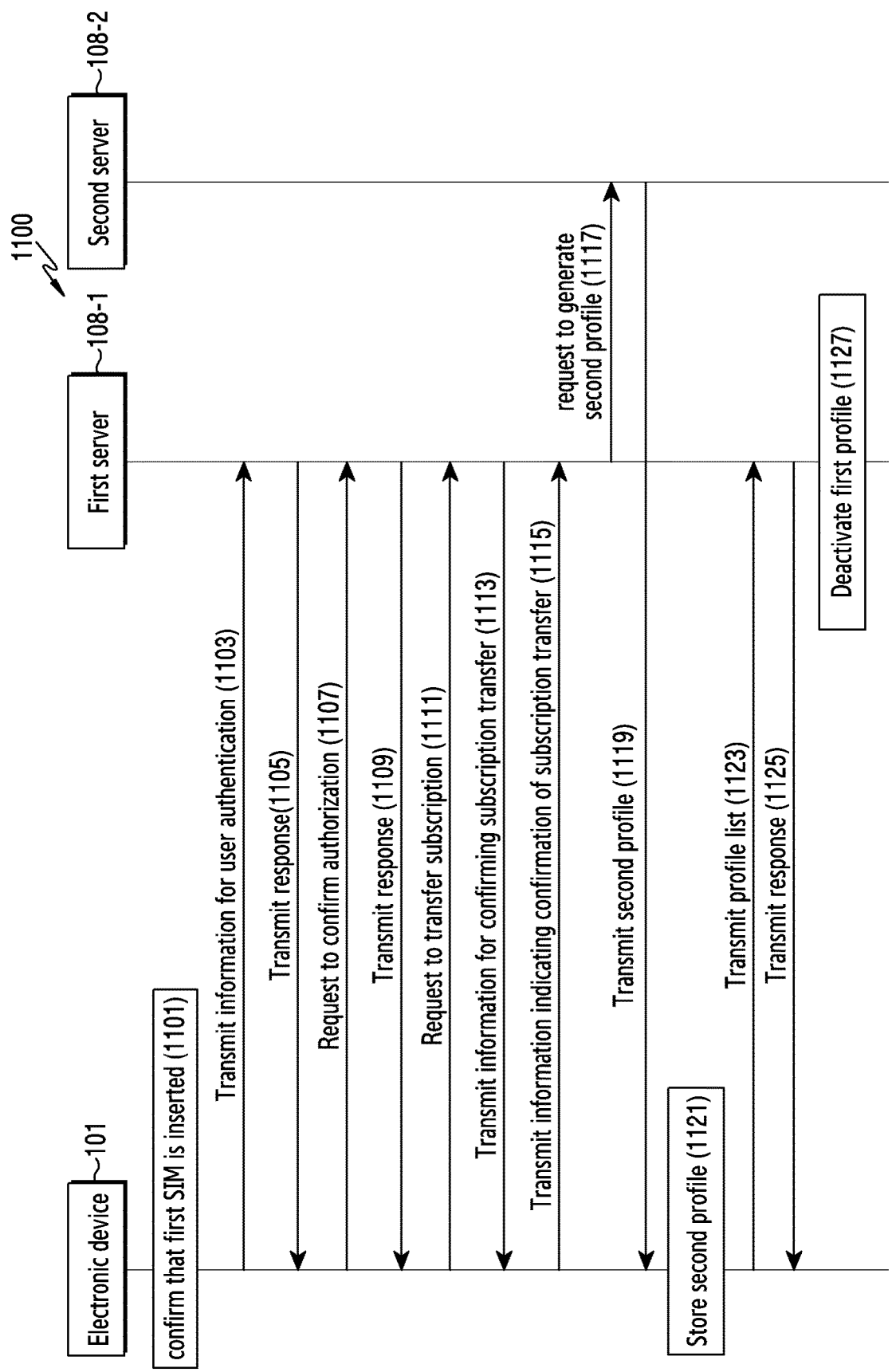
FIG. 11 is a signal flow diagram illustrating an example method for transferring a subscription according to an embodiment.

FIG. 11 is a signal flow diagram 1100 illustrating an example system (e.g., the electronic device 101, the first server 108-1, and the second server 108-2) and illustrating an example method for transferring a subscription according to an embodiment. For example, FIG. 11 may be a diagram illustrating example embodiments of operations of FIG. 10 for the electronic device 101 on a system.

Referring to FIG. 11, in operation 1101, in an embodiment, the electronic device 101 may confirm that a first SIM is inserted to the electronic device 101 (e.g., a slot capable of accommodating a SIM of the electronic device 101 of FIG. 1).

In an embodiment, the first SIM may be a physical SIM, which is inserted to the electronic device 101 after being detached from the external electronic device 103, including a first profile corresponding to sign-up information for a communication operator of a user of the electronic device 101 from the external electronic device 103.

In operation 1103, in an embodiment, the processor 210 may transmit information for user authentication to a first server (e.g., the first server 108-1 of FIG. 3) through a communication circuit, based on subscription information of the first profile of the first SIM.

In an embodiment, the electronic device 101 may perform an operation of authenticating the first server 108-1 and a user, based on subscription information of the first profile of the first SIM. For example, the electronic device 101 may perform the operation of authenticating the first server 108-1 and the user through an Extensible Authentication Protocol (EAP) Authentication and Key agreement (AKA) scheme, an Internet Protocol (IP) authentication, header enrichment scheme, or an OTP authentication scheme using a message (e.g., an SMS message). However, a scheme in which the electronic device 101 authenticates the first server 108-1 and the user on the basis of the subscription information of the first profile of the first SIM is not limited to the aforementioned example.

In an embodiment, the electronic device 101 may perform an operation of authentication the first server 108-1 and the user of the electronic device 101, using the OAuth scheme illustrated in FIG. 7, without having to use subscription information of the first profile of the first SIM.

In operation 1105, in an embodiment, the first server 108-1 may transmit a response to the electronic device 101, in response to receiving information for user authentication.

In operation 1107, in an embodiment, the electronic device 101 may transmit unique information of the electronic device 101 to the first server 108-1 through the communication circuit in order to request to confirm authorization of the electronic device 101 to access the first server 108-1 (or authorization for using a communication service provided by the first server 108-1 after accessing the first server 108-1).

In operation 1109, in an embodiment, upon receiving the unique information of the electronic device 101 from the electronic device 101, the first server 108-1 may transmit a response to the electronic device 101.

In operation 1111, in an embodiment, the electronic device 101 may request, through the communication circuit, the first server 108-1 to transfer a subscription. For example, the electronic device 101 may transmit, through the communication circuit, information requesting the first server 108-1 to transfer the subscription, in response to receiving information indicating that the electronic device 101 has authorization to access the first server 108-1 from the first server 108-1.

In operation 1113, in an embodiment, the first server 108-1 may transmit, to the electronic device 101, information for confirming the subscription transfer.

In operation 1115, in an embodiment, the electronic device 101 may transmit, to the first server 108-1, information indicating the confirmation of the subscription transfer.

In operation 1117, in an embodiment, when the first server 108-1 receives, from the electronic device 101, information indicating the confirmation of the subscription transfer, the first server 108-1 may request the second server 108-2 to generate (or prepare) a second profile.

In operation 1119, in an embodiment, in response to receiving the request for generating the second profile from the first server 108-1, the second server 108-2 may generate the second profile, and may transmit the generated second profile to the electronic device 101.

In operation 1121, in an embodiment, the electronic device 101 may acquire (or download) the second profile from the second server 108-2 through the second wireless communication circuit, and may store the acquired second profile in a second SIM.

In operation 1123, in an embodiment, when the second profile is stored (or installed) in the second SIM, the electronic device 101 may transmit, to the first server 108-1 through the second wireless communication circuit, a profile list stored (or installed) in the second SIM by including the second profile. In an embodiment, the electronic device 101 may transmit, to the first server 108-1 through the second wireless communication circuit, information indicating that the second profile is stored (or installed) in the second SIM.

In operation 1125, in an embodiment, the first server 108-1 may transmit a response to the electronic device 101, in response to the received profile list or information indicating that the second profile is stored in the second SIM.

In operation 1127, in an embodiment, the first server 108-1 may deactivate (or disable) the first profile, in response to receiving from the electronic device 101 the profile list including the second profile or the information indicating that the second profile is stored in the second SIM.

Figure 12A:
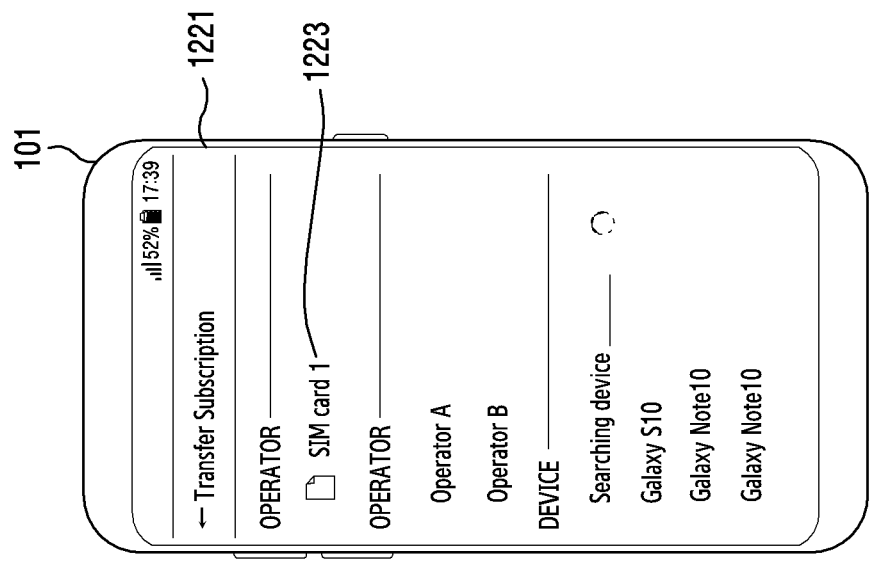
FIG. 12A is a diagram illustrating an example method for transferring a subscription according to an embodiment.
Figure 12A:
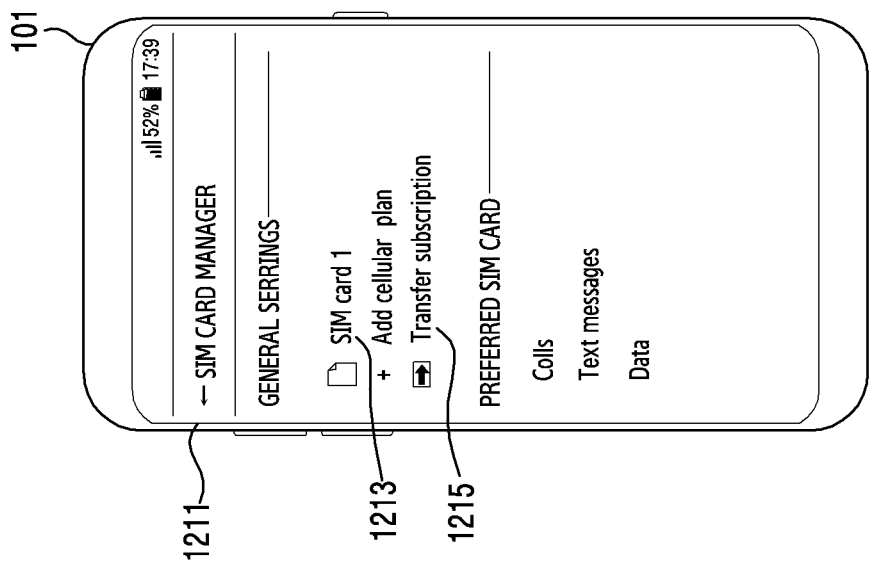
Figure 12B:
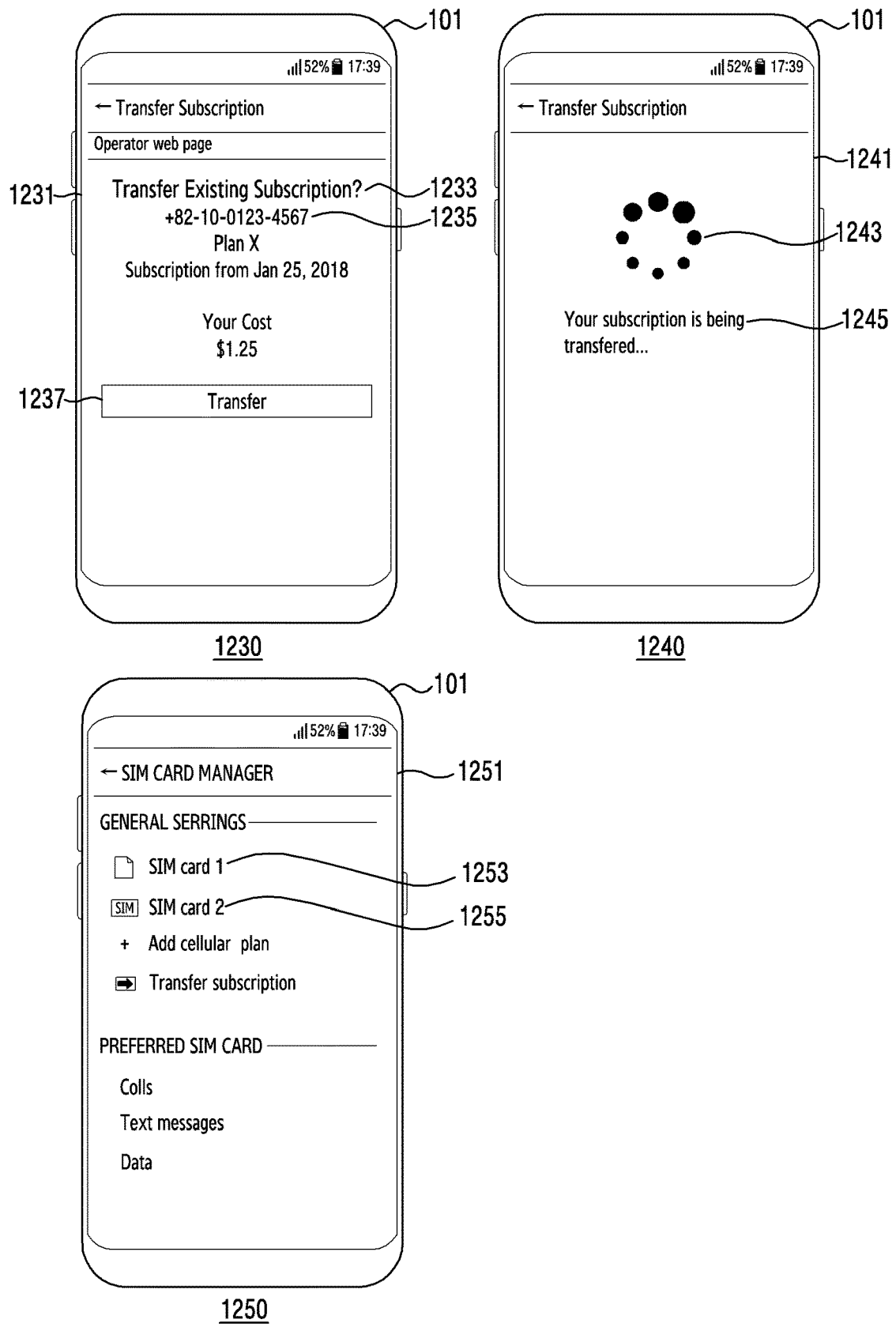
FIG. 12B is a diagram illustrating an example method for transferring a subscription according to an embodiment.

FIG. 12A and FIG. 12B are diagrams illustrating an example method for transferring a subscription according to an embodiment. For example, FIG. 12A and FIG. 12B may be diagrams illustrating an example user interface screen related to embodiments of operations of FIG. 10.

In an embodiment, operations of FIG. 12A and FIG. 12B may be performed in the electronic device 101 (e.g., the processor 120) of FIG. 3.

Referring to FIG. 12A and FIG. 12B, in example 1210, in an embodiment, the processor 210 may display, through a display (e.g., the display device 160 of FIG. 1), a configuration screen 1211 related to a subscription transfer. In the example 1210, in an embodiment, an object 1213 may be an object indicating a physical first SIM inserted to the electronic device 101. An object 1215 may be an object mapped to a function for the subscription transfer.

In example 1220, in an embodiment, upon receiving an input for the object 1215 mapped to the function for the subscription transfer from the user, the processor 210 may display, through the display (e.g., the display device 160), a screen 1221 including an object 1223 indicating the first SIM used to perform user authentication.

In an embodiment, in response to receiving the input for selecting the object 1223 from the user, the processor 210 may perform an operation of authenticating the first server 108-1 and the user, based on subscription information of a first profile of the first SIM indicated by the object 1223.

In example 1230, in an embodiment, the processor 210 may display, through the display (e.g., the display device 160), a screen 1231 including information for confirming the subscription transfer, based on information received from the first server 108-1. For example, the processor 210 may display, through the display (e.g., the display device 160), at least one of a text 1233 for inquiring whether to transfer a subscription of the electronic device 101, subscription information (e.g., an MSISDN) 1235 included in the first profile of the first SIM indicated by the object 1223, and an object 1237 for receiving an input for confirming the subscription transfer of the electronic device 101.

In example 1240, in an embodiment, in response to receiving the input for the object 1237 from the user, the processor 210 may display, through the display (e.g., the display device 160), a screen indicating that the subscription transfer is in preparation (or an operation for generating the second profile for the subscription transfer is running) For example, the processor 210 may display, through the display (e.g., the display device 160), a screen 1241 including an object 1243 and text 1245 indicating that the subscription transfer is in preparation.

In example 1250, in an embodiment, upon completion of an operation of acquiring the second profile from the second server 108-2 and storing (or installing) the second profile in a second SIM, the processor 210 may display, through the display (e.g., the display device 160), a screen 1251 including an object 1255 indicating that an object 1253 indicating the first SIM and the second profile are stored in the second SIM.

Although not shown in the example 1250, in an embodiment, upon receiving information indicating the first SIM is deactivated from the first server 108-1, the processor 210 may display (or change the display of) the object 1253 to indicate that the first SIM is deactivated. For example, the processor 210 may shade or blur the object 1253 to indicate that the first SIM is deactivated. However, the displaying indicating that the first SIM is deactivated is not limited to the aforementioned example. For example, the processor 210 may display, through the display (e.g., the display device 160), a text indicating that the first SIM is deactivated. In an embodiment, upon completion of an operation of storing (or installing) the second profile from the second server 108-2, the processor 210 may display (or change the display of) the object 1253 through the display (e.g., the display device 160) to indicate that the first SIM is deactivated.

Figure 13:
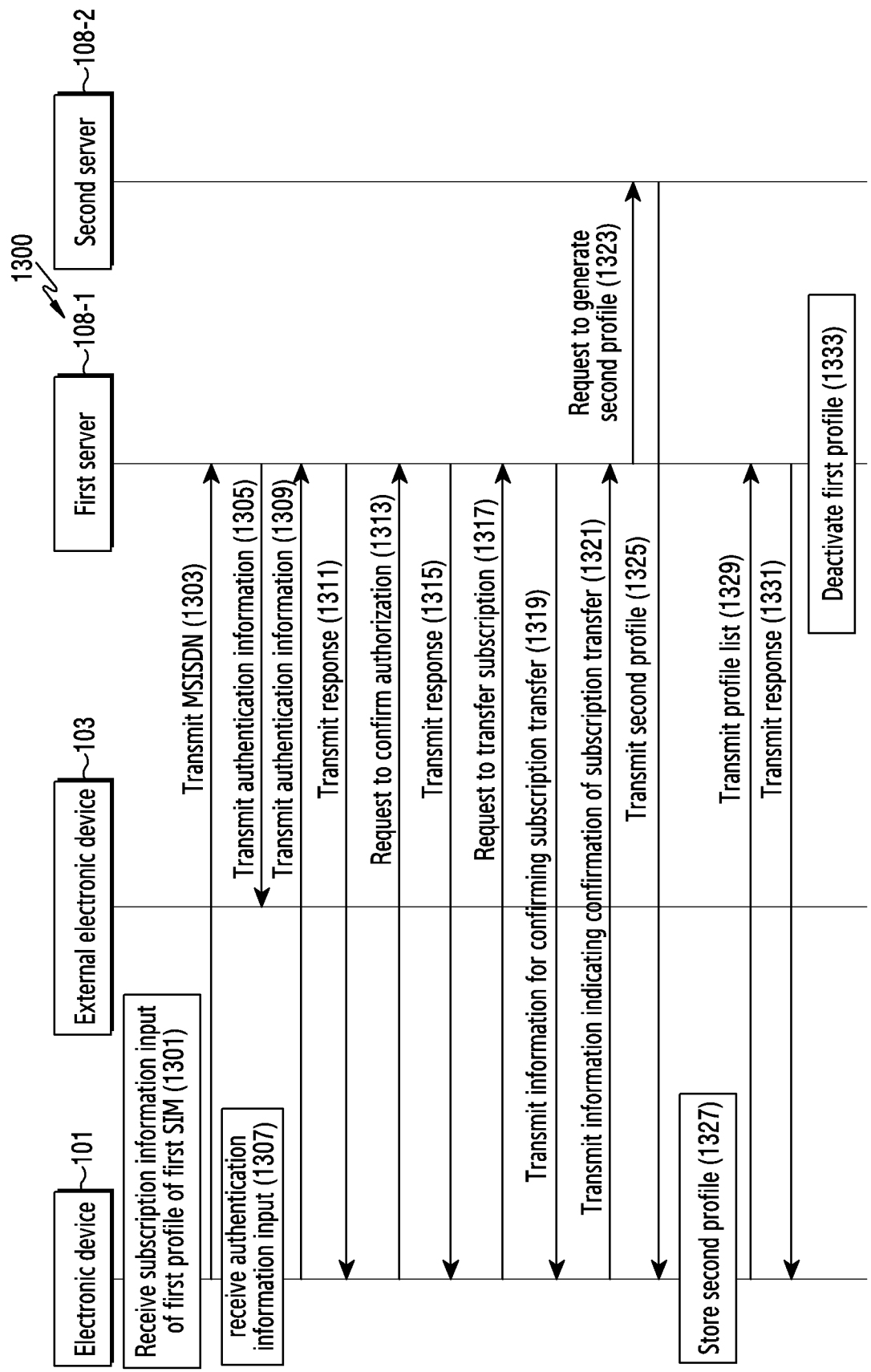
FIG. 13 is a signal flow diagram illustrating an example method for transferring a subscription according to an embodiment.

FIG. 13 is a signal flow diagram 1300 illustrating an example system (e.g., the electronic device 101, the external electronic device 103, the first server 108-1, and the second server 108-2) and illustrating an example method for transferring a subscription according to an embodiment.

Referring to FIG. 13, in operation 1301, in an embodiment, the electronic device 101 may receive from a user an input for inputting subscription information of a first profile of a first SIM. For example, the electronic device 101 may receive, from the user through a display (e.g., the display 160 of FIG. 1), an input for inputting an MSISDN of the first profile of the first SIM.

In an embodiment, after receiving an input for selecting a communication operator from the user, the electronic device 101 may receive from the user an input for inputting subscription information of the first profile of the first SIM. For example, upon receiving the input for selecting the communication operator from the user, the electronic device 101 may display, through the display (e.g., the display device 160), a field (or a section) for inputting the MSISDN of the first profile of the first SIM. The electronic device 101 may receive from the user an input for inputting the MSISDN of the first profile of the first SIM to a field for inputting the MSISDN of the first profile of the first SIM. However, an operation of receiving from the user the input for selecting the communication operator may be omitted. For example, if the communication operator can be identified (or determined) by the MSISDN of the first profile of the first SIM, the operation of receiving from the user the input for selecting the communication operator may be omitted.

In operation 1303, in an embodiment, the electronic device 101 may transmit an MSISDN of the external electronic device 103 to the first server 108-1 through a communication circuit (e.g., the communication module 190).

In an embodiment, in addition to the MSISDN of the external electronic device 103, the electronic device 101 may transmit unique information of the electronic device 101 (or an ID of the electronic device 101) to the first server 108-1 through the communication circuit. For example, in addition to the MSISDN of the external electronic device 103, the processor 210 may transmit an International Mobile Equipment Identity (IMEI) of the electronic device 101 to the first server 108-1 through the communication circuit. However, the unique information of the electronic device 101, which is transmitted to the first server 108-1, is not limited to the IMEI. Thus, in addition to the IMEI, the unique information of the electronic device 101, which is transmitted to the first server 108-1, may further include at least one of a protocol version, a vendor of the electronic device 1-1, a model name, and a software version.

In an embodiment, in addition to the MSISDN of the external electronic device 103, the electronic device 101 may further transmit, to the first server 108-1 through the communication circuit, a port number of a port of the external electronic device 103 for receiving authentication information from the first server 108-1.

In an embodiment, in addition to the MSISDN of the external electronic device 103, the electronic device 101 may further transmit, to the first server 108-1 through the communication circuit, the unique information of the electronic device 101 and the port number of the port of the external electronic device 103 for receiving authentication information from the first server 108-1.

In operation 1305, in an embodiment, the first server 108-1 may transmit the authentication information to the external electronic device 103 using the MSISDN of the external electronic device 103.

In an embodiment, when the first server 108-1 receives MSISDN of the external electronic device 103 from the electronic device 101, the first server 108-1 may generate a One Time Password (OTP) as the authentication information. However, the authentication information that can be generated by the first server 108-1 is not limited to the OTP.

In an embodiment, when the first server 108-1 receives the port number of the port of the external electronic device 103 for receiving the authentication information from the electronic device 101, the first server 108-1 may transmit the authentication information to the port of the external electronic device 103 corresponding to the received port number. In an embodiment, the first server 108-1 may transmit a message including the authentication information to the external electronic device 103. For example, the first server 108-1 may transmit a Short Message Service (SMS) message including the authentication information to the external electronic device 103. However, a scheme in which the first server 108-1 transmits the authentication information to the external electronic device 103 is not limited to a scheme based on SMS message transmission. In an embodiment, the external electronic device 103 may display received authentication information (e.g., OTP).

In operation 1307, in an embodiment, the electronic device 101 may receive, from the user, an input for inputting authentication information which is displayed (or output) to the external electronic device 103 and transmitted by the first server 108-1 to the external electronic device 103.

In operation 1309, in an embodiment, the electronic device 101 may transmit, to the first server 108-1 through the communication circuit, authentication information which is received from the user.

In operation 1311, in an embodiment, the first server 108-1 may transmit a response to the electronic device 101, in response to receiving the authentication information.

In an embodiment, although not shown in FIG. 13, when the electronic device 101 transmits the authentication information to the first server 108-1, the first server 108-1 may confirm whether the authentication information received from the electronic device 101 is identical to the authentication information transmitted to the external electronic device 103. In an embodiment, if the first server 108-1 confirms that the authentication information received from the electronic device 101 is identical to the authentication information transmitted to the external electronic device 103, the first server 108-1 may transmit, to the electronic device 101, a response indicating that authentication is complete (or successful). For example, the first server 108-1 may transmit, to the electronic device 101, a response including a token (or an access token) required for the electronic device 101 to access the first server 108-1.

In operation 1313, in an embodiment, the electronic device 101 may transmit unique information of the electronic device 101 to the first server 108-1 through the second wireless communication circuit in order to request to confirm authorization of the electronic device 101 to access the first server 108-1 (or authorization for using a communication service provided by the first server 108-1 after accessing the first server 108-1).

In operation 1315, in an embodiment, upon receiving the unique information of the electronic device 101 from the electronic device 101, the first server 108-1 may transmit a response to the electronic device 101.

In an embodiment, upon receiving the unique information of the electronic device 101 from the electronic device 101, the first server 108-1 may confirm whether the electronic device 101 has authorization to access the first server 108-1, based on the received unique information of the electronic device 101.

In operation 1317, in an embodiment, the electronic device 101 may request the first server 108-1 to transfer a subscription, through the communication circuit. For example, the electronic device 101 may transmit, through the communication circuit, information requesting the first server 108-1 to transfer the subscription, in response to receiving information indicating that the electronic device 101 has authorization to access the first server 108-1 from the first server 108-1.

In operation 1319, in an embodiment, the first server 108-1 may transmit, to the electronic device 101, information for confirming the subscription transfer.

In operation 1321, in an embodiment, the electronic device 101 may transmit, to the first server 108-1, information indicating the confirmation of the subscription transfer.

In operation 1323, in an embodiment, when the first server 108-1 receives, from the electronic device 101, information indicating the confirmation of the subscription transfer, the first server 108-1 may request the second server 108-2 to generate (or prepare) a second profile.

In operation 1325, in an embodiment, in response to receiving the request for generating the second profile from the first server 108-1, the second server 108-2 may generate the second profile, and may transmit the generated second profile to the electronic device 101.

In operation 1327, in an embodiment, the electronic device 101 may acquire (or download) the second profile from the second server 108-2 through the second wireless communication circuit, and may store the acquired second profile in a second SIM.

In operation 1329, in an embodiment, when the second profile is stored (or installed) in the second SIM, the electronic device 101 may transmit, to the first server 108-1 through the second wireless communication circuit, a profile list stored (or installed) in the second SIM by including the second profile. In an embodiment, the electronic device 101 may transmit, to the first server 108-1 through the second wireless communication circuit, information indicating that the second profile is stored (or installed) in the second SIM.

In operation 1331, in an embodiment, the first server 108-1 may transmit a response to the electronic device 101, in response to the received profile list or information indicating that the second profile is stored in the second SIM.

In operation 1333, in an embodiment, the first server 108-1 may deactivate (or disable) the first profile, in response to receiving from the electronic device 101 the profile list including the second profile or the information indicating that the second profile is stored in the second SIM.

Figure 14A:
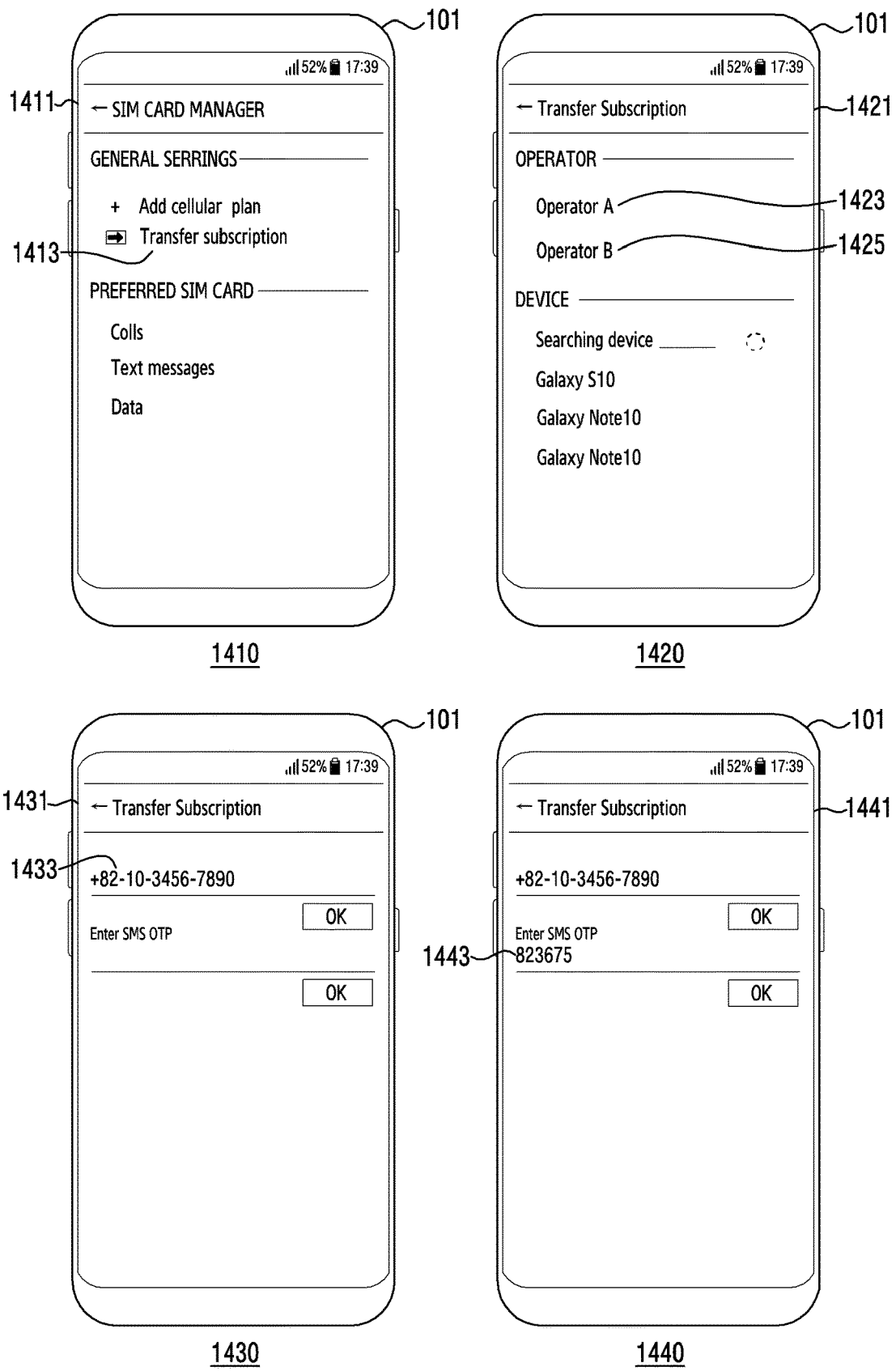
FIG. 14A is a diagram illustrating an example method for transferring a subscription according to an embodiment.
Figure 14B:
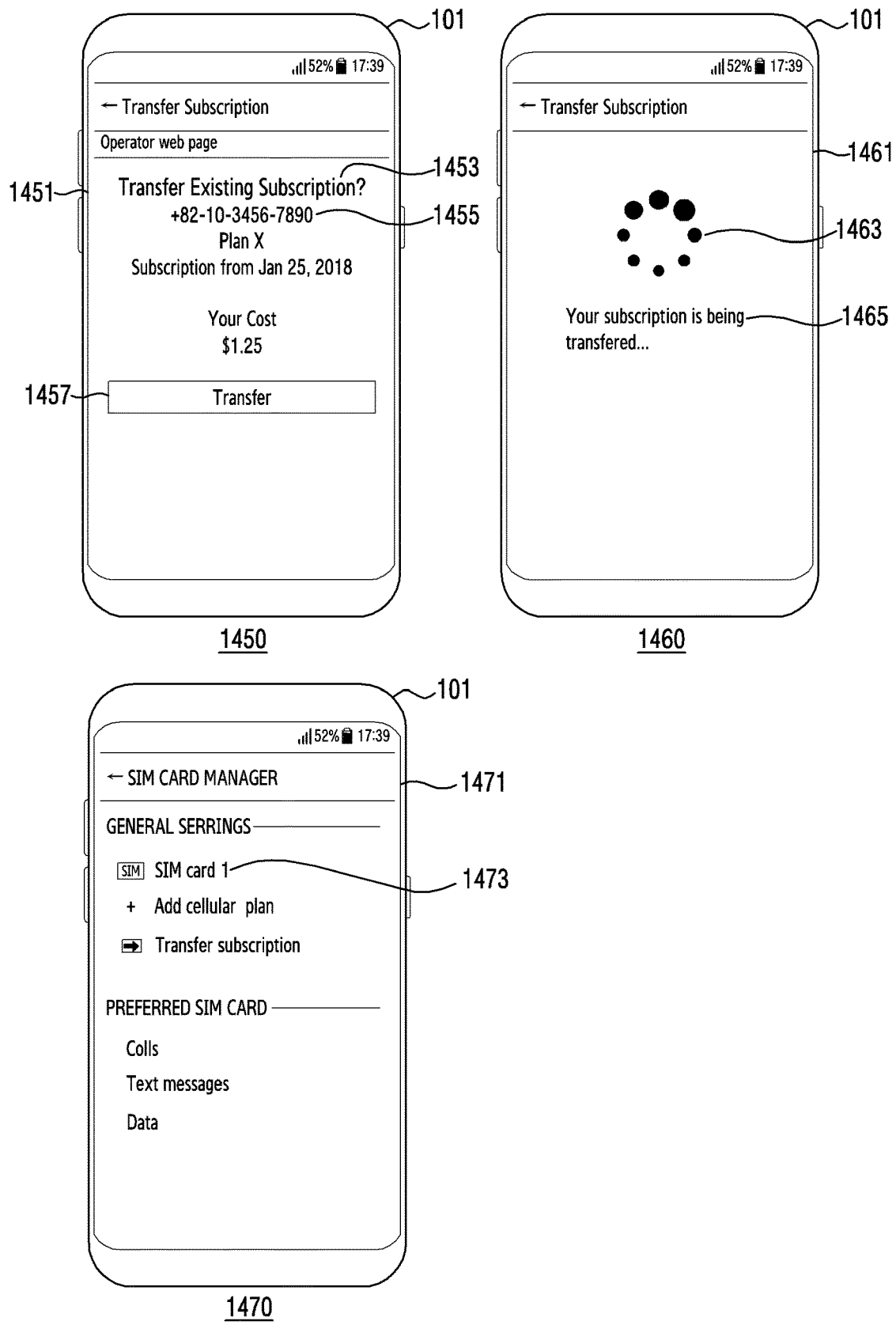
FIG. 14B is a diagram illustrating an example method for transferring a subscription according to an embodiment.

FIG. 14A and FIG. 14B are diagrams illustrating an example method for transferring a subscription according to an embodiment. For example, FIG. 14A and FIG. 14B may be drawings illustrating a user interface screen related to embodiments of operations of FIG. 13.

Referring to FIG. 14A and FIG. 14B, in example 1410, in an embodiment, the processor 210 may display, through a display (e.g., the display device 160), a configuration screen 1411 related to a subscription transfer. In the example 1410, in an embodiment, an object 1413 may be an object mapped to a function for the subscription transfer.

In example 1420, in an embodiment, in response to receiving the input for the object 1413 from the user, the processor 210 may display, through the display (e.g., the display device 160), a screen 1421 for receiving an input for selecting a communication operator from the user. For example, the processor 210 may display objects 1423 and 1425 indicating the communication operator through the display (e.g., the display device 160). The processor 210 may receive an input for selecting the object 1423 from the user among the objects 1423 and 1425.

In example 1430, in an embodiment, the processor 210 may receive an input for inputting an MSISDN of a first profile of a first SIM from the user.

In an embodiment, the processor 210 may display, through a display (e.g., the display device 160), a screen 1431 including a field 1433 for inputting the MSISDN of the first profile of the first SIM from a user. In response to receiving a user input for inputting the MSISDN 1433 of the first profile of the first SIM through the field 1433, the processor 210 may transmit information including an MSISDN of the external electronic device 103 to the first server 108-1.

In example 1440, in an embodiment, the processor 210 may receive, from the user, an input for inputting authentication information which is displayed to the external electronic device 103 and transmitted by the first server 108-1 to the external electronic device 103.

In an embodiment, the processor 210 may display, through the display (e.g., the display device 160), a screen 1441 including a field 1443 for inputting authentication information from the user. In response to receiving the user input for inputting the authentication information through the field 1443, the processor 210 may transmit, to the first server 108-1, authentication information which is input from the user.

In example 1450, in an embodiment, the processor 210 may display, through the display (e.g., the display device 160), the screen 1451 including information for confirming a subscription transfer, based on information received from the first server 108-1. For example, the processor 210 may display, through the display (e.g., the display device 160), a text 1453 for inquiring whether to transfer a subscription of the electronic device 101, an MSISDN 1455 of the external electronic device 103, and an object 1457 for receiving an input for confirming the subscription transfer of the electronic device.

In example 1460, in an embodiment, in response to receiving an input for the object 1457 from the user, the processor 210 may display, through the display (e.g., the display device 160), a screen indicating that the subscription transfer is in preparation (or an operation for generating the second profile for the subscription transfer is running) For example, the processor 210 may display, through the display (e.g., the display device 160), a screen 1461 including an object 1463 and text 1465 indicating that the subscription transfer is in preparation.

In example 1470, in an embodiment, upon completion of an operation of acquiring the second profile from the second server 108-2 and storing (or installing) the second profile in a second SIM, the processor 210 may display, through the display (e.g., the display device 160), a screen 1471 including an object 1473 indicating that the second profile is stored in the second SIM.

Figure 15:
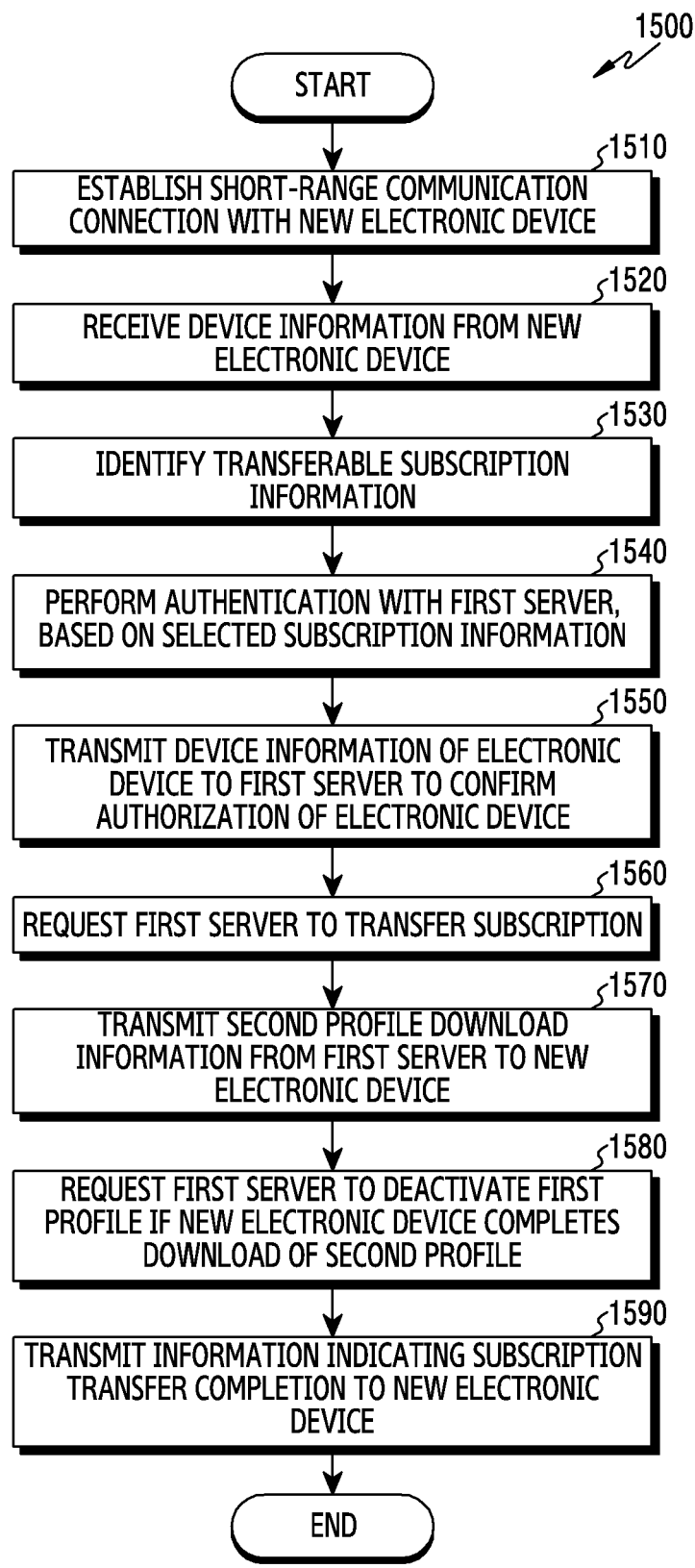
FIG. 15 is a flowchart illustrating an example method for transferring a subscription according to an embodiment.

FIG. 15 is a flowchart 1500 illustrating an example method for transferring a subscription according to an embodiment.

Operations 1510, 1520, 1530, 1540, 1550, 1560, 1570, 1580 and 1590 (which may be referred to hereinafter as operations 1510 to 1590) according to an embodiment may be performed in the existing electronic device of a user. In an embodiment, the existing electronic device of the user may be an electronic device (e.g., the electronic device 101 of FIG. 3).

Referring to FIG. 15, in operation 1510, the processor 210 (e.g., the processor 210 of FIG. 2) of the electronic device 101 may establish a short-range communication connection with a new electronic device (e.g., the external electronic device 103 of FIG. 3).

In an embodiment, the processor 210 may establish a short-range communication connection with a new electronic device (e.g., the external electronic device 103 of FIG. 3) through a first wireless communication circuit (e.g., a short-range wireless communication circuit). In an embodiment, the processor 210 may establish the short-range communication connection between the electronic device 101 and the new electronic device (e.g., the external electronic device 103 of FIG. 3) through a D2D communication connection (e.g., Bluetooth, NFC, or Wi-Fi direct).

In an embodiment, the processor 210 may establish a short-range communication connection with the new electronic device (e.g., the external electronic device 103 of FIG. 3) in response to receiving an input for a subscription transfer from a user. For example, the processor 210 may display, through a display (e.g., the display device 160 of FIG. 1), a configuration screen for transferring the subscription. In an embodiment, upon receiving an input for selecting an object (or an icon) for transferring the subscription from the user, the processor 210 may display, through the display (e.g., the display device 160), a list of the external electronic device 103 capable of establishing the short-range communication connection. The processor 210 may control the first wireless communication circuit so that the electronic device 101 and the external electronic device 103 are connected (or paired) in short-range communication, in response to an input for selecting at least one external electronic device 103 from the list of the external electronic device 103.

In operation 1520, in an embodiment, the processor 210 may receive device information from a new electronic device (e.g., the external electronic device 103 of FIG. 3). In an embodiment, the device information may include a profile list of the new electronic device (e.g., the external electronic device 103 of FIG. 3), unique information, or a combination thereof. In an embodiment, the profile list may indicate a list of at least one profile stored in a second SIM of the new electronic device (e.g., the external electronic device 103 of FIG. 3). In an embodiment, the unique information may include an International Mobile Equipment Identity (IMEI), an Integrated Circuit Card Identity (IC-CID), an eUICC Identity (EID), or a combination thereof.

In operation 1530, in an embodiment, the processor 210 may identify transferable subscription information in at least one first profile stored in a first SIM of the electronic device 101. In an embodiment, based on configuration information received from a configuration server (or a config server), the processor 210 may identify the first profile of the communication operator supporting the subscription transfer in the at least one first profile, and may identify a subscription indicated by the identified first profile as a transferable subscription. In an embodiment, based on the configuration information, the processor 210 may identify communication operator identity information (Mobile Country Code (MCC) and Mobile Network Code (MNC)) of a communication operator supporting the subscription transfer, identify the first profile having communication operator identity information identical to the communication operator identity information identified in the at least one first profile stored in the first SIM, and identify a subscription indicated by the identified first profile as the transferable subscription.

In an embodiment, if the transferable subscription information is identified, the processor 210 may transmit the transferable subscription information to the new electronic device (e.g., the external electronic device 103 of FIG. 3).

In an embodiment, the new electronic device (e.g., the external electronic device 103 of FIG. 3) may confirm whether to transfer the subscription, based on the transferable subscription information. In an embodiment, the new electronic device (e.g., the external electronic device 103 of FIG. 3) may confirm whether to transfer the subscription, based on the received user input, while displaying a screen indicating that the subscription transfer is possible through a display (e.g., the display device 160 of FIG. 1).

In an embodiment, if there are two or more transferable subscriptions, the new electronic device (e.g., the external electronic device 103 of FIG. 3) may display a screen indicating that the two or more subscriptions can be transferred. In an embodiment, the new electronic device (e.g., the external electronic device 103 of FIG. 3) may confirm whether to transfer each of the two or more subscriptions, based on the received user input, while displaying a screen indicating that the two or more subscriptions can be transferred.

In an embodiment, the new electronic device (e.g., the external electronic device 103 of FIG. 3) may transmit, to the electronic device 101, whether to transfer the subscription.

In operation 1540, in an embodiment, the processor 210 may perform authentication with the first server 108-1, based on the selected subscription information. In an embodiment, the authentication may be performed based on an Extensible Authentication Protocol (EAP) Authentication and Key Agreement (AKA) scheme.

In an embodiment, the processor 210 may perform authentication with the first server 108-1, based on subscription information received from the new electronic device (e.g., the external electronic device 103 of FIG. 3). In an embodiment, the processor 210 may identify the first server 108-1 for managing a profile indicated by the transferable subscription information, and may perform authentication for transferring the subscription with the first server 108-1. In an embodiment, the processor 210 may perform authentication for the subscription transfer by transmitting to the first server 108-1 an authentication request including an IMSI of the electronic device 101, an IMEI, or a combination thereof.

In an embodiment, the first server 108-1 may transmit a challenge to the electronic device 101, in response to the authentication request of the electronic device 101. In an embodiment, the challenge may be a random number for authenticating the first SIM of the electronic device 101.

In an embodiment, the processor 210 may acquire a payload for the challenge using the first SIM of the electronic device 101. In an embodiment, the processor 210 may transmit the challenge to the first SIM. In an embodiment, the first SIM may acquire a payload for the challenge, based on an authentication key value. In an embodiment, the first SIM may transmit the payload to the processor 210. In an embodiment, the processor 210 may transmit the payload to the first server 108-1.

In an embodiment, the first server 108-1 may determine whether authentication is successful, based on the payload. In an embodiment, the first server 108-1 may determine whether the authentication is successful, by comparing the payload and a value converted from the challenge according to a pre-designed key for the first SIM. In an embodiment, if the value converted from the challenge according to the pre-designed key for the first SIM is identical to the payload, the first server 108-1 may determine that the authentication is successful.

In an embodiment, the first server 108-1 may transmit, to the electronic device 101, a response indicating whether the authentication is successful.

In operation 1550, in an embodiment, the processor 210 may transmit device information of the electronic device 101 to the first server 108-1 in order to confirm authorization of the electronic device 101. In an embodiment, upon receiving a response indicating the authentication success from the first server 108-1, the processor 210 may request the first server 108-1 to confirm the authorization. In an embodiment, the device information transmitted to the first server 108-1 may be unique information of the electronic device 101. In an embodiment, the unique information may include at least one of an EID, an IMEI, a protocol version, a vendor of the existing electronic device 111, a model name, and a software version.

In an embodiment, the first server 108-1 may confirm whether the electronic device 101 has authorization to access the first server 108-1, based on the unique information received from the electronic device 101. In an embodiment, if the first server 108-1 confirms that the electronic device 101 has authorization to access the first server 108-1, the first server 108-1 may transmit, to the electronic device 101, information indicating that the electronic device 101 has authorization to access the first server 108-1.

In operation 1560, in an embodiment, the processor 210 may request the first server 108-1 to transfer a subscription. In an embodiment, the processor 210 may request the first server 108-1 to transfer the subscription, in response to receiving information indicating that there is authorization to access the first server 108-1.

In an embodiment, the first server 108-1 may transmit, to the electronic device 101, information for confirming the subscription transfer, in response to a subscription transfer request of the electronic device 101. For example, the first server 108-1 may transmit, to the electronic device 101, a URL of a web page capable of allowing the electronic device 101 to display at least one of information indicating that the subscription transfer will occur, information of the new electronic device (e.g., an EID or IMEI of the external electronic device 103), information of the electronic device 101 (e.g., an IMEI of the electronic device 101), and an MSISDN of the electronic device 101.

In an embodiment, the processor 210 may access the received URL of the web page to display a screen including at least one of information indicating that the subscription transfer will occur, information of the electronic device 101, information of the new electronic device (e.g., the external electronic device 103 of FIG. 3), and an MSISDN of the electronic device 101. However, information displayed through the received URL of the web page is not limited to the aforementioned example.

In an embodiment, the processor 210 may receive a user input for confirming the subscription transfer (or for agreeing on the subscription transfer), while displaying the screen.

In an embodiment, in response to receiving the user input for agreeing on the subscription transfer, the processor 210 may transmit, to the first server 108-1, information indicating that the user confirms the subscription transfer.

In an embodiment, in response to receiving information indicating the confirmation of the subscription transfer from the electronic device 101, the first server 108-1 may request the second server 108-2 to generate (or prepare) a second profile.

In an embodiment, the first server 108-1 may transmit second profile download information to the electronic device 101. In an embodiment, the second profile download information may include URL information of the second server 108-2 to be accessed to download the second profile. In an embodiment, the second profile download information may include an activation code.

In operation 1570, in an embodiment, the processor 210 may transmit, to a new electronic device (e.g., the external electronic device 103 of FIG. 3), the second profile download information received from the first server 108-1.

In an embodiment, a new electronic device (e.g., the external electronic device 103 of FIG. 3) may access the second server 108-2, based on the second profile download information. In an embodiment, the new electronic device (e.g., the external electronic device 103 of FIG. 3) may access the second server 108-2, based on URL information of the second server 108-2, which is included in the second profile download information. In an embodiment, the new electronic device (e.g., the external electronic device 103 of FIG. 3) may acquire (or download) a second profile from the accessed second serer 108-2, based on the second profile download information. In an embodiment, the new electronic device (e.g., the external electronic device 103 of FIG. 3) may acquire (or download) the second profile from the second server 108-2, and may store the acquired second profile in the second SIM. In an embodiment the new electronic device (e.g., the external electronic device 103 of FIG. 3) may acquire (or download) the second profile from the second server 108-2, based on second profile download information. In an embodiment, the new electronic device (e.g., the external electronic device 103 of FIG. 3) may store the acquired second profile in the second SIM.

In an embodiment, the new electronic device (e.g., the external electronic device 103 of FIG. 3) may notify the electronic device 101 that the download of the second profile is complete.

In operation 1580, in an embodiment, when the new electronic device (e.g., the external electronic device 103 of FIG. 3) completes the download of the second profile, the processor 210 may request the first server 108-1 to deactivate the first profile. In an embodiment, the processor 210 may request the first server 108-1 to update the subscription.

In an embodiment, the first server 108-1 may deactivate (or disable) the first profile, in response to the subscription update request.

In an embodiment, the first server 108-1 may notify the electronic device 101 that the subscription update is complete. In an embodiment, the first server 108-1 may notify the electronic device 101 that the first profile is deactivated (or disabled).

In operation 1590, in an embodiment, the processor 210 may transmit information indicating the subscription transfer completion to a new electronic device (e.g., the external electronic device 103 of FIG. 3).

In an embodiment, upon notifying of the subscription transfer completion, a new electronic device (e.g., the external electronic device 103 of FIG. 3) may use the second profile. In an embodiment, upon notifying of the subscription transfer completion, the new electronic device (e.g., the external electronic device 103 of FIG. 3) may enable (or activate) the second profile of the second SIM, and may use a network (e.g., a cellular network) provided by a communication operator related to the first server 108-1 using the activated second profile.

Figure 16:
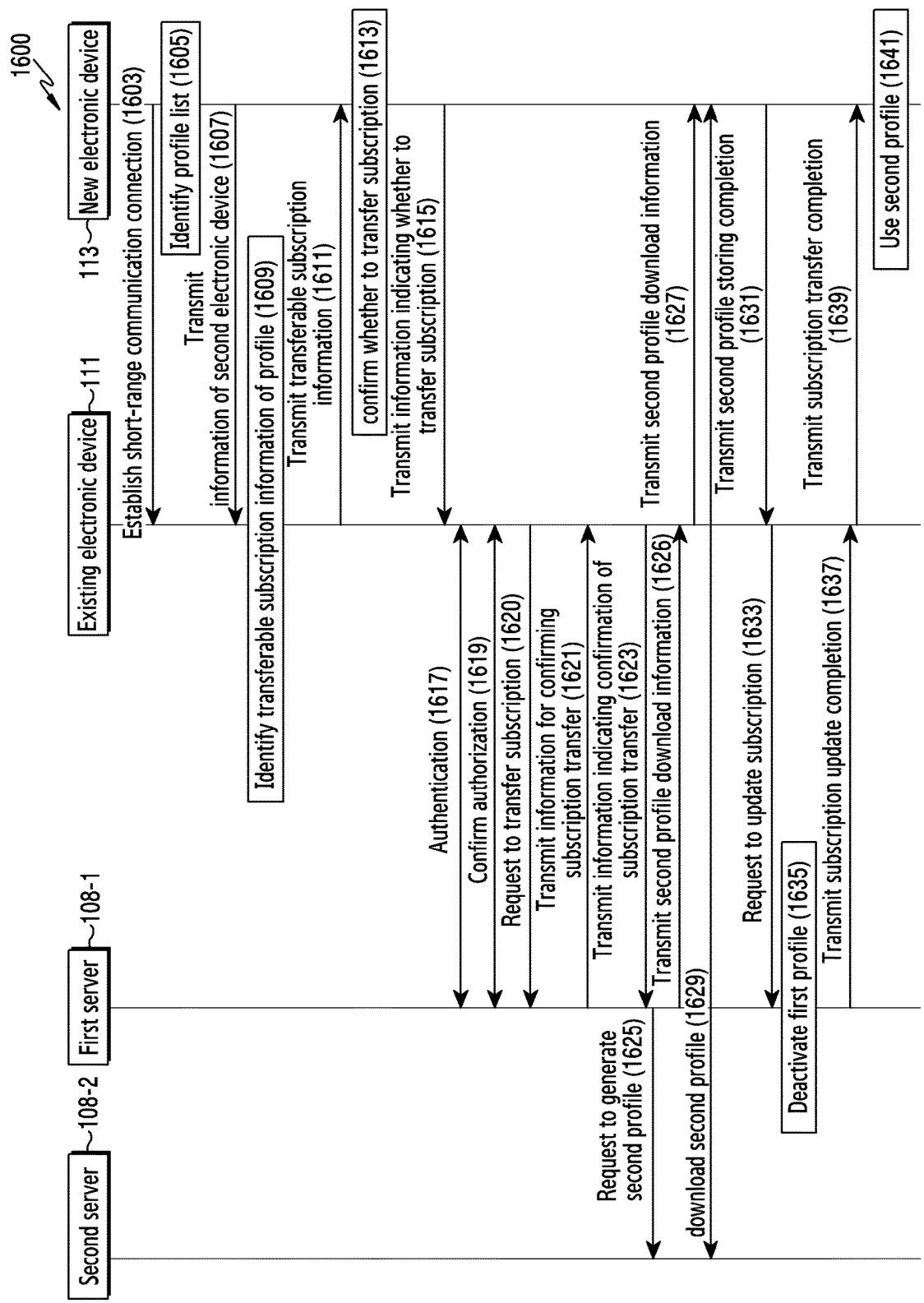
FIG. 16 is a signal flow diagram illustrating an example method for transferring a subscription according to an embodiment.

FIG. 16 is a flowchart 1600 illustrating an example system and illustrating an example method for transferring a subscription according to an embodiment. For example, FIG. 16 may be a diagram illustrating example embodiments of operations of FIG. 15 for an electronic device (e.g., the electronic device 101 of FIG. 2) on a system (e.g., the existing electronic device 101, the new electronic device 113, the first server 108-1, and the second server 108-2).

The existing electronic device 111 according to an embodiment may download configuration information from a config server (not shown). In an embodiment, the configuration information may include information on whether each of communication operators supports a subscription transfer and information (e.g., a Uniform Resource Locator (URL)) capable of accessing the first server 108-1 of each of the communication operators.

In an embodiment, in operation 1603, the existing electronic device 111 and the new electronic device 113 may establish a short-range communication connection. For example, the existing electronic device 111 and the new electronic device 113 may be connected through D2D communication (e.g., Bluetooth, NFC, or Wi-Fi direct).

In an embodiment, in operation 1605, the new electronic device 113 may identify a profile list. In an embodiment, the profile list may be a list of profiles stored in a second SIM of the new electronic device 113.

In an embodiment, in operation 1607, the new electronic device 113 may transmit device information to the existing electronic device 111. In an embodiment, the device information may include a profile list of the new electronic device 113, unique information, or a combination thereof. In an embodiment, the profile list may indicate a list of at least one profile stored in the second SIM of the new electronic device 113. In an embodiment, the unique information may include an IMEI, an ICCID, an EID, or a combination thereof.

In an embodiment, in operation 1609, the existing electronic device 111 may identify transferable subscription information in at least one first profile stored in a first SIM of the existing electronic device 111. In an embodiment, based on configuration information, the existing electronic device 111 may identify the first profile of the communication operator supporting the subscription transfer in the at least one first profile, and may identify a subscription indicated by the identified first profile as a transferable subscription. In an embodiment, based on the configuration information, the existing electronic device 111 may identify communication operator identity information (Mobile Country Code (MCC) and Mobile Network Code (MNC)) of a communication operator supporting the subscription transfer, identify the first profile having communication operator identity information identical to the communication operator identity information identified in the at least one first profile stored in the first SIM, and identify a subscription indicated by the identified first profile as the transferable subscription.

In an embodiment, in operation 1611, the existing electronic device 111 may transmit the transferable subscription information to the new electronic device 113.

In an embodiment, in operation 1613, the new electronic device 113 may confirm whether to transfer the subscription from the existing electronic device 111 to the new electronic device 113. In an embodiment, the new electronic device 113 may confirm whether to transfer the subscription, based on the received user input, while displaying a screen indicating that the subscription transfer is possible through a display (e.g., the display device 160 of FIG. 1). In an embodiment, if the received user input indicates to proceed the subscription transfer while displaying the screen indicating that the subscription transfer is possible, the new electronic device 113 may identify to proceed the subscription transfer. In an embodiment, if the received user input indicates not to transfer the subscription while displaying the screen indicating that the subscription transfer is possible, the new electronic device 113 may identify not to proceed the subscription transfer.

In an embodiment, if there are two or more transferable subscriptions, the new electronic device 113 may display a screen indicating that the two or more subscriptions can be transferred. In an embodiment, the new electronic device 113 may confirm whether to transfer each of the two or more subscriptions, based on the received user input, while displaying a screen indicating that the two or more subscriptions can be transferred.

In an embodiment, in operation 1615, the new electronic device 113 may transmit, to the existing electronic device 111, information indicating whether to transfer the subscription. In an embodiment, the information indicating whether to transfer the subscription may indicate whether to proceed the subscription transfer. In an embodiment, the information indicating whether to transfer the subscription may include subscription information used to proceed the subscription transfer. In an embodiment, if there are two or more subscriptions to be transferred, the information indicating whether to transfer the subscription may include subscription information of each of subscriptions to be transferred.

In an embodiment, in operation 1617, the existing electronic device 111 and the first server 108-1 may perform authentication.

In an embodiment, the existing electronic device 111 may request the first server 108-1 to perform authentication. In an embodiment, the existing electronic device 111 may request the first server 108-1 to perform authentication based on an Extensible Authentication Protocol (EAP) authentication and Key Agreement (AKA) scheme. In an embodiment, the existing electronic device 111 may transmit to the first server 108-1 an authentication request including an IMSI of the existing electronic device 111, an IMEI, or a combination thereof.

In an embodiment, the first server 108-1 may transmit a challenge to the existing electronic device 111, in response to the authentication request. In an embodiment, the challenge may be a random number for authenticating the first SIM of the existing electronic device 111.

In an embodiment, the existing electronic device 111 may acquire a payload for the challenge using the first SIM of the existing electronic device 111. In an embodiment, the existing electronic device 111 may use the first SIM to acquire a payload for the challenge, based on an authentication key value. In an embodiment, the existing electronic device 111 may transmit the payload to the first server 108-1.

In an embodiment, the first server 108-1 may determine whether authentication is successful, based on the payload.

In an embodiment, the first server 108-1 may determine whether the authentication is successful, by comparing the payload and a value converted from the challenge according to a pre-designed key for the first SIM. In an embodiment, if the value converted from the challenge according to the pre-designed key for the first SIM is identical to the payload, the first server 108-1 may determine that the authentication is successful.

In an embodiment, the first server 108-1 may transmit to the existing electronic device 111 a response indicating whether the authentication is successful.

In an embodiment, in operation 1619, the existing electronic device 111 and the first server 108-1 may confirm authorization of the existing electronic device 111. In an embodiment, upon receiving a response indicating that the authentication is successful from the first server 108-1, the existing electronic device 111 may request the first server 108-1 to confirm the authorization.

In an embodiment, the existing electronic device 111 may request the first server 108-1 to confirm authorization to access the first server 108-1 (or authorization for using a communication service provided by the first server 108-1 after accessing the first server 108-1). In an embodiment, the existing electronic device 111 may transmit unique information of the existing electronic device 111 to the first server 108-1 to confirm the authorization. In an embodiment, the unique information may include at least one of an EID, an IMEI, a protocol version, a vendor of the existing electronic device 111, a model name, and a software version.

In an embodiment, the first server 108-1 may confirm whether the existing electronic device 111 has authorization to access the first server 108-1, based on the unique information received from the existing electronic device 111. In an embodiment, the first server 108-1 may confirm whether the electronic device 101 has authorization to proceed the subscription transfer, based on the unique information received from the electronic device 101. In an embodiment, if the electronic device 101 has no authorization to proceed the subscription transfer, the first server 108-1 may confirm that the electronic device 101 has no authorization to access the first server 108-1. If the subscription of the electronic device 101 cannot be transferred (e.g., in case of a subscription using a predetermined rate plan (e.g., a business rate plan)), the first server 108-1 may confirm that the electronic device 101 has no authorization to access the first server 108-1.

In an embodiment, if the first server 108-1 confirms that the existing electronic device 111 has authorization to access the first server 108-1, the first server 108-1 may transmit, to the existing electronic device 111, information indicating that the existing electronic device 111 has authorization to access the first server 108-1.

In an embodiment, if the first server 108-1 confirms that the existing electronic device 111 has no authorization to access the first server 108-1, the first server 108-1 may transmit, to the existing electronic device 111, information indicating that the electronic device 101 has no authorization to access the first server 108-1, or may transmit a web page URL so that the existing electronic device 111 displays a web page of the first server 108-1.

In an embodiment, in operation 1620, the existing electronic device 111 may request the first server 108-1 to transfer a subscription. In an embodiment, the existing electronic device 111 may request the first server 108-1 to transfer the subscription, in response to receiving information indicating that the existing electronic device 111 has authorization to access the first server 108-1. In an embodiment, the existing electronic device 111 may transmit to the first server 108-1 a subscription transfer request including unique information of the existing electronic device 111 and new electronic device 113. In an embodiment, the unique information of the existing electronic device 111 and new electronic device 113 may include an IMEI, an ICCID, an EID, or a combination thereof.

In an embodiment, in operation 1621, the first server 108-1 may transmit information for confirming the subscription transfer to the existing electronic device 111. For example, the first server 108-1 may transmit to the existing electronic device 111 a URL of a web page capable of displaying at least one of information indicating that the subscription transfer will occur, information of the new electronic device 113 (e.g., an EID or IMEI of the external electronic device 103), information of the existing electronic device 111 (e.g., an IMEI of the electronic device 101), and an MSISDN of the existing electronic device 111.

In an embodiment, in operation 1623, the existing electronic device 111 may transmit, to the first server 108-1, information indicating the confirmation of the subscription transfer.

In an embodiment, the existing electronic device 111 may access the received URL of the web page to display a screen including at least one of information indicating that the subscription transfer will occur, information of the existing electronic device 111, information of the new electronic device 113, and an MSISDN of the existing electronic device 111. However, information displayed through the received URL of the web page is not limited to the aforementioned example.

In an embodiment, the existing electronic device 111 may receive a user input for confirming the subscription transfer (or for agreeing on the subscription transfer), while displaying the screen.

In an embodiment, in response to receiving the user input for confirming the subscription transfer, the existing electronic device 111 may transmit, to the first server 108-1, information indicating that the user confirms the subscription transfer.

In an embodiment, in operation 1625, in response to receiving information indicating the confirmation of the subscription transfer from the existing electronic device 111, the first server 108-1 may request the second server 108-2 to generate (or prepare) a second profile.

In an embodiment, in operation 1626, the first server 108-1 may transmit second profile download information to the existing electronic device 111. In an embodiment, the second profile download information may include URL information of the second server 108-2 to be accessed to download the second profile. In an embodiment, the second profile download information may include an activation code.

In an embodiment, in operation 1627, the existing electronic device 111 may transmit, to the new electronic device 113, the second profile download information received from the first server 108-1.

In an embodiment, in operation 1629, the new electronic device 113 may acquire (or download) the second profile from the second server 108-2, and may store the acquired second profile in the second SIM. In an embodiment, the new electronic device 113 may acquire (or download) the second profile from the second server 108-2, based on second profile download information. In an embodiment, the new electronic device 113 may store the acquired second profile in the second SIM.

In an embodiment, in operation 1631, the new electronic device 113 may notify the existing electronic device 111 that the download of the second profile is complete.

In an embodiment, in operation 1633, upon notifying that the download of the second profile is complete, the existing electronic device 111 may request the first server 108-1 to update the subscription.

In an embodiment, in operation 1635, the first server 108-1 may deactivate (or disable) the first profile, in response to the subscription update request.

In an embodiment, in operation 1637, the first server 108-1 may notify the existing electronic device 111 that the subscription update is complete. In an embodiment, the first server 108-1 may notify the existing electronic device 111 that the first profile is deactivated (or disabled).

In an embodiment, in operation 1639, upon notifying of the subscription update completion, the existing electronic device 111 may notify the new electronic device 113 that the subscription transfer is complete.

In an embodiment, in operation 1641, upon notifying of the subscription transfer completion, the new electronic device 113 may use the second profile. In an embodiment, upon notifying of the subscription transfer completion, the new electronic device 113 may enable (or activate) the second profile of the second SIM, and may use a network (e.g., a cellular network) provided by a communication operator related to the first server 108-1 using the activated second profile.

In an embodiment, if the second profile of the second SIM is activated, the new electronic device 113 may notify the existing electronic device 111 that the second profile is activated.

In an embodiment, the new electronic device 113 and/or the existing electronic device 111 may display a screen indicating that the subscription transfer is complete, thereby notifying the user about the subscription transfer completion. In an embodiment, the screen indicating that the subscription transfer is complete may include information indicating that a network provided by a communication operator related to the first server 108-1 can be used, using the second profile activated through the new electronic device 113. In an embodiment, the screen indicating that the subscription transfer is complete may include information indicating that the network provided by the communication operator related to the first server 108-1 cannot be used, using the first profile deactivated through the existing electronic device 111.

FIGS. 17A, 17B, 17C and 17D are diagrams illustrating an example method for transferring a subscription according to an embodiment. For example, FIGS. 17A, 17B, 17C and 17D may be diagrams illustrating example user interface screens related to embodiments of operations of FIG. 16.

Figure 17A:
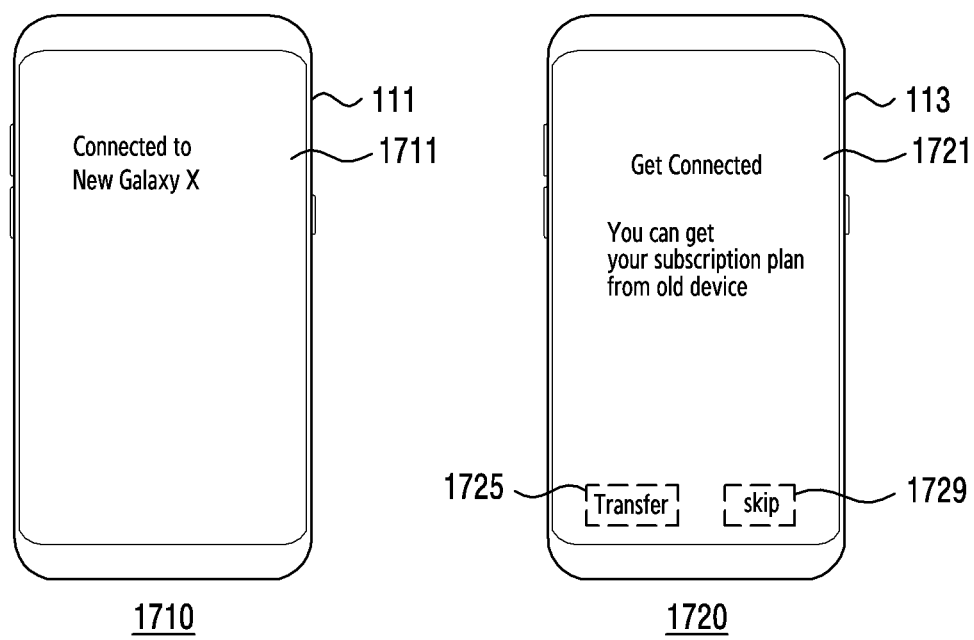
FIG. 17A is a diagram illustrating an example method for transferring a subscription according to an embodiment.

Referring to example 1710 of FIG. 17A, the existing electronic device 111 may display, through a display (e.g., the display device 160 of FIG. 1), a screen 1711 indicating that a communication connection with the new electronic device 113 is established.

Referring to example 1720 of FIG. 17A, the new electronic device 113 may display, through the display (e.g., the display device 160), a screen 1721 indicating that subscription information can be acquired from the existing electronic device 111. In an embodiment, the screen 1721 may include an object 1725 for performing acquisition of the subscription information and an object 1729 for ending or skipping the acquisition of the subscription information. In an embodiment, the example 1710 may be displayed after a short-range communication connection is established in operation 1603.

In an embodiment, the example 1720 may be displayed after operation 1609. In an embodiment, the example 1720 may be displayed during operation 1613.

In an embodiment, upon selecting the object 1725 in the screen 1721, a subscription transfer procedure between the existing electronic device 111 and the new electronic device 113 may be performed.

Figure 17B:
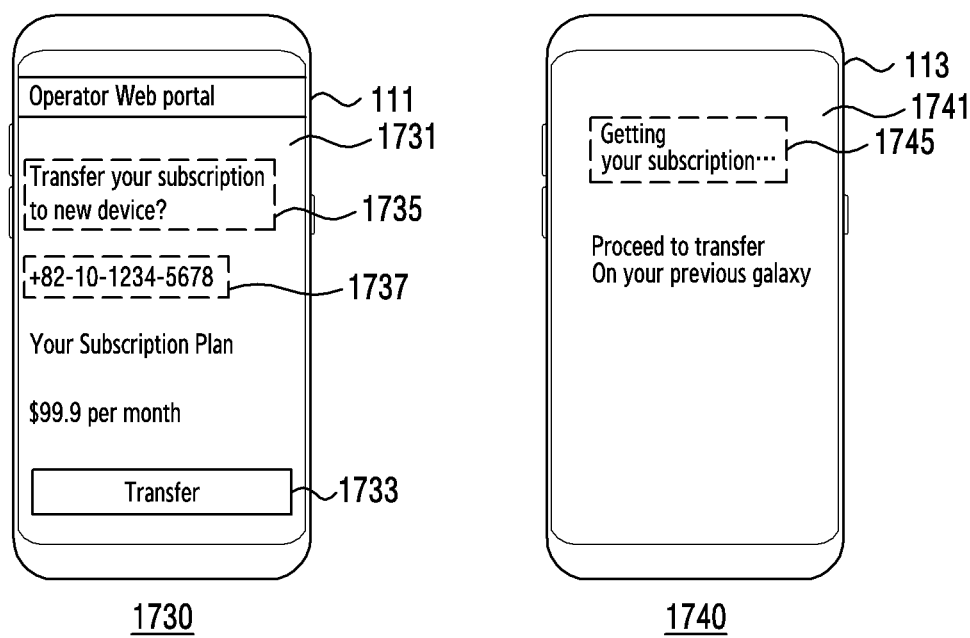
FIG. 17B is a diagram illustrating an example method for transferring a subscription according to an embodiment.

Referring to example 1730 of FIG. 17B, the existing electronic device 111 may display the screen 1731 including information for confirming a subscription transfer, based on information received from the first server 108-1. For example, the existing electronic device 111 may display a text 1735 for inquiring whether to transfer a subscription, subscription information (e.g., an MSISDN) 1737 of a first profile, and the object 1733 for receiving an input for confirming the subscription transfer. In an embodiment, the example 1730 may be a screen indicated by a web page URL received from the server 108-1. In an embodiment, the example 1730 may be displayed after the existing electronic device 111 receives, from the first server 108-1, information for confirming the subscription transfer to the existing electronic device 111 in operation 1621.

Referring to example 1740 of FIG. 17B, the new electronic device 113 may display a screen 1741 including information indicating to proceed the subscription transfer through the existing electronic device 111. In an embodiment, the new electronic device 113 may display the screen 1741 including a text 1745 indicating content for transferring the subscription through the existing electronic device 111. In an embodiment, the example 1740 may be displayed after the new electronic device 113 identifies whether to transfer the subscription in operation 1613.

Figure 17C:
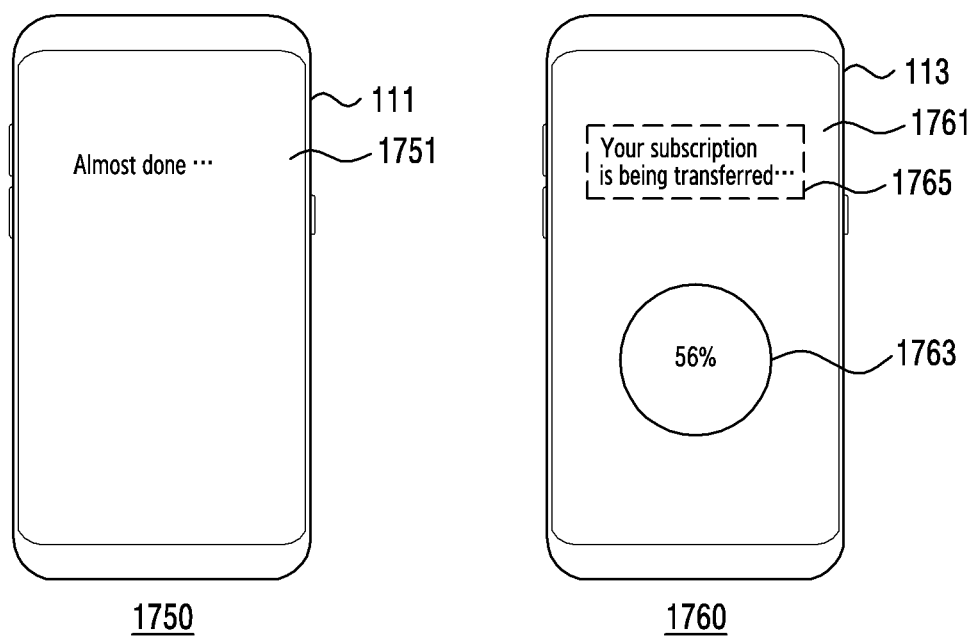
FIG. 17C is a diagram illustrating an example method for transferring a subscription according to an embodiment.

Referring to example 1750 of FIG. 17C, the existing electronic device 111 may display a screen 1751 indicating that the subscription transfer is being performed, in response to receiving an input for the object 1733 from the user. In an embodiment, the example 1750 may be displayed after the existing electronic device 11 receives a user input for confirming the subscription transfer (or for agreeing on the subscription transfer) in a screen indicated by a web page URL received from the server 108-1 in operation 1623. In an embodiment, the example 1750 may be displayed until the existing electronic device 111 receives from the new electronic device 113 a second profile storing completion message.

Referring to example 1760 of FIG. 17C, the new electronic device 113 may display a screen 1761 indicating that the subscription is being transferred. In an embodiment, the screen 1761 may include an object 1753 and text 1765 indicating that the subscription is being transferred.

Figure 17D:
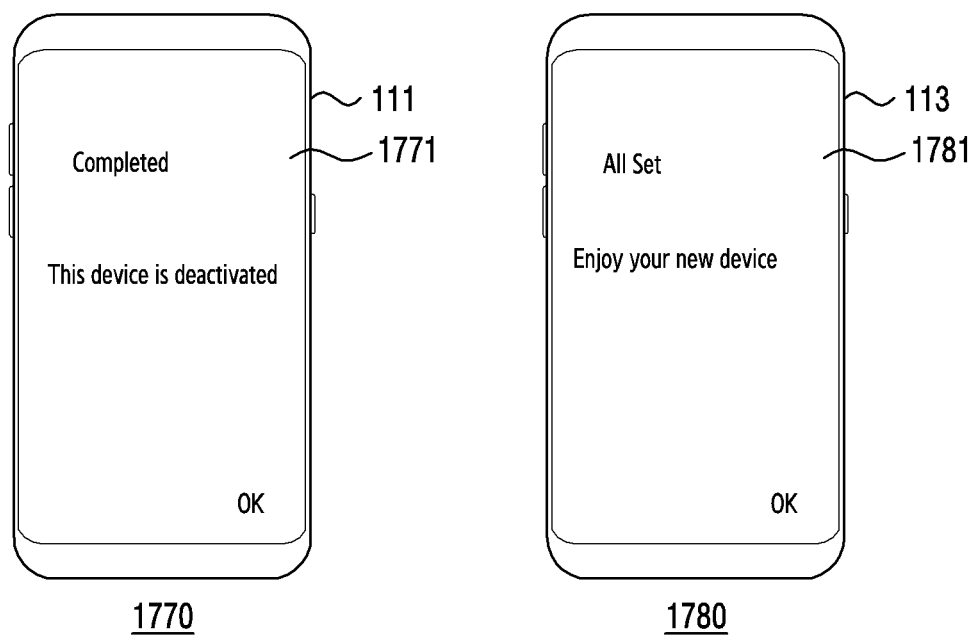
FIG. 17D is a diagram illustrating an example method for transferring a subscription according to an embodiment.

Referring to example 1770 of FIG. 17D, the existing electronic device 111 may display a screen 1771 indicating deactivation of the first profile, in response to receiving information indicating the deactivation of the first profile from the first server 108-1. For example, the example 1770 may be displayed after the existing electronic device 111 receives a first profile deactivation notification in operation 1637.

Referring to example 1780 of FIG. 17D, the new electronic device 113 may display a screen 1781 indicating activation of the second profile, in response to receiving information indicating subscription transfer completion from the existing electronic device 111. For example, the example 1780 may be displayed after the existing electronic device 111 receives a subscription update completion notification in operation 1639.

Figure 18:
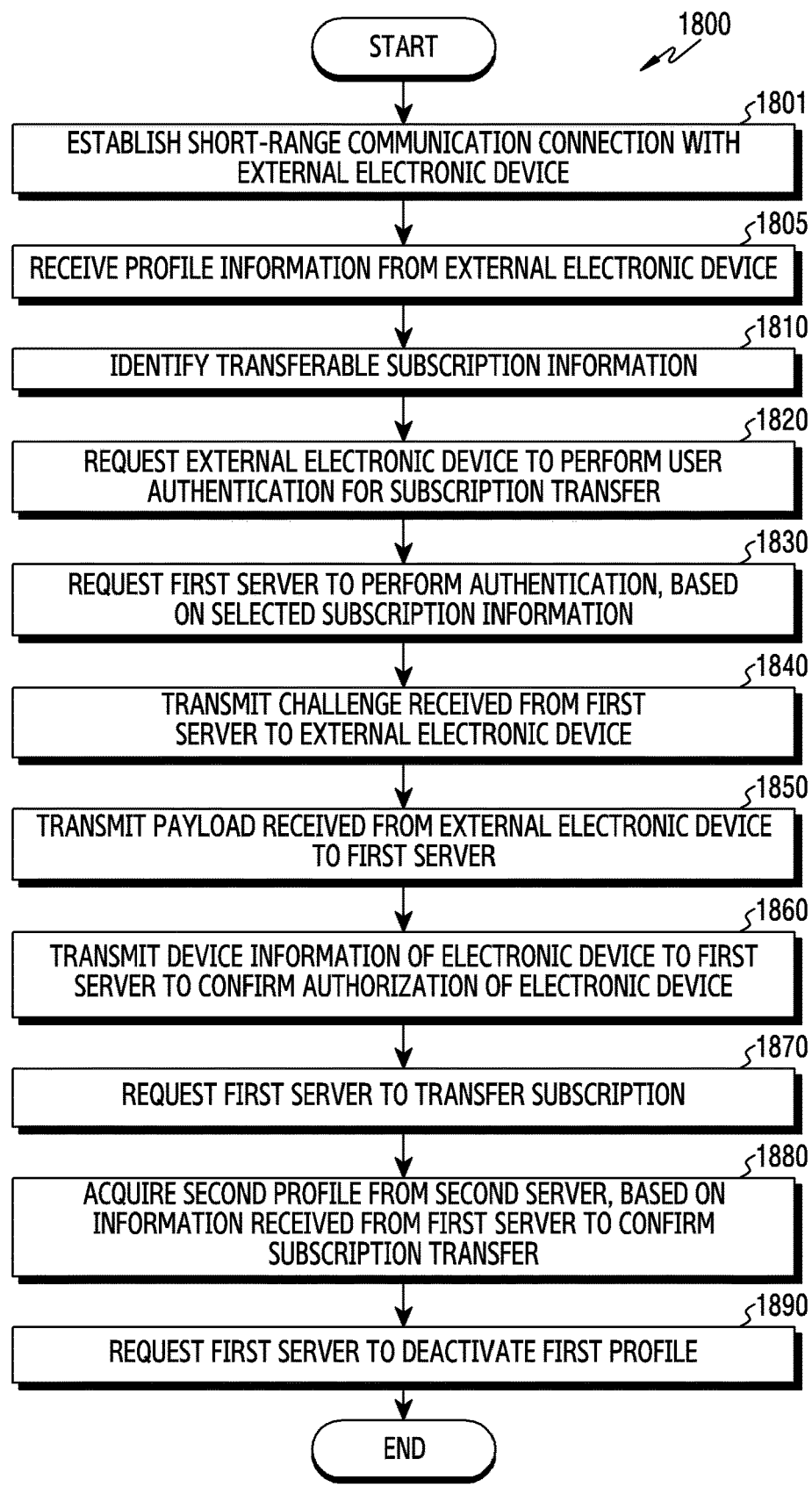
FIG. 18 is a flowchart illustrating an example method for transferring a subscription according to an embodiment.

FIG. 18 is a flowchart 1800 illustrating an example method for transferring a subscription according to an embodiment.

Operations 1801, 1805, 1810, 1820, 1830, 1840, 1850, 1860, 1870, 1880 and 1890 (which may be referred to hereinafter as operations 1801 to 1890) according to an embodiment may be performed in a new electronic device of a user. In an embodiment, the new electronic device of the user may be an electronic device (e.g., the electronic device 101 of FIG. 1).

Referring to FIG. 18, in operation 1801, a processor (e.g., the processor 210 of FIG. 2) of the electronic device 101 may establish a short-range communication connection with the existing electronic device (e.g., the external electronic device 103 of FIG. 3).

In an embodiment, the processor 210 may establish a short-range communication connection with the external electronic device 103 through a first wireless communication circuit (e.g., a short-range wireless communication circuit). In an embodiment, the processor 210 may establish the short-range communication connection between the electronic device 101 and the external electronic device 103, through a D2D communication connection (e.g., Bluetooth, NFC, or Wi-Fi direct).

In operation 1805, in an embodiment, the processor 210 may acquire profile information from the external electronic device 103.

In an embodiment, when a short-range communication connection is established between the electronic device 101 and the external electronic device 103, the processor 210 may request the external electronic device 103 to provide information of at least one profile stored in a second SIM of the external electronic device 103, and may receive the information of at least one profile from the external electronic device 103.

In operation 1810, in an embodiment, the processor 210 may identify transferable subscription information, based on information of at least one first profile of the external electronic device 103. In an embodiment, based on configuration information received from a config server, the processor 210 may identify the profile of the communication operator supporting the subscription transfer in the at least one profile, and may identify a subscription indicated by the identified profile as a transferable subscription. In an embodiment, based on the configuration information, the processor 210 may identify communication operator identity information (MCC and MNC) of a communication operator supporting the subscription transfer, identify the profile having communication operator identity information identical to the communication operator identity information identified in the at least one profile of the external electronic device 103, and identify a subscription indicated by the identified first profile as the transferable subscription.

In an embodiment, the processor 210 may confirm whether to transfer the subscription, based on a received user input, while displaying a screen indicating the transferable subscription information. In an embodiment, the processor 210 may confirm whether to transfer the subscription, based on the received user input, while displaying a screen indicating that the subscription transfer is possible through a display (e.g., the display device 160 of FIG. 1).

In an embodiment, if there are two or more transferable subscriptions, the processor 210 may display a screen indicating that the two or more subscriptions can be transferred. In an embodiment, the processor 210 may confirm whether to transfer each of the two or more subscriptions, based on the received user input, while displaying a screen indicating that the two or more subscriptions can be transferred.

In operation 1820, in an embodiment, the processor 210 may request the external electronic device 103 to perform user authentication for the subscription transfer.

In an embodiment, the processor 210 may request the external electronic device 103 to perform user authentication for the subscription transfer, based on the transferable subscription information.

In an embodiment, the external electronic device 103 may perform user authentication, in response to a user identification request. In an embodiment, the external electronic device 103 may perform user authentication, in response to the user authentication request for the subscription transfer. In an embodiment, the user authentication may include authentication (e.g., fingerprint authentication) based on user's biometric information. In an embodiment, the user authentication may include various methods (e.g., a password, a PIN, a pattern, user's biometric information (e.g., authentication based on a fingerprint, iris, and/or face recognition)) provided in the external electronic device 103.

In an embodiment, the external electronic device 103 may perform user authentication, based on the received user information (e.g., a password, a PIN, a pattern, biometric information), while displaying through a display (e.g., the display device 160 of FIG. 1) a screen for requesting for confirming whether to proceed the subscription transfer.

In operation 1830, the processor 210 may request the first server 108-1 to perform authentication based on selected subscription information. In an embodiment, the processor 210 may request the first server 108-1 to perform authentication, in response to receiving that user authentication is identified from the external electronic device 103. In an embodiment, the authentication may be performed based on an Extensible Authentication Protocol (EAP) Authentication and Key Agreement (AKA) scheme. In an embodiment, the electronic device 101 may transmit to the first server 108-1 an authentication request including an IMSI of the external electronic device 103, an IMEI, or a combination thereof.

In an embodiment, the processor 210 may perform authentication with the first server 108-1, based on subscription information received from the external electronic device 103. In an embodiment, the processor 210 may identify the first server 108-1 for managing a profile indicated by the transferable subscription information, and may perform authentication for transferring the subscription with the first server 108-1.

In an embodiment, the first server 108-1 may transmit a challenge to the electronic device 101, in response to the authentication request of the electronic device 101. In an embodiment, the challenge may be a random number for authenticating a first SIM of the external electronic device 103.

In operation 1840, the processor 210 may transmit to the external electronic device 103 the challenge received from the first server 108-1.

In an embodiment, the external electronic device 103 may acquire a payload for the challenge using the first SIM of the external electronic device 103. In an embodiment, the external electronic device 103 may use the first SIM to acquire a payload for the challenge, based on an authentication key value. The external electronic device 103 may transmit the payload for the challenge to the electronic device 101.

In operation 1850, the processor 210 may transmit the payload received from the external electronic device 103 to the first server 108-1.

In an embodiment, the first server 108-1 may determine whether authentication is successful, based on the payload. In an embodiment, the first server 108-1 may determine whether the authentication is successful, by comparing the payload and a value converted from the challenge according to a pre-designed key for the first SIM. In an embodiment, if the value converted from the challenge according to the pre-designed key for the first SIM is identical to the payload, the first server 108-1 may determine that the authentication is successful.

In an embodiment, the first server 108-1 may transmit, to the electronic device 101, a response indicating whether the authentication is successful.

In operation 1860, in an embodiment, the processor 210 may transmit device information of the electronic device 101 to the first server 108-1 in order to confirm authorization of the electronic device 101. In an embodiment, upon receiving a response indicating the authentication success from the first server 108-1, the processor 210 may request the first server 108-1 to confirm the authorization. In an embodiment, the device information transmitted to the first server 108-1 may be unique information of the electronic device 101.

In an embodiment, the unique information may include at least one of an IMEI, a protocol version, a vendor of the existing electronic device 111, a model name, and a software version.

In an embodiment, the first server 108-1 may confirm whether the electronic device 101 has authorization to access the first server 108-1, based on the unique information received from the electronic device 101. In an embodiment, if the first server 108-1 confirms that the electronic device 101 has authorization to access the first server 108-1, the first server 108-1 may transmit, to the electronic device 101, information indicating that the electronic device 101 has authorization to access the first server 108-1.

In operation 1870, in an embodiment, the processor 210 may request the first server 108-1 to transfer a subscription. In an embodiment, the processor 210 may request the first server 108-1 to transfer the subscription, in response to receiving information indicating that there is authorization to access the first server 108-1.

In an embodiment, the first server 108-1 may transmit, to the electronic device 101, information for confirming the subscription transfer, in response to a subscription transfer request of the electronic device 101. For example, the first server 108-1 may transmit, to the electronic device 101, a URL of a web page capable of allowing the electronic device 101 to display at least one of information indicating that the subscription transfer will occur, information of the external electronic device 103 (e.g., IMEI), information of the electronic device 101 (e.g., IMEI), and an MSISDN of the external electronic device 103.

In an embodiment, the processor 210 may access the received URL of the web page to display, through a display (e.g., the display device 160 of FIG. 1), a screen including at least one of information indicating that the subscription transfer will occur, information (e.g., IMEI) of the external electronic device 103, information (e.g., IMEI) of the electronic device 101, and an MSISDN of the external electronic device 103. However, information displayed through the received URL of the web page is not limited to the aforementioned example.

In an embodiment, the processor 210 may receive a user input for confirming the subscription transfer (or for agreeing on the subscription transfer), while displaying the screen.

In an embodiment, in response to receiving the user input for agreeing on the subscription transfer, the processor 210 may transmit, to the first server 108-1, information indicating that the user confirms the subscription transfer.

In an embodiment, in response to receiving information indicating the confirmation of the subscription transfer from the electronic device 101, the first server 108-1 may request the second server 108-2 to generate (or prepare) a second profile.

In an embodiment, the first server 108-1 may transmit second profile download information to the electronic device 101. In an embodiment, the second profile download information may include URL information of the second server 108-2 to be accessed to download the second profile. In an embodiment, the second profile download information may include an activation code.

In operation 1880, in an embodiment, the processor 210 may acquire (or download) the second profile from the second server 108-2, and may store the acquired second profile in the second SIM. In an embodiment, the processor 210 may access the second server 108-2, based on URL information of the second server 108-2, which is included in the second profile download information. In an embodiment, the processor 210 may acquire (or download) the second profile from the accessed second server 108-2, based on second profile download information. In an embodiment, the processor 210 may store the acquired second profile in the second SIM.

In operation 1890, in an embodiment, upon completion of the download of the second profile, the processor 210 may request the first server 108-1 to deactivate the first profile. In an embodiment, the processor 210 may request the first server 108-1 to update the subscription.

In an embodiment, the first server 108-1 may deactivate (or disable) the first profile, in response to the subscription update request.

In an embodiment, the first server 108-1 may notify the electronic device 101 that the subscription update is complete. In an embodiment, the first server 108-1 may notify the electronic device 101 that the first profile is deactivated (or disabled).

In an embodiment, upon notifying of the subscription transfer completion, the processor 210 may use the second profile. In an embodiment, upon notifying of the subscription transfer completion, the processor 210 may enable (or activate) the second profile of the second SIM, and may use a network (e.g., a cellular network) provided by a communication operator related to the first server 108-1 using the activated second profile.

Figure 19:
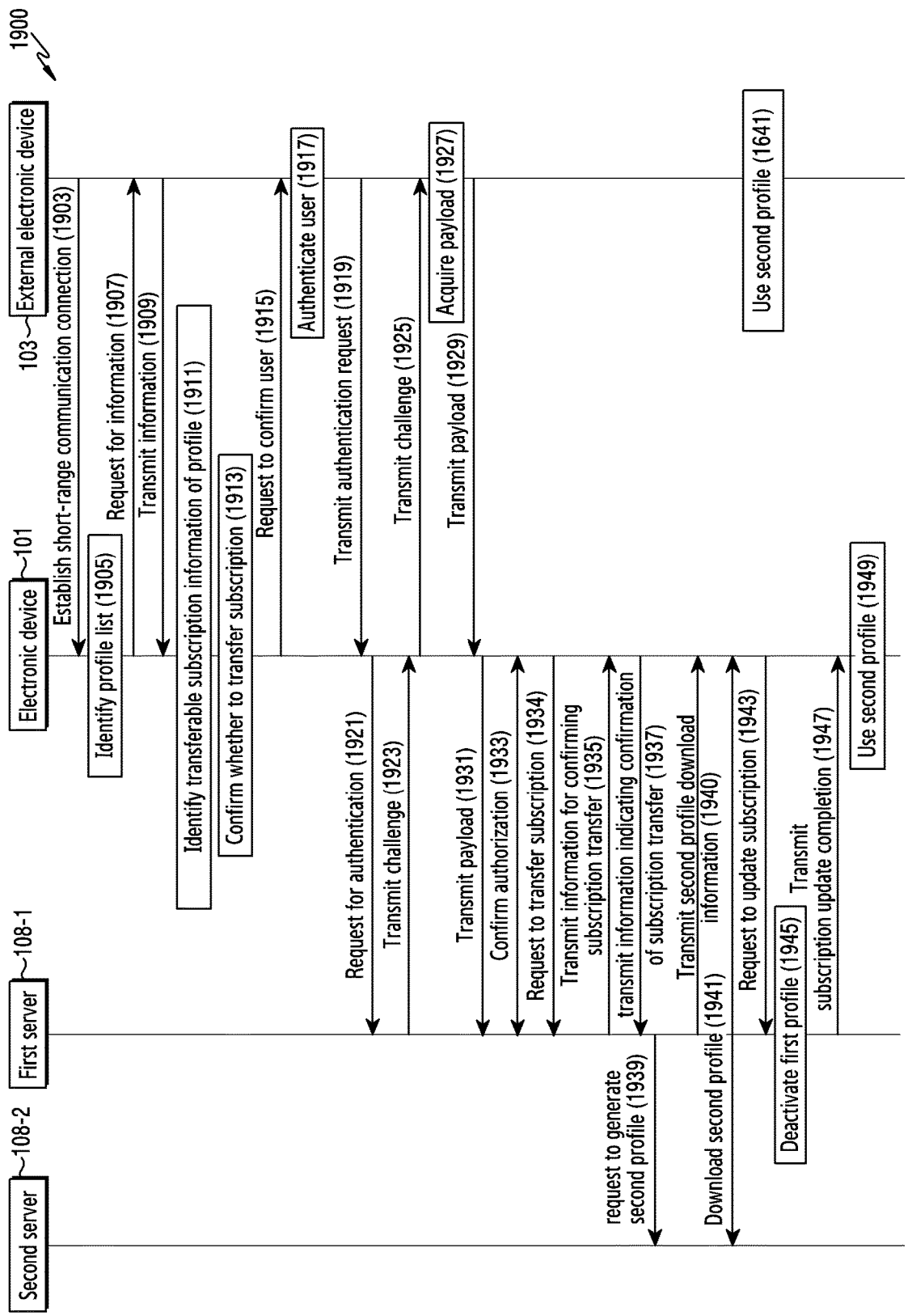
FIG. 19 is a signal flow diagram illustrating an example method for transferring a subscription according to an embodiment.

FIG. 19 is a signal flow diagram 1900 illustrating an example system and illustrating an example method for transferring a subscription according to an embodiment. For example, FIG. 19 may be a diagram illustrating example embodiments of operations of FIG. 18 for the electronic device 101 on a system (e.g., the electronic device 101, the external electronic device 103, the first server 108-1, and the second server 108-2).

In an embodiment, the electronic device 101 may download configuration information from a config server. In an embodiment, the configuration information may include information on whether each of communication operators supports a subscription transfer and information (e.g., a Uniform Resource Locator (URL)) capable of accessing the first server 108-1 of each of the communication operators.

Referring to FIG. 19, in operation 1903, the electronic device 101 and the external electronic device 103 may establish a short-range communication connection. For example, the electronic device 101 and the external electronic device 103 may be connected through D2D communication (e.g., Bluetooth, NFC, or Wi-Fi direct).

In operation 1905, the electronic device 101 may identify a profile list. In an embodiment, the profile list may be a list of profiles stored in a second SIM of the electronic device 101.

In operation 1907, the electronic device 101 may request to transmit subscription information of the external electronic device 103. In an embodiment, the subscription information may include at least one of an IMSI and MSISDN (or phone number) corresponding of a user of the external electronic device 103.

In operation 1909, the external electronic device 103 may transmit the subscription information to the electronic device 101.

In operation 1911, the electronic device 101 may identify transferable subscription information, based on at least one first profile stored in a first SIM of the external electronic device 103. In an embodiment, based on configuration information received from a config server, the electronic device 101 may identify the first profile of the communication operator supporting the subscription transfer in the at least one first profile, and may identify a subscription indicated by the identified first profile as a transferable subscription. In an embodiment, based on the configuration information, the electronic device 101 may identify communication operator identity information (MCC and MNC) of a communication operator supporting the subscription transfer, identify the first profile having communication operator identity information identical to the communication operator identity information identified in the at least one first profile stored in the first SIM, and identify a subscription indicated by the identified first profile as the transferable subscription.

In operation 1913, the electronic device 101 may confirm whether to transfer a subscription. In an embodiment, the electronic device 101 may confirm whether to transfer the subscription, based on the received user input, while displaying a screen indicating that the subscription transfer is possible through a display (e.g., the display device 160 of FIG. 1). In an embodiment, if the received user input indicates to proceed the subscription transfer while displaying the screen indicating that the subscription transfer is possible, the electronic device 101 may identify to proceed the subscription transfer. In an embodiment, if the received user input indicates not to transfer the subscription while displaying the screen indicating that the subscription transfer is possible, the electronic device 101 may identify not to proceed the subscription transfer.

In an embodiment, if there are two or more transferable subscriptions, the electronic device 101 may display a screen indicating that the two or more subscriptions can be transferred. In an embodiment, the electronic device 101 may confirm whether to transfer each of the two or more subscriptions, based on the received user input, while displaying a screen indicating that the two or more subscriptions can be transferred.

In operation 1915, the electronic device 101 may request the external electronic device 103 to confirm the user. In an embodiment, the electronic device 101 may request the external electronic device 103 to confirm the user in regards to whether to proceed the subscription transfer.

In operation 1917, the external electronic device 103 may perform user authentication, in response to a user identification request. In an embodiment, the user authentication may include various methods (e.g., a password, a Personal Identification Number (PIN), a pattern, user's biometric information (e.g., authentication based on a fingerprint, iris, and/or face recognition)) provided in the external electronic device 103.

In an embodiment, the external electronic device 103 may perform user authentication, based on the received user information (e.g., a password, a PIN, a pattern, biometric information), while displaying through a display (e.g., the display device 160 of FIG. 1) a screen for requesting for confirming whether to proceed the subscription transfer.

In operation 1919, the external electronic device 103 may transmit an authentication result to the electronic device 101.

In operation 1921, the electronic device 101 may request the first server 108-1 to perform authentication. In an embodiment, the electronic device 101 may request the first server 108-1 to perform authentication, in response to receiving that user authentication is identified from the external electronic device 103. In an embodiment, the electronic device 101 may request to perform authentication, based on an Extensible Authentication Protocol (EAP) Authentication and Key Agreement (AKA) scheme. In an embodiment, the electronic device 101 may transmit to the first server 108-1 an authentication request including an IMSI of the external electronic device 103, an IMEI, or a combination thereof.

In operation 1923, the first server 108-1 may transmit a challenge to the electronic device 101, in response to the authentication request. In an embodiment, the challenge may be a random number for authenticating the first SIM of the external electronic device 103.

In operation 1925, the electronic device 101 may transmit to the external electronic device 103 the challenge received from the first server 108-1.

In operation 1927, the external electronic device 103 may acquire a payload for the challenge using the first SIM of the external electronic device 103. In an embodiment, the external electronic device 103 may acquire a payload for the challenge, based on an authentication key value of the first SIM.

In operation 1929, in an embodiment, the external electronic device 103 may transmit, to the electronic device 101, the payload acquired from the first SIM.

In operation 1931, the electronic device 101 may transmit to the first server 108-1 the payload received from the external electronic device 103.

In an embodiment, the first server 108-1 may determine whether authentication is successful, based on the payload. In an embodiment, the first server 108-1 may determine whether the authentication is successful, by comparing the payload and a value converted from the challenge according to a pre-designed key for the first SIM. In an embodiment, if the value converted from the challenge according to the pre-designed key for the first SIM is identical to the payload, the first server 108-1 may determine that the authentication is successful.

In an embodiment, the first server 108-1 may transmit, to the electronic device 101, a response indicating whether the authentication is successful.

In operation 1933, the electronic device 101 and the first server 108-1 may confirm authorization of the electronic device 101. In an embodiment, upon receiving a response indicating an authentication success from the first server 108-1, the electronic device 101 may request the first server 108-1 to confirm the authorization.

In an embodiment, the electronic device 101 may request the first server 108-1 to confirm authorization to access the first server 108-1 (or authorization for using a communication service provided by the first server 108-1 after accessing the first server 108-1). In an embodiment, the electronic device 101 may transmit unique information of the electronic device 101 to the first server 108-1 to confirm the authorization. In an embodiment, the unique information may include at least one of an IMEI, a protocol version, a vendor of the electronic device 101, a model name, and a software version.

In an embodiment, the first server 108-1 may confirm whether the electronic device 101 has authorization to access the first server 108-1, based on the unique information received from the electronic device 101. In an embodiment, the first server 108-1 may confirm whether the electronic device 101 has authorization to proceed the subscription transfer, based on the unique information received from the electronic device 101. In an embodiment, if the electronic device 101 has no authorization to proceed the subscription transfer, the first server 108-1 may confirm that the electronic device 101 has no authorization to access the first server 108-1. If the subscription of the electronic device 101 cannot be transferred (e.g., in case of a subscription using a predetermined rate plan (e.g., a business rate plan)), the first server 108-1 may confirm that the electronic device 101 has no authorization to access the first server 108-1.

In an embodiment, if the first server 108-1 confirms that the electronic device 101 has authorization to access the first server 108-1, the first server 108-1 may transmit, to the electronic device 101, information indicating that the electronic device 101 has authorization to access the first server 108-1.

In an embodiment, if the first server 108-1 confirms that the electronic device 101 has no authorization to access the first server 108-1, the first server 108-1 may transmit, to the electronic device 101, information indicating that the electronic device 101 has no authorization to access the first server 108-1, or may transmit a web page URL so that the electronic device 101 displays a web page of the first server 108-1.

In operation 1934, the electronic device 101 may request the first server 108-1 to transfer a subscription. In an embodiment, the electronic device 101 may request the first server 108-1 to transfer the subscription, in response to receiving information indicating that the electronic device 101 has authorization to access the first server 108-1. In an embodiment, the electronic device 101 may transmit to the first server 108-1 a subscription transfer request including unique information of the electronic device 101 and external electronic device 103. In an embodiment, the unique information of the electronic device 101 and external electronic device 103 may include an IMEI, an ICCID, an EID, or a combination thereof.

In operation 1935, the first server 108-1 may transmit, to the electronic device 101, information for confirming the subscription transfer. For example, the first server 108-1 may transmit, to the electronic device 101, a URL of a web page capable of displaying at least one of information indicating that the subscription transfer will occur, information of the external electronic device 103 (e.g., an EID or IMEI of the external electronic device 103), information of the electronic device 101 (e.g., an IMEI of the electronic device 101), and an MSISDN of the external electronic device 103.

In operation 1937, in an embodiment, the electronic device 101 may transmit, to the first server 108-1, information indicating the confirmation of the subscription transfer.

In an embodiment, the electronic device 101 may access the received URL of the web page to display a screen including at least one of information indicating that the subscription transfer will occur, information of the electronic device 101, information of the external electronic device 103, and an MSISDN of the external electronic device 103. However, information displayed through the received URL of the web page is not limited to the aforementioned example.

In an embodiment, the electronic device 101 may receive a user input for confirming the subscription transfer (or for agreeing on the subscription transfer), while displaying the screen.

In an embodiment, in response to receiving the user input for agreeing on the subscription transfer, the electronic device 101 may transmit, to the first server 108-1, information indicating that the user confirms the subscription transfer.

In operation 1939, in response to receiving information indicating the confirmation of the subscription transfer from the electronic device 101, the first server 108-1 may request the second server 108-2 to generate (or prepare) a second profile.

In operation 1940, the first server 108-1 may transmit second profile download information to the electronic device 101. In an embodiment, the second profile download information may include URL information of the second server 108-2 to be accessed to download the second profile. In an embodiment, the second profile download information may include an activation code.

In operation 1941, the electronic device 101 may acquire (or download) the second profile from the second server 108-2, and may store the acquired second profile in the second SIM. In an embodiment, the electronic device 101 may acquire (or download) the second profile from the second server 108-2, based on second profile download information. In an embodiment, the electronic device 101 may store the acquired second profile in the second SIM.

In operation 1943, upon completion of the download of the second profile, the electronic device 101 may request the first server 108-1 to update the subscription.

In operation 1945, the first server 108-1 may deactivate (or disable) the first profile, in response to the subscription update request.

In operation 1947, the first server 108-1 may notify the electronic device 101 that the subscription update is complete. In an embodiment, the first server 108-1 may notify the electronic device 101 that the first profile is deactivated (or disabled).

In operation 1949, upon notifying of the subscription transfer completion, the electronic device 101 may use the second profile. In an embodiment, upon notifying of the subscription transfer completion, the electronic device 101 may enable (or activate) the second profile of the second SIM, and may use a network (e.g., a cellular network) provided by a communication operator related to the first server 108-1 using the activated second profile.

In an embodiment, although not shown, if the second profile is activated, the electronic device 101 may notify the external electronic device 103 that the second profile is activated and/or the first profile is deactivated.

In an embodiment, the electronic device 101 and/or the external electronic device 103 may display a screen indicating that the subscription transfer is complete, thereby notifying the user about the subscription transfer completion. In an embodiment, the screen indicating that the subscription transfer is complete may include information indicating that a network provided by a communication operator related to the first server 108-1 can be used, using the second profile activated through the electronic device 101. In an embodiment, the screen indicating that the subscription transfer is complete may include information indicating that the network provided by the communication operator related to the first server 108-1 cannot be used, using the first profile deactivated through the external electronic device 103.

FIGS. 20A, 20B, 20C and 20D are diagrams illustrating an example method for transferring a subscription according to an embodiment. For example, FIGS. 20A, 20B, 20C and 20D may be diagrams illustrating example user interface screens related to embodiments of operations of FIG. 19.

Figure 20A:
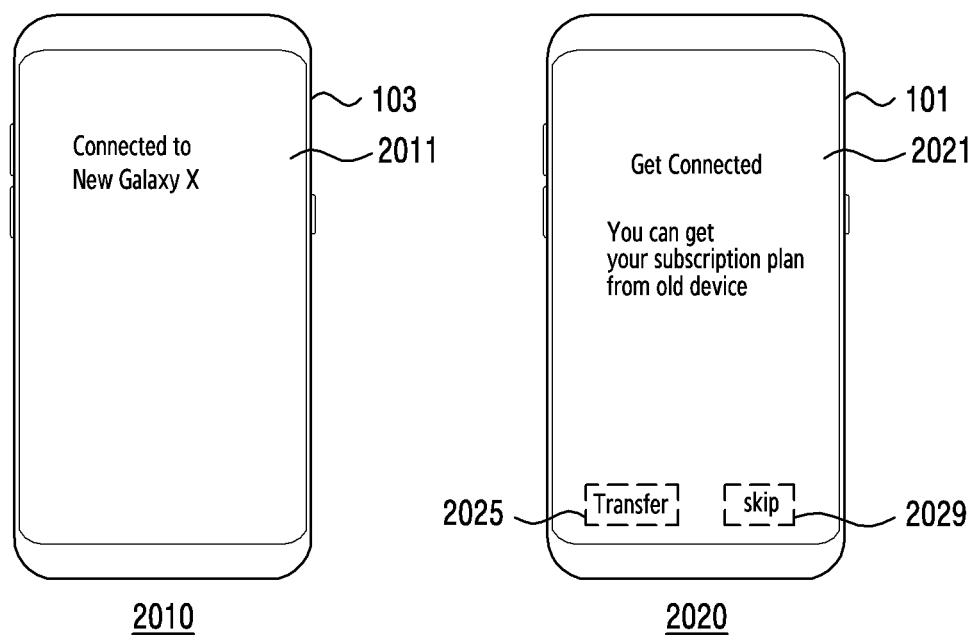
FIG. 20A is a diagram illustrating an example method for transferring a subscription according to an embodiment.

Referring to example 2010 of FIG. 20A, the external electronic device 103 may display, through a display (e.g., the display device 160 of FIG. 1), a screen 2011 indicating that a communication connection with the electronic device 101 is established.

Referring to example 2020 of FIG. 20A, the electronic device 101 may display, through the display (e.g., the display device 160), a screen 2021 indicating that subscription information can be acquired from the external electronic device 103. In an embodiment, the screen 2021 may include an object 2025 for performing acquisition of the subscription information and an object 2029 for ending or skipping the acquisition of the subscription information. In an embodiment, the examples 2010 and 2020 may be displayed after a short-range communication connection between the electronic device 101 and the external electronic device 103 is established in operation 1903. In an embodiment, the example 2010 may be displayed after the short-range communication connection is established in operation 1903. In an embodiment, the example 2020 may be displayed after operation 1911. For example, the example 2020 may be displayed during operation 1913.

In an embodiment, upon selecting the object 2025 in the screen 2021, a subscription transfer procedure between the external electronic device 103 and the electronic device 101 may be performed.

Figure 20B:
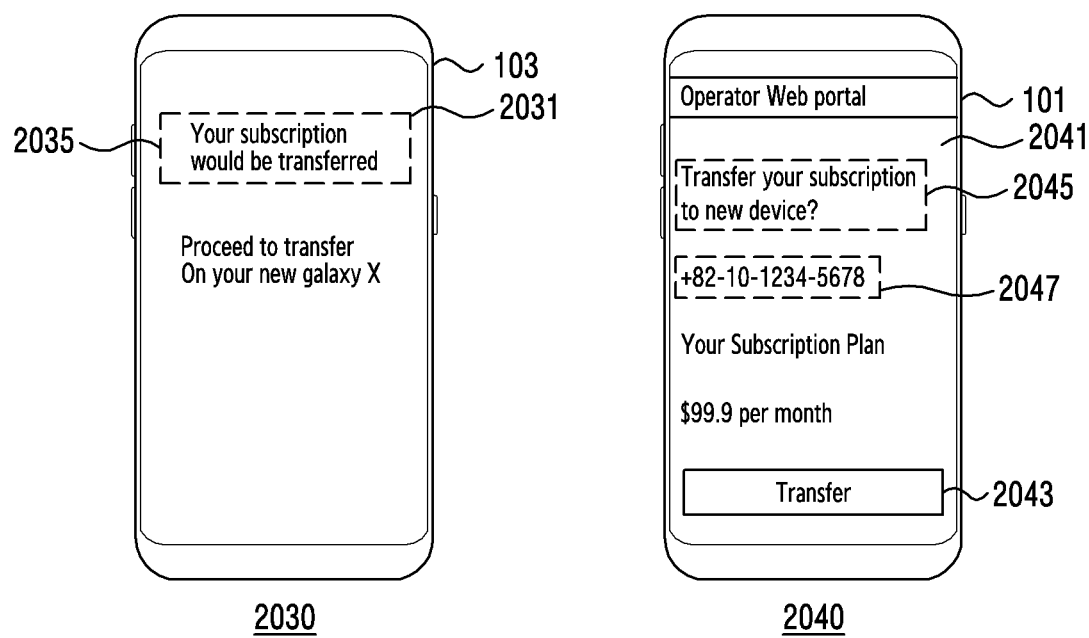
FIG. 20B is a diagram illustrating an example method for transferring a subscription according to an embodiment.

Referring to example 2030 of FIG. 20B, the external electronic device 103 may display a screen 2031 indicating that the subscription transfer is being performed through the electronic device 101. In an embodiment, the external electronic device 103 may display the screen 2031 including a text 2035 indicating content for proceeding the subscription transfer through the electronic device 101. In an embodiment, the example 2030 may be displayed in the external electronic device 103 after the external electronic device 103 transmits device information to the electronic device 101 in operation 1909.

Referring to example 2040 of FIG. 20B, the electronic device 101 may display a screen 2041 including information for confirming a subscription transfer, based on information received from the first server 108-1. For example, the electronic device 101 may display a text 2045 for inquiring whether to transfer a subscription, subscription information (e.g., an MSISDN) 2047 of a first profile, and an object 2043 for receiving an input for confirming the subscription transfer. In an embodiment, the example 2040 may be a screen indicated by a web page URL received from the server 108-1. In an embodiment, the example 2040 may be displayed after the electronic device 101 receives a web page URL from the first server 108-1 in operation 1935.

Figure 20C:
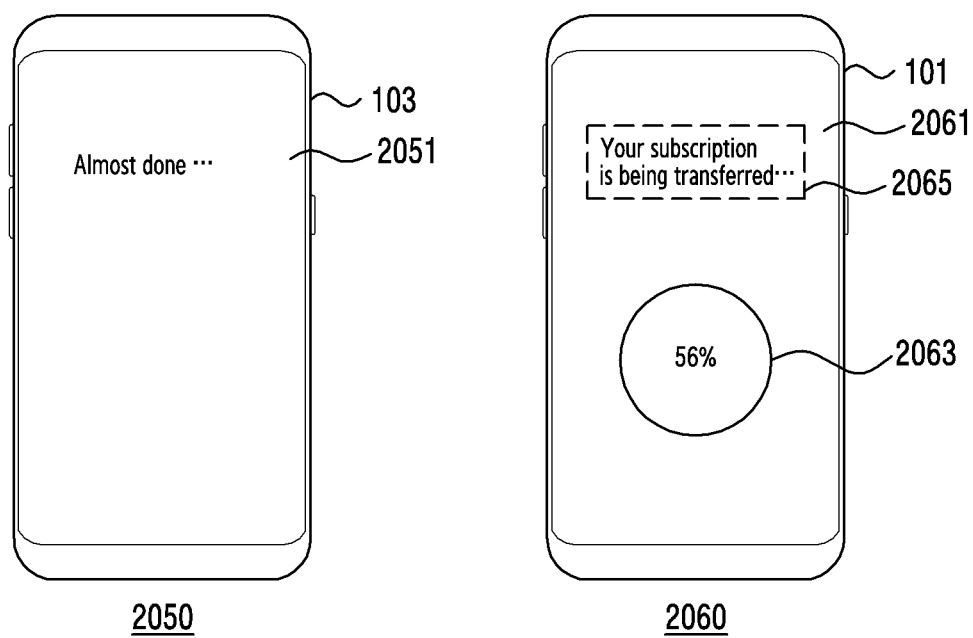
FIG. 20C is a diagram illustrating an example method for transferring a subscription according to an embodiment.

Referring to example 2050 of FIG. 20C, the external electronic device 103 may display a screen 2051 indicating that the subscription transfer is being performed, in response that the electronic device 101 receives an input for the object 2043 from the user.

In an embodiment, the external electronic device 103 and the electronic device 101 may mutually transmit and receive information indicating a current state of each other while performing an operation for the subscription transfer. In an embodiment, the external electronic device 103 and the electronic device 101 may change a screen, based on the current state of the electronic devices 101 and 103. In an embodiment, in the example 2050, the electronic device 101 may receive a user input for confirming the subscription transfer (or for agreeing on the subscription transfer) in a screen indicated by a web page URL received from the server 108-1 in operation 1923, and although not shown, the electronic device 101 may transmit, to the external electronic device 103, information indicating the user input is received. The external electronic device 103 may display the example 2050 after receiving the information indicating that the user input is received. In an embodiment, the example 2050 may be displayed until the external electronic device 103 receives, from the electronic device 101, a notification indicating the activation of the second profile and/or the deactivation of the first profile.

Referring to example 2060 of FIG. 20C, the electronic device 101 may display a screen 2061 indicating that the subscription transfer is being performed. In an embodiment, the screen 2061 may include an object 2063 and text 2065 indicating that the subscription transfer is being performed.

Figure 20D:
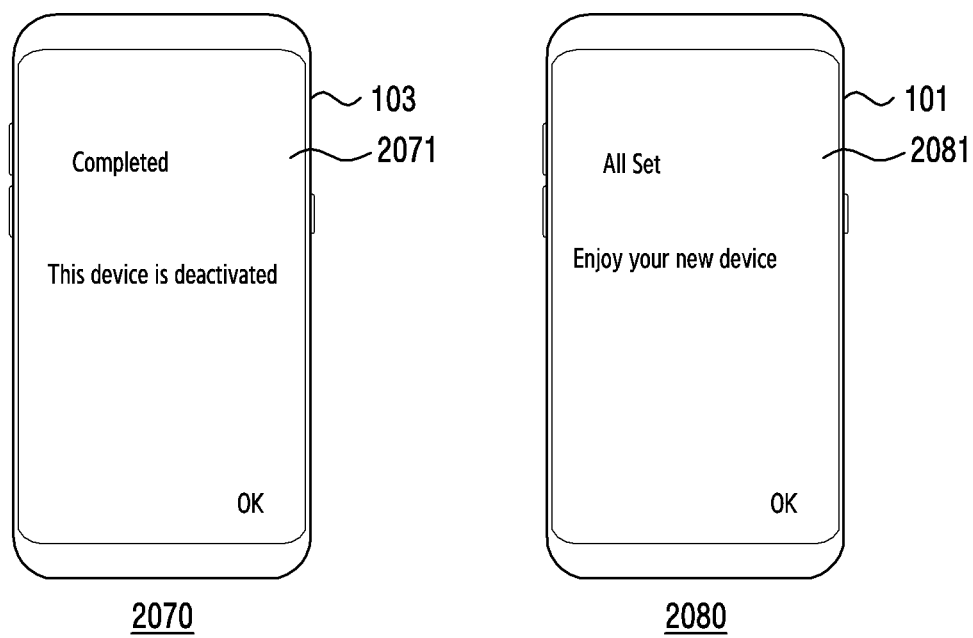
FIG. 20D is a diagram illustrating an example method for transferring a subscription according to an embodiment.

Referring to example 2070 of FIG. 20D, although not shown, the external electronic device 103 may display a screen 2071 indicating the deactivation of the first profile, in response to receiving the information indicating the activation of the second profile and/or the deactivation of the first profile from the electronic device 101. In an embodiment, the example 2070 may be displayed after the first profile is deactivated by the first server 108-1 in operation 1945.

Referring to example 2080 of FIG. 20D, the electronic device 101 may display a screen 2081 indicating the activation of the second profile, in response to receiving information indicating the subscription transfer completion from the first server 108-1 in operation 1947. In an embodiment, the examples 2070 and 2080 may be displayed after the electronic device 101 receives a notification indicating the subscription transfer completion in operation 1947.

Additionally, the structure of data used in the above-described embodiments may be recorded in a computer readable recording medium via various means. The computer readable recording medium may include a storage medium such as a magnetic storage medium (e.g., a ROM, a floppy disk, or a hard disk) and an optical reading medium (e.g., a CD-ROM or a digital versatile disc (DVD)).

The aforementioned method according to an example embodiment may include: establishing a short-range communication connection between the electronic device and the external electronic device through a first wireless communication circuit configured to support a first communication protocol, acquiring subscription information of a first profile stored in a first SIM of the external electronic device from the external electronic device through the first wireless communication circuit, transmitting at least part of the subscription information through a second wireless communication circuit configured to support a second communication protocol, acquiring authentication information provided by the first server from the external electronic device through the first wireless communication circuit, transmitting the authentication information to the first server through the second wireless communication circuit, acquiring a second profile corresponding to the first profile from a second server associated with the first server through the second wireless communication circuit based on transmitting the authentication information to the first server, and storing the second profile to a second SIM of the electronic device.

In an example embodiment, the acquiring of the subscription information of the first profile may include requesting the external electronic device to provide the subscription information, in response to establishing a short-range communication connection between the electronic device and the external electronic device, and acquiring the subscription information from the external electronic device through the first wireless communication circuit, in response to requesting the external electronic device to provide the subscription information.

In an example embodiment, the subscription information may include at least one of an IMSI and an MISDN of the first SIM.

In an example embodiment, the authentication information may include an OTP generated in the first server.

In an example embodiment, the transmitting of the at least part of the subscription information to the first server may include transmitting, to the first server through the second wireless communication circuit, a port number of a port of the external electronic device for receiving an ID of the electronic device and the authentication information, together with at least part of the subscription information.

In an example embodiment, the second SIM may include an embedded SIM (eSIM). The eSIM may be embedded to the electronic device or may be implemented in a detachable manner.

In an example embodiment the MSISDN included in the second profile may be identical to the MSISDN of the first SIM.

In an example embodiment, the method may further include, based on the second profile being activated, performing, through the processor coupled to the second SIM, communication using the activated second profile.

In an example embodiment, the method may further include transmitting, to the first server through the second wireless communication circuit, a list of profiles stored in the second SIM by including the second profile, after storing the second profile in the second SIM of the electronic device.

While the disclosure has been illustrated and described with reference to various example embodiments thereof, it will be understood that the various example embodiments are intended to be illustrative, not limiting. It will be further understood by those of ordinary skill in the art that various changes in form and details may be made without departing from the true spirit and full scope of the disclosure, including the appended claims and their equivalents.

What is claimed is:

1. An electronic device comprising:
a first wireless communication circuit configured to support a first communication protocol;
a second wireless communication circuit configured to support a second communication protocol;
at least one processor operatively coupled with the first wireless communication circuit and the second wireless communication circuit; and
a memory operatively coupled with the at least one processor,
wherein the memory stores instructions which, when executed, cause the at least one processor to control the electronic device to:
establish a short-range communication connection between the electronic device and an external electronic device through the first wireless communication circuit;
acquire subscription information of a first profile stored in a first Subscriber Identification Module (SIM) of the external electronic device from the external electronic device through the first wireless communication circuit;
transmit a subscription transfer request to the external electronic device based at least on the first profile;
transmit an authentication request to a first server through the second wireless communication circuit;
transmit, to the external electronic device, a challenge received from the first server corresponding to the authentication request, wherein the challenge comprises a random number for authenticating the first SIM;
transmit, to the first server through the second wireless communication circuit, a payload for the challenge, the payload received from the external electronic device;
acquire a second profile from a second server associated with the first server through the second wireless communication circuit based on transmitting the payload to the first server; and
store the second profile to a second SIM of the electronic device.

2. The electronic device of claim 1, wherein the instructions, when executed, cause the at least one processor to control the electronic device to:
request the external electronic device to provide the subscription information in response to establishing a short-range communication connection between the electronic device and the external electronic device; and
acquire the subscription information from the external electronic device through the first wireless communication circuit in response to requesting the external electronic device to provide the subscription information.

3. The electronic device of claim 1, wherein the subscription information comprises at least one of an International Mobile Subscriber Identity (IMSI) and a Mobile Station International Subscriber Directory Number (MSISDN) of the first SIM.

4. The electronic device of claim 1, wherein the payload is acquired by the external electronic device based on the challenge and an authentication key using the first SIM.

5. The electronic device of claim 1, wherein the instructions, when executed, cause the processor to control the electronic device to: transmit, to the first server through the second wireless communication circuit, a port number of a port of the external electronic device for receiving an IDentifier (ID) of the electronic device and the authentication information, together with at least part of the subscription information.

6. The electronic device of claim 1,
wherein the second SIM comprises an embedded SIM (eSIM), and
wherein the eSIM is embedded in the electronic device or is detachable.

7. The electronic device of claim 1, wherein a Mobile Station International Subscriber Directory Number (MSISDN) included in the second profile is identical to a MSISDN of the first SIM.

8. The electronic device of claim 1, further comprising a processor coupled to the second SIM, wherein, based on the second profile being activated, the electronic device is configured to perform communication using the activated second profile.

9. The electronic device of claim 1, wherein the instructions, when executed, cause the processor to control the electronic device to: transmit, to the first server through the second wireless communication circuit, a list of profiles stored in the second SIM including the second profile, based on storing the second profile in the second SIM of the electronic device.

10. The electronic device of claim 1, wherein the authentication request is transmitted to the first server after acquiring the subscription information from the external electronic device through the first wireless communication circuit.

11. A method comprising:
    establishing a short-range communication connection between an electronic device and an external electronic device through a first wireless communication circuit configured to support a first communication protocol;
    acquiring subscription information of a first profile stored in a first subscriber identification module (SIM) of the external electronic device from the external electronic device through the first wireless communication circuit;
    transmitting a subscription transfer request to the external electronic device based on the first profile,
    transmitting an authentication request to a first server through a second wireless communication circuit configured to support a second communication protocol;
    transmitting, to the external electronic device, a challenge received from the first server corresponding to the authentication request, wherein the challenge comprises a random number for authentication regarding the first SIM;
    transmitting, to the first server through the second wireless communication circuit, a payload for the challenge, the payload received from the external electronic device;
    acquiring a second profile from a second server associated with the first server through the second wireless communication circuit based on transmitting the payload to the first server; and
    storing the second profile to a second SIM of the electronic device.

12. The method of claim 11, wherein the acquiring of the subscription information of the first profile comprises:
    requesting the external electronic device to provide the subscription information in response to establishing a short-range communication connection between the electronic device and the external electronic device; and
    acquiring the subscription information from the external electronic device through the first wireless communication circuit in response to requesting the external electronic device to provide the subscription information.

13. The method of claim 11, wherein the subscription information comprises at least one of an International Mobile Subscriber Identity (IMSI) and a Mobile Station International Subscriber Directory Number (MSISDN) of the first SIM.

14. The method of claim 11, wherein the payload is acquired by the external electronic device based on the challenge and an authentication key using the first SIM.

15. The method of claim 11, wherein the transmitting of the at least part of the subscription information to the first server comprises transmitting, to the first server through the second wireless communication circuit, a port number of a port of the external electronic device for receiving an IDentifier (ID) of the electronic device and the authentication information, together with at least part of the subscription information.

16. The method of claim 11,
    wherein the second SIM comprises an embedded SIM (eSIM), and
    wherein the eSIM is embedded in the electronic device or detachable.

17. The method of claim 11, wherein the MSISDN included in the second profile is identical to the MSISDN of the first SIM.

18. The method of claim 11, further comprising, based on the second profile being activated, performing, through a processor coupled to the second SIM, communication using the activated second profile.

19. The method of claim 11, further comprising transmitting, to the first server through the second wireless communication circuit, a list of profiles stored in the second SIM including the second profile, based on storing the second profile in the second SIM of the electronic device.

20. The method of claim 11, wherein the authentication request is transmitted to the first server after acquiring the subscription information from the external electronic device through the first wireless communication circuit.

\* \* \* \* \*